US006164772A

United States Patent [19]

Koitabashi et al.

[11] Patent Number: 6,164,772

[45] **Date of Patent: *Dec. 26, 2000**

[54] INK FOR INK JET CARTRIDGE AND METHOD OF INK JET RECORDING USING THE SAME

[75] Inventors: Noribumi Koitabashi; Masami Ikeda; Hiromitsu Hirabayashi, all of Yokohama; Shigeyasu Nagoshi, Kawasaki; Masahiko Higuma, Tougane; Yuji Akiyama; Hitoshi Sugimoto, both of Yokohama; Miyuki Fujita, Tokyo; Fumihiro Goto, Kawasahi; Masaya Uetsuki, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/315,298

[22] Filed: Sep. 29, 1994

[30] Foreign Application Priority Data

Sep. 30, 1993 [JP] Japan .................................... 5-245640

[51] Int. Cl.$^{7}$ .................................................. G01D 11/100

[52] U.S. Cl. .............................................. 347/100; 347/86

[58] Field of Search ............................... 347/87, 100, 85, 347/86

[56] References Cited

U.S. PATENT DOCUMENTS

| | | | |
|---|---|---|---|
| 4,771,295 | 9/1988 | Baker et al. | 346/1.1 |
| 4,794,409 | 12/1988 | Cowger et al. | 346/140 R |
| 4,914,562 | 4/1990 | Abe et al. | 347/100 |
| 5,025,271 | 6/1991 | Baker et al. | 346/140 R |
| 5,106,416 | 4/1992 | Moffatt et al. | 106/20 |
| 5,116,409 | 5/1992 | Moffatt | 106/22 |
| 5,182,579 | 1/1993 | Haruta et al. | 346/140 R |
| 5,395,434 | 3/1995 | Tochihara et al. | 106/22 R |
| 5,430,471 | 7/1995 | Nakajima et al. | 347/87 |
| 5,489,932 | 2/1996 | Ceschin et al. | 347/87 |
| 5,619,238 | 4/1997 | Higuma et al. | 347/886 |

FOREIGN PATENT DOCUMENTS

| | | | |
|---|---|---|---|
| 488829 | 6/1992 | European Pat. Off. | 347/87 |
| 490579A3 | 6/1992 | European Pat. Off. . | |
| 493058A3 | 7/1992 | European Pat. Off. . | |
| 529625A3 | 3/1993 | European Pat. Off. . | |
| 546544A3 | 6/1993 | European Pat. Off. . | |
| 580433A1 | 1/1994 | European Pat. Off. . | |
| 56-49771 | 5/1981 | Japan . | |
| 57-16385 | 1/1982 | Japan . | |
| 55975 | 4/1982 | Japan . | |
| 58-6752 | 2/1983 | Japan . | |
| 22952 | 1/1986 | Japan | 347/87 |
| 63-87242 | 4/1988 | Japan . | |
| 1-182384 | 7/1989 | Japan . | |
| 2-522 | 1/1990 | Japan . | |
| 4-198474 | 7/1992 | Japan . | |
| 4-198681 | 7/1992 | Japan . | |
| 21423 | 3/1995 | Japan . | |
| 2268910 | 1/1994 | United Kingdom . | |
| 2268911 | 1/1994 | United Kingdom . | |

OTHER PUBLICATIONS

Shin–Kaimenkasseizai Nyumon (A New Guide Book of Surfactant, Revised edition) Oct. 1, 1981.

Patent Abstracts of Japan, vol. 12, No. 444 (C–545), Nov. 22, 1988 (with respect to JP 63–165470 of Jul. 8, 1988).

Patent Abstracts of Japan, vol. 6, No. 131 (C–114), Jul. 17, 1982 (with respect to JP 57–55975 of Apr. 3, 1982).

Patent Abstracts of Japan, vol. 5, No. 111 (C–063), Jul. 18, 1981 (with respect to JP 56–49771 of May 6, 1981).

*Primary Examiner*—John Barlow
*Assistant Examiner*—Craig A. Hallacher
*Attorney, Agent, or Firm*—Fitzpatrick, Cella, Harper & Scinto

[57] ABSTRACT

Ink which contains surfactant in the amount of not exceeding the critical micelle concentration in the ink but exceeding the critical micelle concentration in purified water, is filled into a cartridge, comprising a first chamber which encloses a negative pressure producing material, and a second chamber in communication with said first chamber only through a narrow passage Then, said ink is supplied to ink jet head and printed.

32 Claims, 39 Drawing Sheets

$h_i$ : refill frequency at $C_i$ $h_{cmc}$ : refill frequency at $C_{mc}$

INK FOR INK JET CARTRIDGE AND METHOD OF INK JET RECORDING USING THE SAME

BACKGROUND OF THE INVENTION

1. Field of the Invention

The present invention relates to an ink jet cartridge in use for ink providing jet function, an ink jet cartridge, to an ink jet and also a method therefor, which are applicable for devices including copying machines, recording apparatus such as facsimile devices, telecommunication instruments, composite instruments thereof, and printers.

2. Brief Description of the Related Art

An ink jet cartridge in use for an ink jet device is normally integrally formed with an ink jet head. In most cases, such a conventional cartridge is replaced together with the used head, when the cartridge is reached the step at which the ink will not be injected. A comparatively large amount of ink is still remaining in the cartridge, because of being governed by ink retention ability of sponge material which is contained in the cartridge.

In a cartridge of the above type, such as disclosed in Japanese laid-open patent publication No. 63-87242 a foam material is enclosed in the cartridge, which is integral with an ink jet recording head furnished with a plurality of ink injecting orifices. As ink is contained in foam material such as polyurethane foam, a negative pressure produced by capillarity of the foam achieves conservation of the ink (i.e. prevention of ink leakage out of the container). However, as the foam must be filled over almost entirely within the ink chamber, the filling quantity of ink is not only restricted, but also the amount of ink remaining unused in the foam will increase. As a result, there are needed several improvements in filling effect and efficient use of the ink material. Also, problems still remain in difficulty of detection of remaining ink and possibility of ununiformity of injecting property of ink.

Another prior art discloses an ink jet cartridge containing substantially solely an ink material. Japanese laid-open patent publication No. 2-522 discloses an ink jet head having an integral construction in which a few amount of porous material is provided between an upper positioned primary storage section in which a large amount of ink is contained and a lower positioned ink jet head. According to the description, an advantage is mentioned that, because the porous material is not enclosed in the ink storage section but disposed only in an ink passage, the using efficiency of ink is increased. Another advantage is also mentioned that it is possible to tentatively store the ink flown out of the primary ink storage section due to temperature rise of the enclosed air (and pressure decrease thereby) by providing a secondary ink storage section in the side of the porous material, and thus to maintain the negative pressure applied on the head at the recording step at substantially a constant value.

However, in the invention therein, the production of negative pressure is almost reduced, because the porous material is present in the ink passage, and an over sufficient amount of ink is soaked in the porous material with the ink supplied from the primary ink storage section which is upwardly positioned and stores a large amount of ink. Accordingly, there has been possibility of flowing out of ink from the orifice of the head, even applied with a slight shock. Also, it is not adequate in practice to form the above mentioned type of the ink container as a replaceable type of ink jet cartridge detachable with the ink jet head. The reason therefor is that there is possibility of flowing out of the ink from the head-ink jet cartridge joint portion into the ink container, since the negative pressure is generally diminished.

Another ink jet cartridge is also known, in which the ink is enclosed in a bag and a spring member is additionally provided to control the deformation of the bag for maintaining the negative pressure of the porous material itself in a predetermined value. But the cost thereof was increased and also it was impossible to maintain the structure of the spring to achieve a mass production of devices.

In any cases, any ink jet cartridge for ink jet purpose (that is, non-contact type printing use) manufactured in low cost but provided with a reasonable technical level is not still produced.

In an ink jet recording method using a piezoelectric element, recording is performed by injecting ink by use of a drive voltage not less than 40 V in the on-demand mode or continuous mode. The element is in usual driven by a driving voltage required to correctly inject the ink in spite of any environmental change. An embodiment thereof is disclosed in Japanese patent publication No. 58-6752.It is also disclosed therein a various colored ink containing an amount of 0.0001 to 10 weight % of an ethylene oxide addition product. It is evaluated therein that an ink containing a surface active agent, that is surfactant, is excellent in fixing property and water resistance in comparison with that without surfactant. It is further disclosed therein that it is possible to determine if the ink can be injected by checking the first drive signal obtained after being kept for three months, and that the ink containing a surfactant can perform an excellent ink injection.

In this connection, in "Shin Kaimenkasseizai Nyumon" (A New Guide Book of Surfactant, revised edition) published on Oct. 1, 1981, it is disclosed that it is quite a natural knowledge to mix a surfactant of an amount of exceeding the critical micelle concentration (abbreviated as "c.m.c.") into the liquid when such a surfactant is to be contained into a liquid in order to obtain a sufficient effect of adding the surfactant. Also, there are two U.S. Pat. Nos. 5,106,416 and 5,116,409, each discloses an invention featured in that a surfactant of an amount of exceeding the critical micelle concentration is mixed with an ink material. In these specifications, the effect for preventing bleeding of the ink is disclosed, and no meaning of the critical micelle concentration of a surfactant when mixed into water. In contrast, Japanese laid-open patent publication No. 56-49771 discloses an ink material containing a surfactant of not exceeding the critical micelle concentration, and also is mentioned therein such an ink can produce an effect of preventing blinding which occurs in the nozzle. Also, similar to Japanese patent publication No. 58-6752 mentioned above, there is Japanese laid-open patent publication No. 1-182384 (1989), which discloses an invention on an ink to enable the use of an ink containing 1 to 10% of a surfactant by admixing a solvent of low vapor pressure and low viscosity. But it is merely considered therein bleeding of the ink with the paper to be printed thereon.

In any case, there has been no invention which precisely discloses the stability of behavior throughout the course ranging from the ink chamber or ink jet head until the behavior of the ink drops after injected out of the ink jet head, and the relationship between the ink chamber and the ink itself for making sure of improving the printing quality, which is considered over the range which sufficiently covers until the course of the injection behavior of the ink jet head.

In either the proposed replaceable ink cartridge or the structure of the ink container disclosed in Japanese laid-open patent publication No. 63-87242, firstly, no attention is paid as to the structural change of ink drops produced from the ink jet head: and secondly, no attention is paid as to the correlation between the phase conversion of the ink contained in the ink jet head; production of minute ink drops, called satellite dots or microdots, which are separated from the normal drops while they are flowing and produced; and the behavior of the ink against the recording medium. Accordingly, any of no reasonable solutions relating to ink property or recording method for ensuring recording properties is provided.

As another technical field using the ink material, there is contact recording technique, in which generally the ink is supplied to the recording core having capability of ink absorption and preservation.

As an example of ink feeding in contact recording technique, it is mentioned the laid-open utility model publication No. 57-16385, in which is disclosed a recording pen for a recording instrument using a recording core, that is, a porous ink absorbing core.

The invention disclosed therein is a structure which comprises a central section including a recording core, a first cotton-like fiber engaging with the recording core, a second cotton-like fiber absorbing a small amount of ink at the opening in communication with the atmosphere but allowing less passage of ink compared with the first cotton-like fiber; and a tightly sealed ink chamber section capable of feeding through the passages provided on the opposite sides of the central section.

In operation therein, the air contained in the ink chamber section is expanded due to temperature rise of the ambient temperature to allow the ink to flow into the first cotton-like fiber. Then, the ink of the amount exceeding that possible to be soaked is absorbed by the second fiber to prevent the ink from being overflown and dropped out of the recording core.

Also disclosed therein is provision of a groove having a predetermined width for permitting the expanded air to escape toward the air passage, when one of the two ink chambers is filled with air only. Such a groove is formed in the range from the lowermost end to the uppermost end of the side surface different from the partition of the central section and the tightly sealed section.

However, in the recording pen of the non-contact type recording instrument, no attention is paid for a stable negative pressure production for preventing ink leakage out of the recording assembly, especially in the field of non-contact type ink jet recording technology.

Further, it is pointed out that the ink consumption from the ink chambers of the both sides does not always occur in the same amount to each other, and rather the ink from either one chamber is likely to be in advance consumed. Although there is paid attention on leakage from the recording core in accordance with various environmental changes, there is still possibility of further problems which would occur in the field of ink jet recording, such as disconnection of the ink passage way or invasion of air bubbles into the recording assembly.

In order to solve the above problems, the same inventors proposed an improved ink jet cartridge for the ink jet device, which is featured in provided with two advantages, that is, an excellent feeding of ink material of an amount corresponding to the amount of ink ejected from the recording head during printing operation, and there is no drawback of ink leakage from the outlet during non-printing, and these were disclosed in Japanese patent application Nos. 4-198474 and 4-198681 of the same inventors.

Based on the discussion above, it has been found that the construction which is effective for making best use of ink jet characteristics is comprised of, as the fundamental construction, a first ink chamber and a second ink chamber: the first chamber for receiving a negative pressure producing material, provided with an air communication passage for achieving air communication with the atmosphere, and serving as the container for the negative pressure producing material; and the second chamber being an ink chamber, which is in communication with the first chamber but is substantially in tightly sealed condition, for directly and tentatively accommodating the ink material which is to be supplied into the first chamber.

According to the above construction, a structure of an ink chamber, by which the negative pressure is maintained at a substantially fixed value throughout almost all the period ranging from the initial use to final use of the ink jet cartridge, is obtained, and accordingly, the present invention can provide a replaceable ink jet cartridge and a ink jet head as well as a printer, which are in response to the high speed recording.

SUMMARY OF THE INVENTION

In accordance with the above mentioned background of the invention, an object of the present invention is to provide an innovated ink jet cartridge comprising two chambers.

Another object of the present invention is to provide ink, which is used for the ink jet cartridge, capable of providing a smooth and stabilized air-liquid interface between the air and the ink in the negative pressure producing material, and of improving the recording ability on the recording medium.

Another object of the present invention is to provide a method of ink jet recording and a device therefor that is capable of producing a record having an excellent image quality and that have high reliability.

A further object of the present invention is to provide a method of ink jet recording, which is improved in the smooth and stabilized air-liquid interface between the air and the ink in the negative pressure producing material, and improves the recording ability on the recording medium.

More specifically, the present invention is related to the technology, through which a hydrophilic ink containing a surfactant is supplied into the ink jet recording head, and perform recording by the ink on a recording medium, and to the technology related thereto. More precisely, the content of the surfactant is such as the surfactant is contained in the resulting overall ink liquid at a predetermined amount of not exceeding the critical micelle concentration (abbreviated as "c.m.c.") against that of the ink; but, when the same surfactant is admixed into purified water at the same predetermined content, the concentration will exceed the above c.m.c. concentration.

It is already known the ink jet cartridge, which utilizes a negative pressure producing material not in the supersaturated state, therefore different from that of the present invention. But any structure, to which an ink chamber of in the substantially tightly sealed condition is attached, is not known. In this connection, the structure of the ink jet cartridge, which is applicable for the ink above, will be described hereinafter.

In accordance with one aspect of the present invention to overcome the drawbacks of the prior art technology, the area adjacent the passage which is in communication with ambient air of the negative pressure producing material is formed as the area containing an ink,thereby providing an advantage to prevent leakage of the ink from the passage to the air, regardless of any change of environmental conditions. Particularly, another effect is achieved that a seal member, which is used to seal the air passage area, can be prevented from removal therefrom. Also in operation, through the area which is in communication with the air, a necessary amount of air can be supplied into the cartridge, and another effect is produced to suspend the change of negative pressure in the ink jet cartridge. It is preferable if the air communication area is formed as having no wet with ink, because the osmotic speed of the ink is further retarded. Still, it may be also formed as the area which is in advance having wet with ink, which is removed thereafter.

Further, the invention provides a construction comprising an ink supply opening or an area in which the negative pressure producing material is partially compressed or is enabled to be compressed. As a result, a substantially stabilized ink supply passage can be maintained. As a more stabilized construction, it is mentioned a construction in which the ink supply opening is positioned higher than that of the narrow passage. Further, a “supply tube” of the present invention includes not only an insert tube especially for ink jet, but also includes a valve assembly or connecting member for deforming the negative pressure producing material by applying pressure. All such arrangements provide the effects of stabilized ink feed direction for complete consumption of the ink in the second container. Also after such consumption, the air is allowed to flow from the partition toward the supply tube, accordingly in the direction to eliminate the air from its negative condition. Consequently, the ink in the negative pressure section is enabled to be efficiently consumed, thereby reducing the remaining ink.

In accordance with another aspect of the invention, an area which is not compressed by the supply tube and another area which is compressed by the supply tube, are provided in this sequence. Thus, one-directional ink supply passage is formed in the uncompressible area to provide the same effect as mentioned above. The amount of the remaining ink is further reduced according to ink retaining ability of the compressible area.

Accordingly, it is preferable that the invention includes the above-discussed three features. Further, it is to be understood that at least one or two features also can provide excellent effects.

The ink jet cartridge of the invention is normally manually treated by the operator normally with any trouble. But, sometimes the ink chamber is likely to be deformed when applied with a great pressure. As a solution therefor, another partition is preferably provided, which allows to provide a gap wider than the partition which provides the narrow passage. In the case that the cartridge is formed by synthetic resin, it is preferable to form the ink chamber with the wall thickness Ti of more than 0.8 mm, and the container to be filled with the material such as sponge with its wall thickness Ts of more than 1.3 mm in terms of being deformed. In addition, it has been found the ratio of thickness Ti and Ts is preferably between 1.2 and 3.0.

In accordance with still another aspect of the invention, together with the ink jet cartridge of the invention, an automatic or manual removal of the ink from the cartridge is performed by way of aspiration or ejection: this will allow the ink condition in the negative pressure section to be corrected before printing operation, and therefore, regardless of how the cartridge being kept unused, the original functions of the cartridge mentioned above can be effectively utilized.

The height of the narrow passage to the lower edge of the partition is larger than the average pore size of the negative pressure producing material, more preferably that of adjacent the area of the narrow passage, that is actually more than 0.1 mm, and not exceeding 5 mm. For achieving further stability, it may be not exceeding 3 mm. As the ratio of volume of the negative pressure section and the ink chamber, the ratio between 1:1 and 1:3 is selected as the optimal value in practice.

An optimal embodiment according to the invention is the recording method performed under the condition described below and the apparatus therefor. The recording ink contains a surfactant such that: the content of the above agent does not exceed the critical micelle concentration (abbreviated in “c.m.c.”) compared with the hydrophilic ink containing the same agent; in addition, the content of the agent is in that: when the agent is admixed in purified water, the concentration is greater than the c.m.c. in purified water. Further, the content is in the range of not exceeding the half value of (c.m.c. in the ink+c.m.c. in purified water). The hydrophilic ink is supplied to the ink jet head, wherein the agent contains the surfactant in the amount for satisfying the surface tension exceeding 30 dyn/cm under the temperature condition T degrees centigrade. The principal effect of the invention includes: the stabilized characteristics in the ink jet cartridge, being supplied to the head under stable supplying condition, stabilization of the condition of ejected ink drops, improved printing quality by single dot form which is free from any bleeding, and also includes the improved recovery of ink ejection, and improved ejection characteristic at high frequency. In addition to the above, the invention also provides the following effects. That is to say, by the surface tension of exceeding 30 dyn/cm under the temperature condition T° C. discussed above, the behavior of the ink contained in the head during being operated, namely the function of the ink exhibited at the time of refill or ejection of the ink is improved. Also, the surfactant, the content of which is not exceeding the half value of (c.m.c. in the ink+c.m.c. in purified water), provides the effect of minimizing the variation of viscosity, deriving the further effect of surfactant, and substantially eliminating variation of injecting condition of ink. In particular, when the concentration of the surfactant is determined in accordance with the illustrated relationship between the surface tension and the concentration of the surfactant, an appropriate condition for effectively compensating the environmental variations will be obtained.

In accordance with a still further aspect of the invention, the surfactant does not exceed the c.m.c. in ink, and is a predetermined amount close to that of c.m.c. in the ink, while such predetermined amount of the agent is greater than the c.m.c. in purified water, when the amount of the agent is supplied to purified water. The hydrophilic ink containing such amount of the surfactant is supplied to the ink jet recording head. Onto the recording medium, the printing is performed using the hydrophilic ink which contains the surfactant in the amount of exceeding the c.m.c. in ink. As a result, in addition to the principal features mentioned before, the function of the surfactant is effectively utilized further on the recording medium.

Anyway, as to the concentration of the surfactant: in view of increasing osmotic action, a concentration as high as possible is preferable; in view of preventing bleeding phenomenon or preservation of printing uniformity, it is preferable that the content will be greater than the c.m.c. in purified water; and in view of improving injection property and printing quality of the single dot, and reducing the load of recovered operation, it is important that a surfactant relative to ink is less than the c.m.c. in the ink.

Also, in the case of a method of color recording, in which the above features are satisfied, and also the plurality of ink employed in such a method are all satisfied by the above mentioned condition of the content, then the color reproduction is obtained in the desired condition, because of relative shift of the surfactant contained in each color ink, even if the recording is performed through the multi-layer recording process. Another feature of the invention would be found by the description on the embodiments of the invention.

DETAILED DESCRIPTION OF THE PREFERRED EMBODIMENTS

Referring now to drawings, FIG. 1 to FIG. 6(C) illustrate an embodiment according to the present invention, in which a narrow passage 8 and an opening 2 is formed which supplies ink onto the surface of a negative pressure producing material, which opposed to a partition 5 formed by a bottom surface of the ink jet cartridge.

Figure 1:
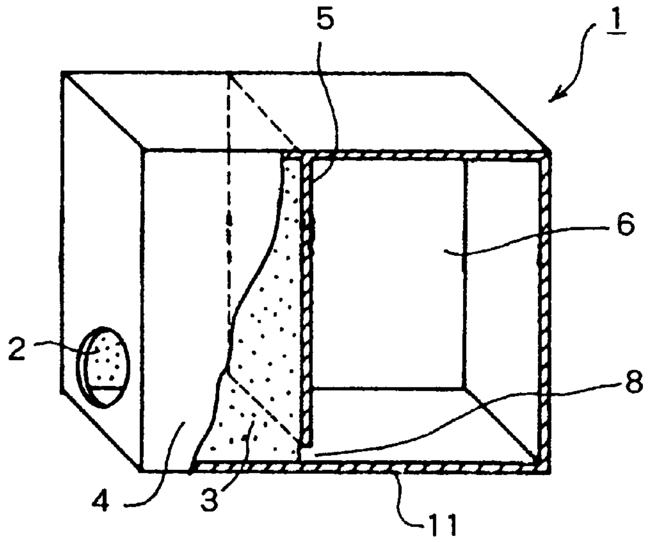
FIG. 1 is a fragmentary perspective view schematically illustrating an ink jet cartridge according to the present invention.
Figure 2:
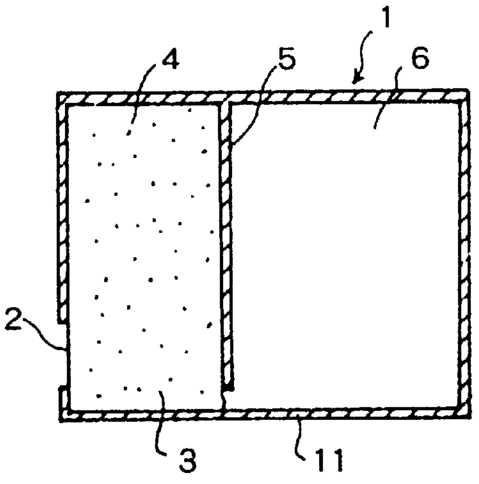
FIG. 2 is a sectional view of FIG. 1.
Figure 3:
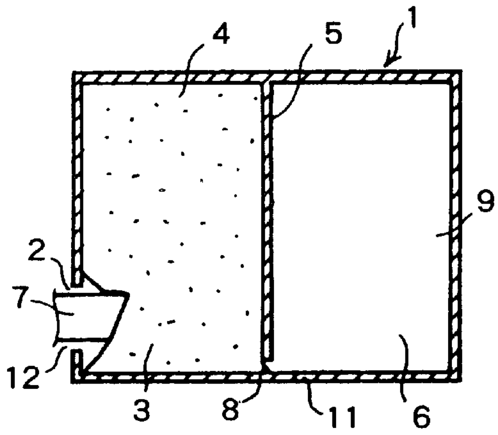
FIG. 3(A), FIG. 3(B) and FIG. 3(C) each is a sectional view illustrating how the ink jet cartridge and an ink supply vessel is connected together.
Figure 3:
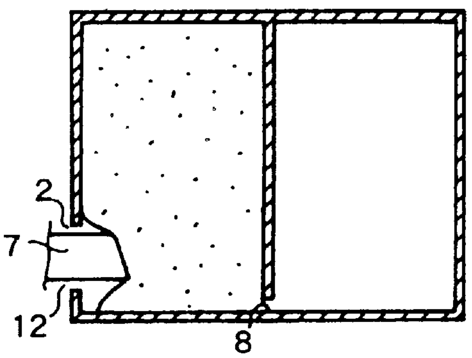
Figure 3:
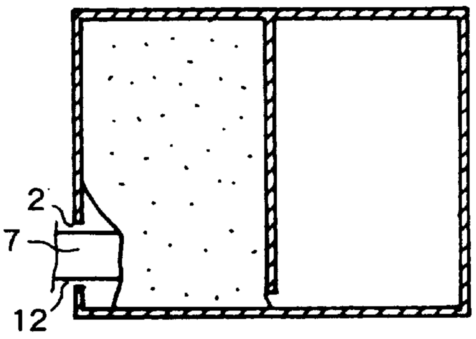

FIG. 1 illustrates a fragmentary schematic view of an ink container partially cut out, and FIG. 2 is a sectional view of FIG. 1. As shown, an ink jet cartridge body or ink tank 1 has an opening 2 positioned on one side, which is in communication with an ink jet recording head. The ink jet cartridge further comprises a negative pressure producing chamber 4, as the first container, enclosing a negative pressure producing material 3 and an ink container 6 as the second container for enclosing the ink only. The container 6 faces the negative pressure producing chamber 4 but is separate by a partition 5 therebetween, and in communication therewith along the bottom surface 11.

The ambient air is therefore supplied through the opening 2, which serves as a passage way for the air. However, it is most important matter that the ink is supplied only through the passage 8, so that it is surely supplied toward the opening 2 along the bottom surface 11. As a result, the air is replaced with the ink enclosed in the container 6 in accordance with the feeding of the ink.

A part of the negative pressure producing material 3 is positioned in its compressible area, which is adapted to be compressed and deformed by an ink supply tube 7. Therefore, it is explained how the negative pressure producing material 3 is compressed and deformed. Referring now to FIG. 3(A) to 3(C), it is illustrated a replaceable ink jet cartridge according to the invention, into which a joint member 7 is inserted, which serves as the supplier tube for supplying the ink into the ink jet cartridge, and thus the ink jet recording apparatus has turned in the operative condition. Also, on the end of joint member 7, a filter may be attached for discharging dust contained in the ink jet cartridge.

When the ink jet recorder starts operation, the ink is ejected through the orifice provided in the recording head to produce an absorbing force in the ink jet cartridge. By way of the absorbing force, the ink 9 is introduced from the ink chamber 6, through a narrow passage 8 formed between the edge of partition 5 and bottom surface 11 of the ink jet cartridge, into the negative pressure producing chamber 4, and then, through the negative pressure producing material 3 into joint member 7, and finally supplied to the recording head. Through the process, since all the passages are tightly sealed other than the narrow passage 8 which is let open, the pressure within the ink chamber 6 reduces and accordingly, a pressure difference is produced between the ink chamber 6 and negative pressure producing chamber 4. The pressure difference is continued to increase as recording operation continues. But, since the negative pressure producing material 4 is open to the air through the gap between the joint member and opening, the air is allowed to enter the ink chamber 6 through the narrow passage 8, thus the pressure difference between the ink chamber and negative pressure producing material chamber 4 is eliminated. Such an operation is repeated during the recording operation, a negative pressure having a predetermined value is always recovered in the ink jet cartridge. The ink contained in the chamber 6, is almost entirely consumed, thereby efficiency of ink consumption being improved.

On the other hand, during no recording operation, there is a capillary force generated in the negative pressure producing material 3 itself, or meniscus force produced on the interface between the ink and negative pressure producing material. Especially, when consumption of the ink in the chamber 6 is initiated, the status of ink preservation within the chamber 4 becomes generally constant, and the air collected in the ink chamber 6 is substantially in the state of reduced pressure. As a result, the pressure balance in the cartridge is extremely stabilized, thereby preventing leakage of ink from the ink jet recording head.

Figure 4:
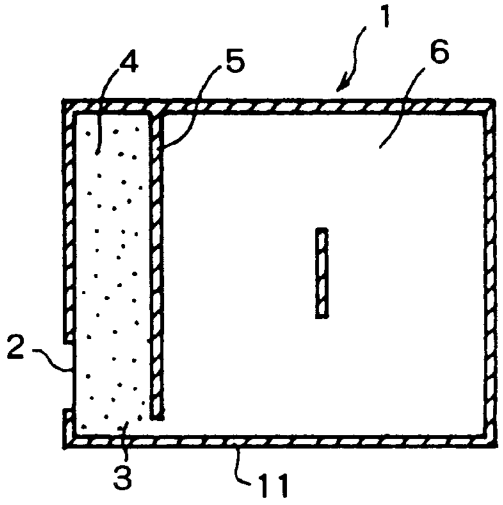
FIG. 4 is a sectional view of an ink jet cartridge according to another embodiment of the invention.
Figure 5:
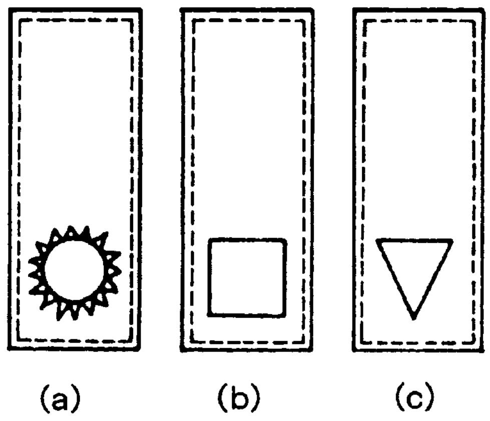
FIGS. 5(A), 5(B) and 5(C) are an elevational views of various shapes of openings.
Figure 6:
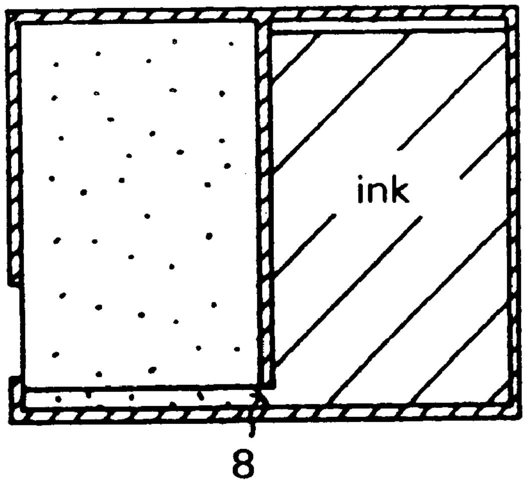
FIGS. 6(A), 6(B) and 6(C) are sectional views illustrating the positional relationship of the ink supplying portion and a narrow passage.
Figure 6:
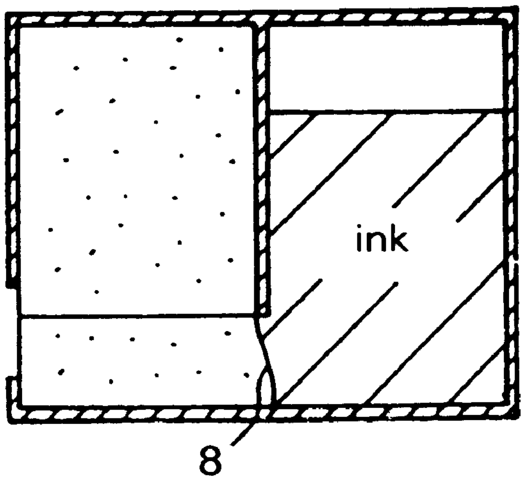
Figure 6:
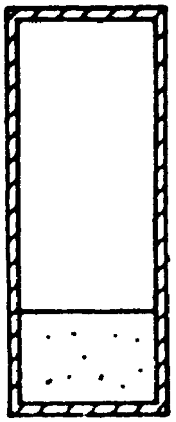

Accordingly, a construction as shown in FIG. 4 is possible, when a suitable material which produces the reduced pressure is selected according to the ink jet head to be associated, and when the chamber 4 and the chamber 6 are designed so that these have an appropriate relationship between their dimension.

Figure 19:
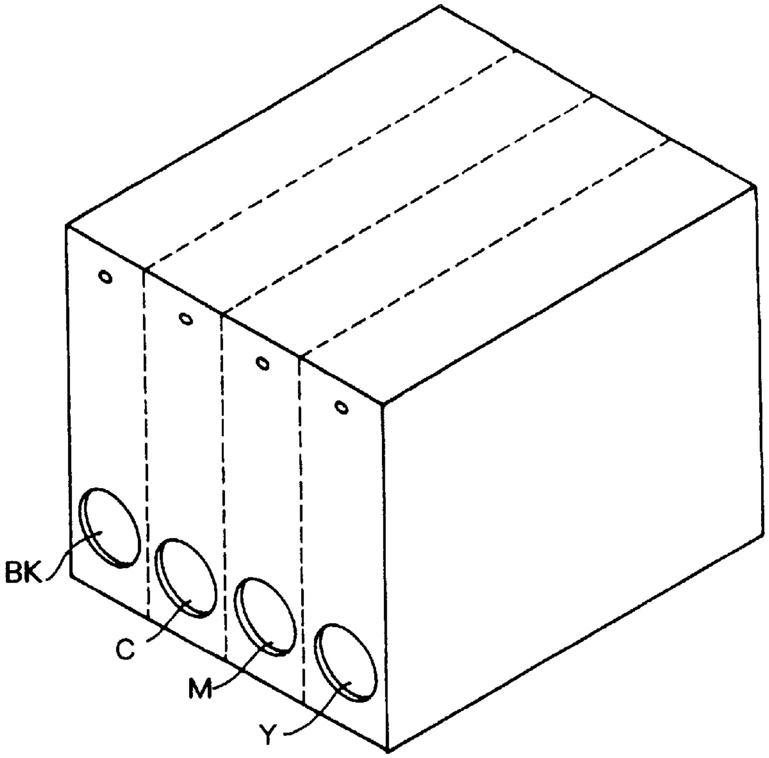
FIGS. 19(A) and 19(B) are perspective views of a color tank.
Figure 19:
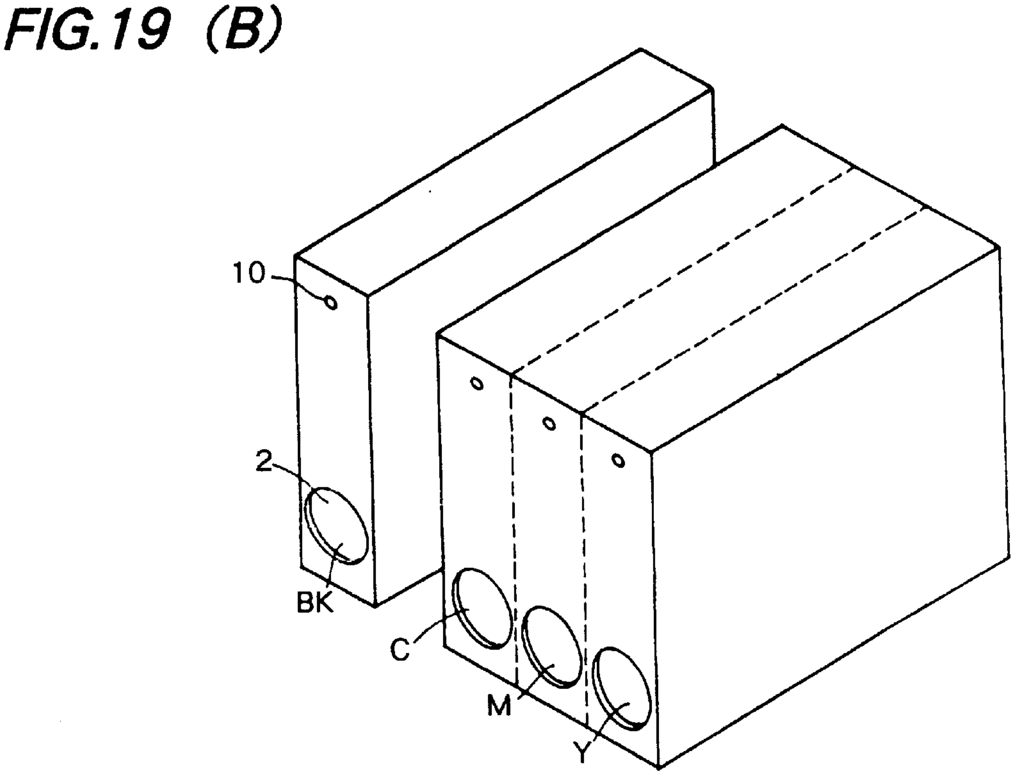

As shown in FIGS. 19(A) and (B), for the purpose of multi-color ink jet recording, each of these multi-color inks, such as of four colors including black, yellow, magenta, and cyan, may be enclosed separately in each replaceable ink jet cartridge: wherein each of separate cartridges may be combined as one body as shown in FIG. 19(A), or one for black ink of frequent use is separate from another casing including the remaining colors as shown in FIG. 19(A), or one for black ink of frequent use is separate from another including the remaining colors as shown in FIG. 19(B). The combination thereof may be selected as necessary according to the employed recording device.

For the purpose of the reduced pressure control, it is preferable to optimize, in view of the using condition, the following items including: selection, form, and dimension of the negative pressure producing material 3; shape and dimension of the partition 5; the shape and dimension of the narrow passage 8 between the partition and the bottom surface 11; the relative volume ratio of chamber 4 and ink chamber 6; the extent of insertion of joint member 7 into the ink jet cartridge, also the shape and dimension of this joint member 7; the shape, dimension and mesh of the filter; and the surface tension of the ink.

As the material for the negative pressure producing material 3, any material which is able to maintain the ink without being affected from its own weight or a slight vibration may be used, such as a cotton-like material formed of a fiber webbed in a meshed form or a porous material. Those capable of conserving ink and adjusting the reduced pressure are preferable, such as polyurethane foam or sponge. Particularly, a foam material is preferably used, as can be prepared to have a desirable porosity at the manufactured time. A foam, which is further prepared so as to be improved in porous density through thermal pressing, should be subjected to additional treatment such as washing to prevent any inadequate effect by possible decomposition substances. Also, in order to manufacture a replaceable ink jet cartridge which meets with requirements from various ink jet cartridges, the different forms of porous foam are required. In these cases, it is preferable to cut a foam material, which is not subjected to thermal pressing and has a specific number of cells, and is pressed into and secured in the chamber 4 provided for the negative pressure producing material, thereafter its porosity and capillary force are adjusted.

In such an embodiment, a gap may be formed between joint member 7 and opening 2 to introduce the air from the exterior, but not limited in such an arrangement. Any other structure or configuration may be selected for the joint member 7 and the opening 2. In the case of the member 3 formed by sponge or any other porous material, an end of joint member 7 may be tapered with respect to the inserting direction of the joint member as shown in FIGS. 3(A) and 3(B), for preventing play of joint member from the bottom of the ink jet cartridge and for maintaining and securing the abutting surface between the filter of the end of joint member 7 and negative pressure producing material 3. Since an increased amount of insertion of the member 7 is likely to cause the tapered portion to produce a crack of the member 2, a surface configuration may be selected as shown in FIG. 3(C).

An irregular surface may be provided on the outer surface of the joint member 7, but not limited in such a form. FIGS. 5(A) to 5(C) includes various forms therefor: FIGS. 5(A), 5(B) and 5(C) show each shape of groove, rectangular, and triangular, respectively. The opening 2 is preferably shaped to be formed with a gap in the extent so as not to tightly close the opening. Or, at the lower side of opening 2, that is, at the bottom side of the ink jet cartridge, the opening 2 is shaped to approach the outer surface of the joint member 7, and is open at the upper side of the opening 2.

As described above, the ink jet cartridge of the invention can be of more simple construction, as the opening 2 may also serve as an air inlet. The extent of insertion into the ink jet cartridge may be designed in taking account of each shape of the joint member, pressure reducing material, and the ink jet cartridge itself. Also, the area of the pressure reducing material which is to be pressurized and deformed may be defined, so as not to cause ink outflow and ink interruption during recording operation.

In addition to the opening 2, another air passage may be formed in the negative pressure producing material chamber 4. Such a construction is effective to provide an area of the negative pressure producing material which contains no ink near the air passage, and also effective to improve reliability over any environmental changes.

The shape or dimension of the narrow passage 8 between the edge of the partition 5 and the bottom of the ink jet cartridge 11 is not limited. Whereas, a too narrow width of any member would cause a strong meniscus force produced in relation with the ink, and, although ink leakage from the joint opening is prevented, a force is necessary for feeding ink into the chamber 4 and ink interruption is likely to occur during operation. In contrast, a too wide width of any member would cause a trouble, therefore the height over the edge of the partition should be designed to exceed the average porosity of the negative pressure producing material, preferably the porosity near the narrow passage: that is, between 0.1 mm and 5 mm, and more preferably 5 mm for achieving further stability.

Figure 7:
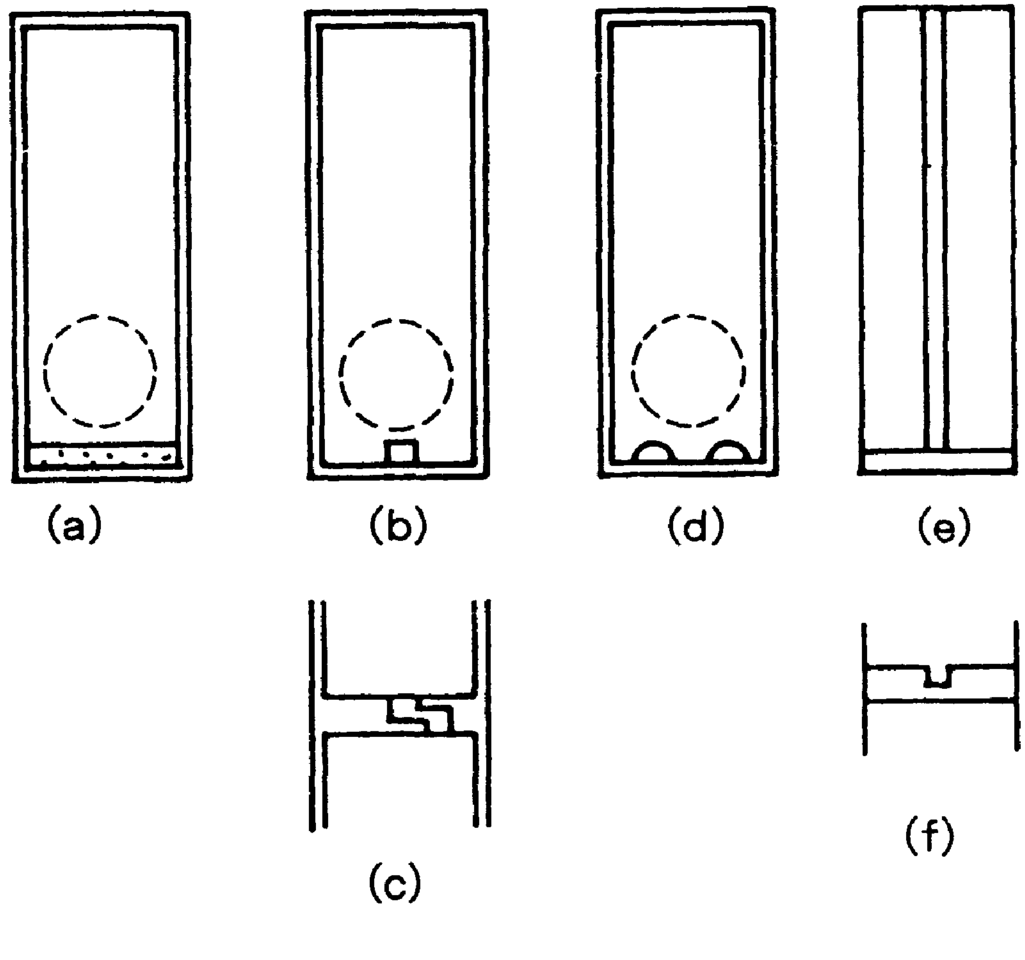
FIGS. 7(A), 7(B), 7(C), 7(D), 7(E) and 7(F) are sectional views of the narrow passage.
Figure 8:
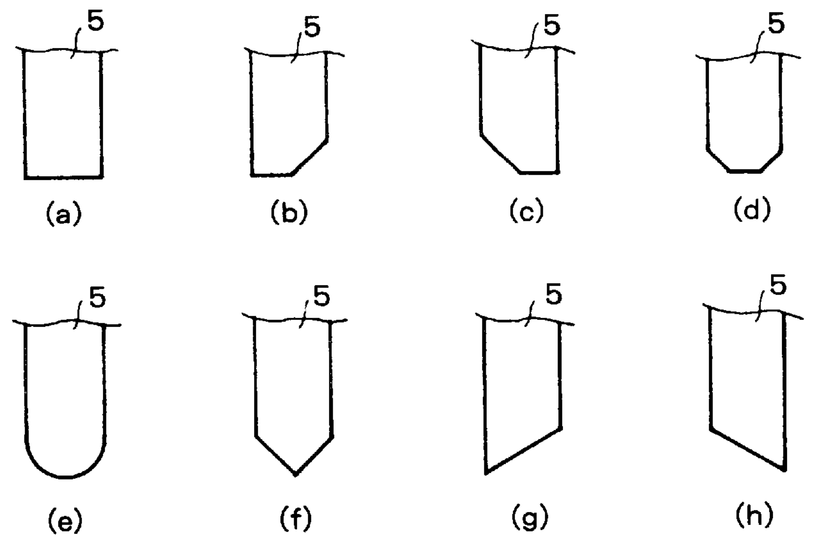
FIGS. 8(A), 8(B), 8(C), 8(D), 8(E), 8(F), 8(G) and 8(H) are sectional views of the various configurations of the partition on the narrow passage side.
Figure 9:
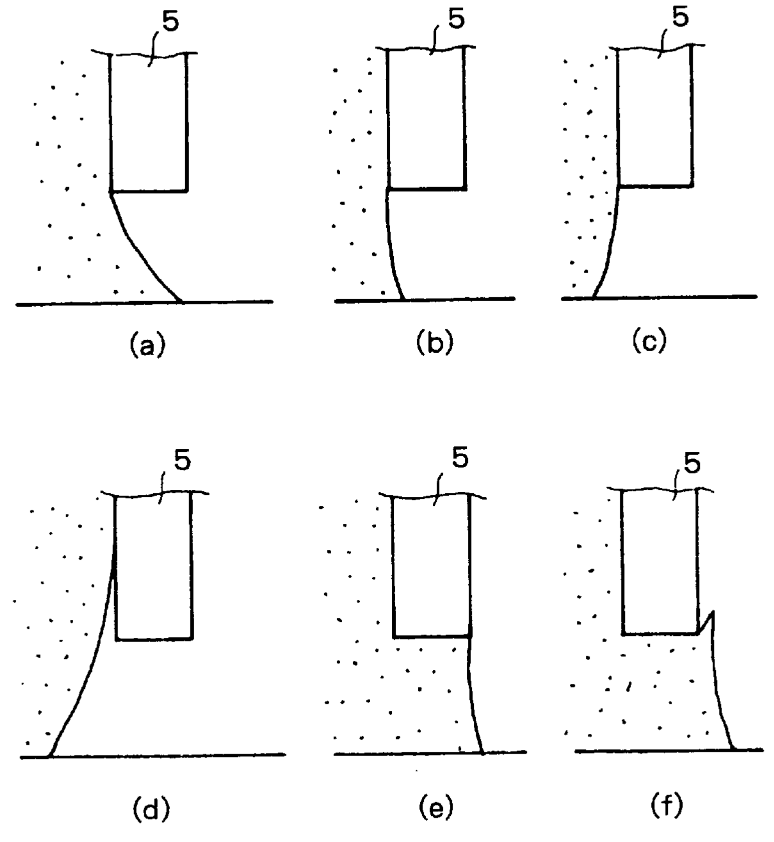
FIGS. 9(A), 9(B), 9(C), 9(D), 9(E) and 9(F) are sectional views of configurations of the negative pressure producing material.

FIGS. 7(A) to 7(F) shows various forms of the narrow passage 8: FIG. 7(A) shows a most stable form employed in the embodiment describe above, formed over the entire width of the cartridge. FIGS. 7(B) and 7(C) illustrate a narrow passage formed in the limited width of the cartridge, and formed as a curved passage, which is effective in the case of a printer having a large size, and therefore is not always used in the normal printer. FIG. 7(D) shows a plurality of passages formed as tunnels, which facilitates movement of the ink to the inner surface of the cartridge and provide centralized introduction of air which contributes the air-liquid replacement. FIGS. 7(E) and (F) shows another form of the passage, in which, in addition to the scheme in FIG. 1, a groove is formed in the partition 5 over the vertical direction. Accordingly, the gas or air reached the lower edge of the partition is effectively introduced into the ink chamber 6 through this groove to improve the recovering efficiency of the ink.

More preferably, the position of the narrow passage 8 is determined in taking account of the position of the opening 3. That shown in FIG. 6(A) is preferable in preventing ink leakage, because the edge of the partition 5 is lower than the lower end of the opening 8, and accordingly the ink retained in the material 3 is beneath the lower end of the opening 2. In contrast, that shown in FIG. 6(B) is not preferable as less effective for preventing ink leakage, because the edge of the partition 5 is higher than the lower end of the opening 8, and accordingly the ink retained in the material 3 is above the lower end of the opening 2.

Accordingly, it is advantageous for stabilized effect of the invention to design the dimension of the narrow passage 8 so as to position the lower edge of the partition 5 in the same level of or lowered from the narrow passage 2. Although depending on the shape or dimension of the ink jet cartridge itself, the dimension of the narrow passage 8 is, in practice, selected from the range between 0.1 mm and 20 mm as the maximum range. Also, the shape of the partition, although any form is selected when taking into consideration of the opening 2, several examples are shown in FIGS. 8(A) to 8(H).

Further, various forms for the structure of the interface between the partition 5 and negative pressure producing material 3 can be devised as shown in FIGS. 9(A) to 9(F). In those shown in each of FIGS. 9(A) to 9(D), the material 3 is not compressed by the edge of the partition 5, the density of the material 3 is not locally raised, and circulation of the ink and air is relatively increased, therefore, this is preferable in the case of high speed recording or color recording. Instead, in those shown in FIGS. 9(E) and 9(F), the material 3 is compressed by the edge of partition 5, and, although there can be a resistance against the air flow due to the increased density of the material 3, ink leakage or the like troubles due to a slight change of the environment can be prevented. Therefore, the selection thereof may be designed in consideration with the kind of the recorder or environmental conditions.

The volume ratio of the chamber 4 and ink chamber 6 is determined in taking account of the kind of the recorder and environmental conditions. Also, the relation with the negative pressure producing material 3 is important. To increase the using efficiency of ink, the volume of the ink chamber 6 is preferably increased, wherein the material 3 producing a sufficient reduced pressure, such as having a increased compressibility as sponge, is effectively utilized. Therefore, when taking into consideration of increasing the ability of reduced pressure production of the material 3 in accordance with increasing the volume of ink chamber 6, the volume ratio between the chamber 4 and the ink chamber 6 may be a value in the range of 1:1 to 1:3 as the optimal range in practical use.

The filter at the end of joint member 7, whose shape, dimension and mesh may be selected according to the kind of the ink jet recorder, is preferably selected as having a smaller mesh compared with the diameter of the orifice to prevent dusts likely to enter from the ink jet cartridge for preventing blinding of the nozzle of the recording head.

The filling quantity of ink into the ink jet cartridge is not limited so long as in the range of ink jet cartridge capacity. To maintain the initial reduced pressure which is held in the cartridge even after released from the product seal, although the ink chamber may be filled up to its total volume, it is more preferable the filling quantity of ink into the negative pressure producing chamber is set in the range not exceeding the limit of ink retaining ability of the negative pressure producing material 3. Such retaining ability is referred to the ability of negative pressure producing material 3 which is able to solely retain the ink when it is soaked with ink.

In an ink jet cartridge having the tightly sealed ink chamber 6, in response to the external ambient changes, such as temperature rise or atmospheric descent, especially due to expansion of the air in the ink chamber (sometimes due to expansion of ink), the ink remaining in the chamber is likely to be pressed out to cause ink leakage. To eliminate the disadvantage, it would be preferable to foresee the amount of air expansion which would be caused in the chamber 6 at possible worst ambient condition, and to provide in advance the chamber 4 with an allowance for receiving the excessive amount of ink which could be moved from the chamber 6.

Figure 10:
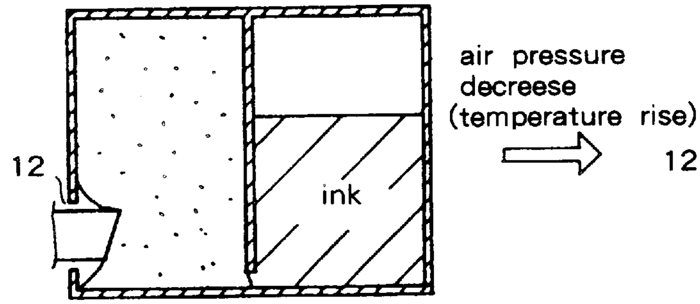
FIGS. 10(A), 10(B), 10(C) and 10(D) are sectional views of the internal state of the negative pressure producing material in accordance with the environmental variation.
Figure 10:
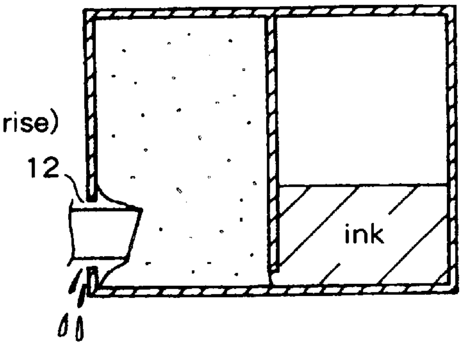
Figure 10:
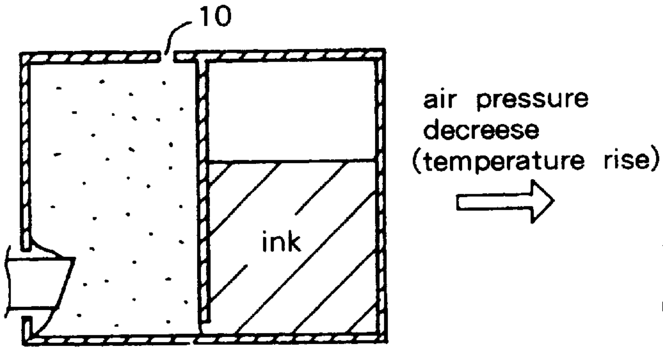
Figure 10:
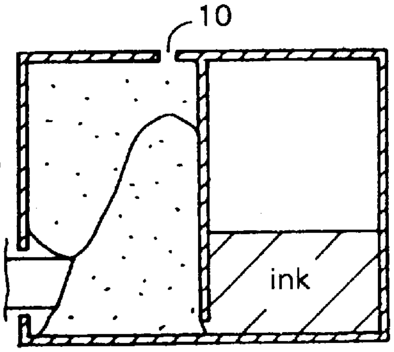
Figure 11:
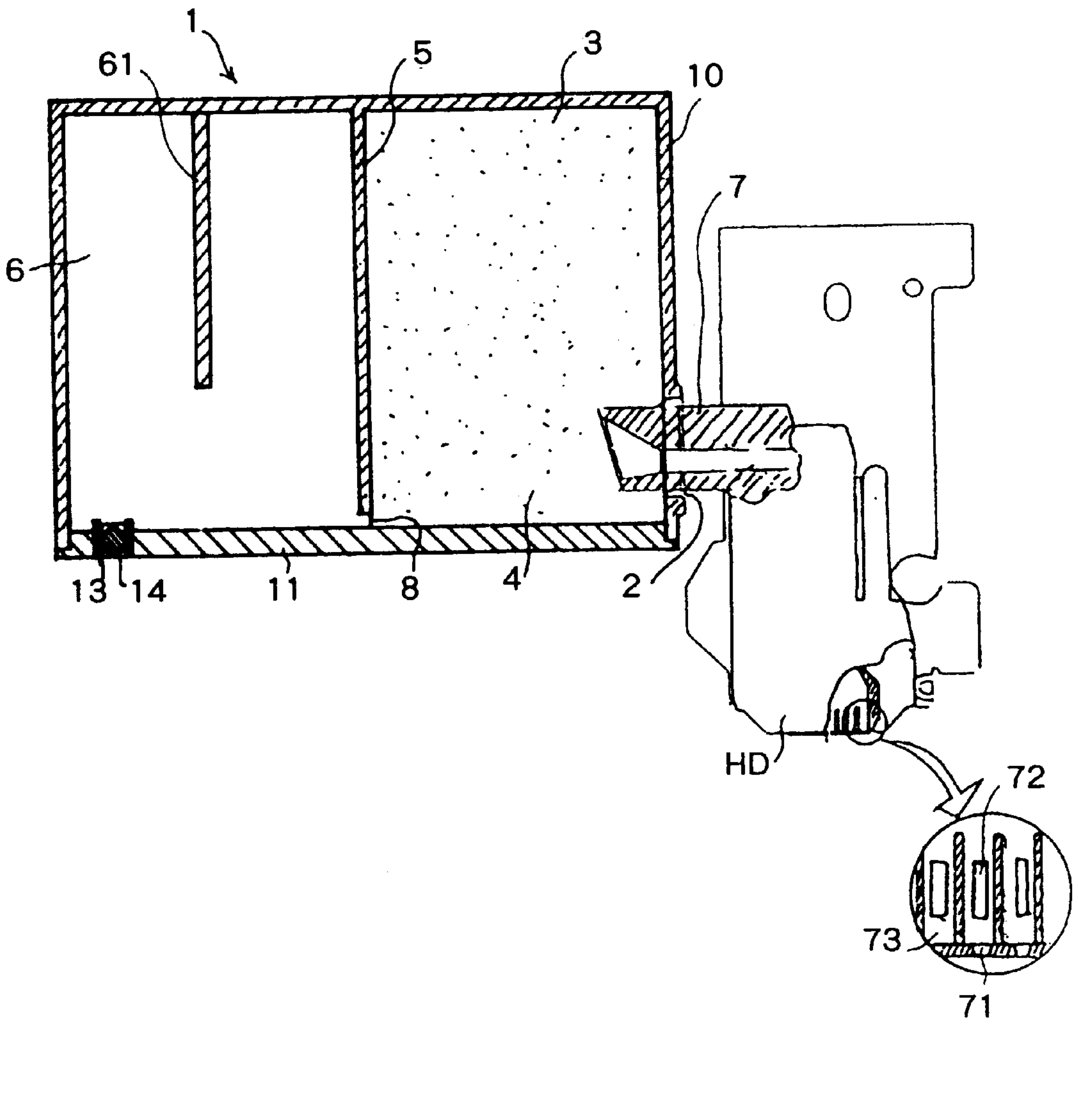
FIGS. 11(A) and 11(B) are a schematic illustration and an enlarged detail of an ink jet head of the invention.

For the purpose above, another air outlet 10 is formed, in addition to the opening 2, in the chamber 4 shown in FIGS. 10(C) and 10(D), and therefore, the ink moved into the chamber 3 due to the air expanded in the ink chamber is allowed to be introduced to the side of ambient air. The air outlet 10 may be positioned higher than the opening 2 of chamber 4, and more preferably, it may be, in addition, remote from the opening 3 in order to keep the ink flow, which occurs in the material 3 at a time of environmental changes, separate apart from the joint opening 2. The number and shape of the opening 10 may be free, but evaporation of ink is taken into consideration.

When the ink jet cartridge is solely transported, the opening 2 and/or the air outlet 10 are sealed by seal materials for preparing evaporation of ink or expansion of air in the ink jet cartridge. Such sea l materials may barrier materials, such as a single layer barrier material, or a composite barrier material, which is a composite material of multi-layer plastic films, or of such plastic films together with paper or cloth as reinforcement or with aluminum foil. The same material as that of the ink jet cartridge may be selected for the adhesive layer of the barrier and thermally fused for improve sealing ability.

For preventing evaporation of ink out of the ink jet cartridge or preventing flowing of air into the same, it is effective to seal the ink jet cartridge after removing the air from the packaging material. The packaging material may be selected also from the same material as that of the barrier material with taking account of gas penetration rate and air penetration rate. As a result, transportation of the single ink jet cartridge is carried out with highest reliability without incorporating ink leakage or the like troubles.

The material for the ink jet cartridge itself may be any of the conventional materials, but should be selected from those which would not affect or are treated so as not to affect the ink for use in the ink jet cartridge, also, productivity of ink jet cartridges will be considered. For example, an ink jet cartridge is separated into the bottom part 11 and the upper part thereabove, each of these is separately molded with synthetic resin, the negative pressure producing material is filled, and then the bottom part and the upper part are fused to be secured with each other, thus an ink jet cartridge is manufactured. By selecting a transparent or translucent material as the synthetic resin to enable the ink within the ink chamber to be visually inspected, the time for the cartridge to be replaced is readily determined through visual inspection. To make ease of the fusion setting with the seal material, a recessed portion may be provided. Further, preventing a crimp or the like on the outer surface of the ink jet cartridge may be preferable for design performance.

A method of applying either increased or decreased pressure may be used for filling the ink. Providing an ink filling inlet for either the chamber or ink chamber of the ink jet cartridge may be also preferable, as the other ink jet cartridge would not be contaminated. After ink is filled, the filling inlet may be sealed with plastic or metal material.

The replaceable ink jet cartridge of the invention may be of any construction and configuration and variation which are freely selected in the scope of the invention. As discussed above, the invention provides a replaceable ink jet cartridge improved in provided with higher reliability at single transportation, with a simple construction and with ability of being inspected as to the remaining ink liquid.

The suitable reduced pressure is maintained throughout the period ranging the initial use to the final use to meet with high speed recording, and a replaceable ink jet cartridge which is free from ink leakage even in any ambient conditions. Further, the cartridge is improved in handling facility, without incorporating ink leakage even at replacement, and no erroneous operation at the equipment into the ink jet recording apparatus.

For further improvement of stabilizing the reproduced final dot forms provided by the invention, effect of the surfactant is utilized.

The measurement of the critical micelle concentration (hereinafter, abbreviated "c.m.c.") is discussed below with reference to FIG. 38. In determination of c.m.c., a set of ink samples were prepared, which contain the same composition, but each containing a surfactant (s.a.a.) having concentration different from each other, and each sample was measured as to the surface tension, by using a surface tension measuring apparatus, made by Kyowa kaimen Kagaku Kabushiki Kaisha, Trade Name: "Surface Tension Meter CBVP-A3". Thus, the c.m.c. was defined by the saturated value, that is, the minimum value of concentration, at which the gradually increased concentration of s.a.a. will not allow the surface tension to be further lowered. In addition, the same measurement was performed in the water, and the c.m.c. value at water was also obtained.

Figure 38:
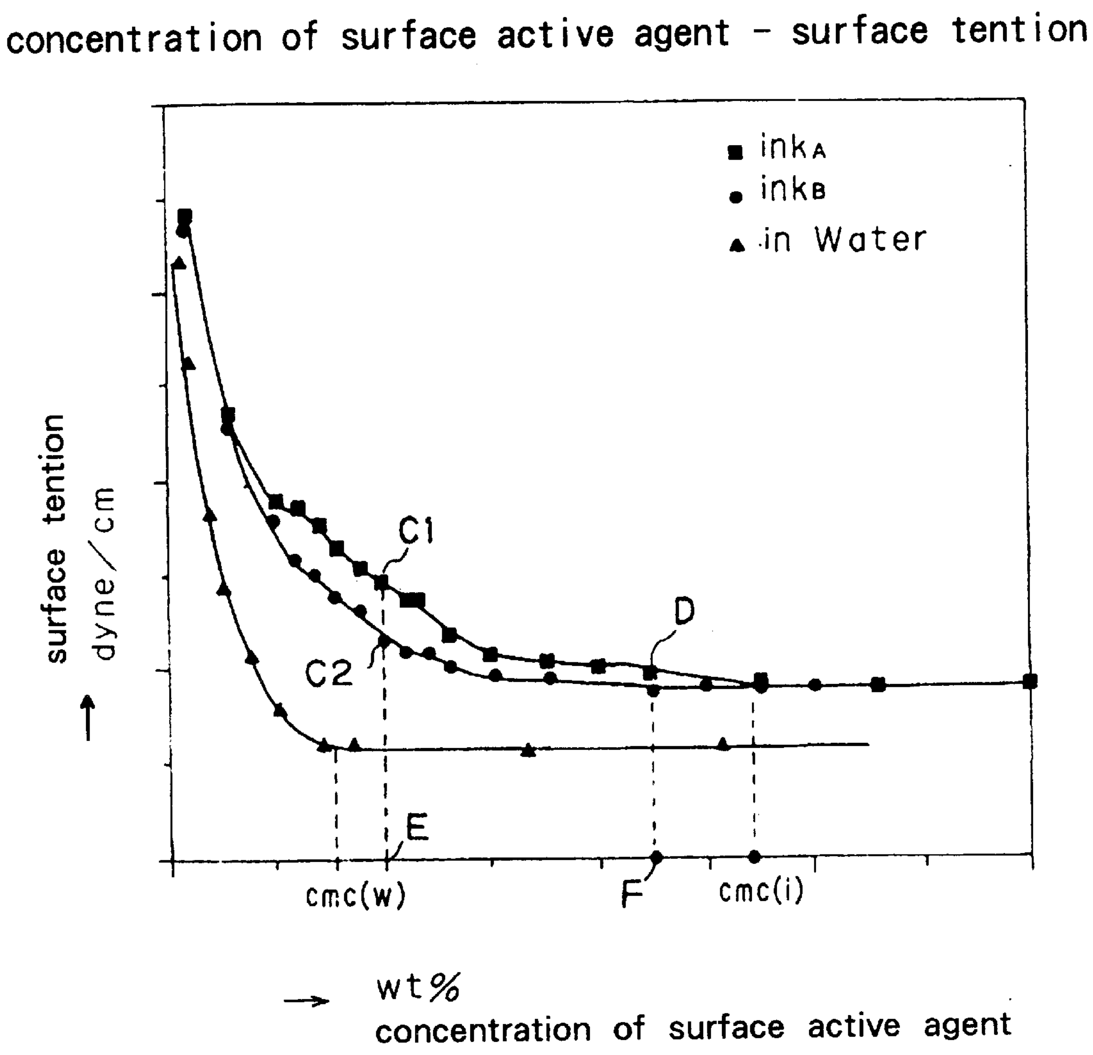
FIG. 38 is diagramatically illustrating content-surface tension relation of surfactant.

The result is shown in FIG. 38. As shown therein, there is found a some extent of difference between the c.m.c. value at water was also obtained.

The result is shown in FIG. 38. As shown therein, there is found a some extent of difference between the c.m.c. measured in the water and c.m.c. measured in the ink composition. The cause of such a difference is supposed to be the following mechanism.

In general, a color developing agent such as dye or pigment is added in the ink, and various addition materials are also added, for purposes of increasing retainability and preventing adhesibility. The majority of these materials is diffused in the solution, and is present on the gas phase interface or liquid phase interface by a certain probability. For this reason, the interface between liquid-gas and liquid-solid in the ink composition is in the condition different from that in the water, and is under the condition in which the color developer or addition materials are distributed on such interface. In water, with a lower concentration compared with that in the ink composition, the concentration is allowed to reach the c.m.c. On the other hand, in the ink composition, in the course of orientation of the surfactant on the interface, the surfactant is oriented also on the surface of the dye and materials existing on the interface under the condition different from the water, and therefore the surface tension continuously descend. Also, the surfactant is partially absorbed and consumed by the dye or addition materials which are present in the solution.

As discussed above, the surfactant is consumed to eliminate the ununiformity of the interface due to the presence of color developing agent or addition materials, and, for this reason, it is supposed that the c.m.c. in the composition would exceed the c.m.c. in the water.

On the other hand, the extremely lowered surface tension in the case of the lower concentration is also caused as the same phenomenon as in the water. As the reason therefor, it is supposed the case that the added surfactant is solved in the solution and will be oriented on the color developing agent, and alternatively the surfactant will be oriented on the color developer or addition materials present on the surface and consumed. However, it is clearly shown that the surfactant is oriented on the gas-liquid interface and sufficiently achieves its function of lowering the surface tension. Thus, it is proved that the lowered surface tension found in the case of ink composition with lower concentration of surfactant is attributed to the same mechanism as found in the water.

Within the range where the concentration of the surfactant exceeds the c.m.c., the rate of descent of the surface tension is slowed down. Such a phenomenon is supposed to show the condition that the surfactant has been sufficiently oriented on the gas-liquid interface, and therefore the surface tension has been already generally decreased to almost the lowest limit. The behavior of the surface tension in the range, from the curvature turning point to the point on which the surfactant, which becomes already unable to be oriented on the surface, is inevitably oriented on the surface of the color developer and addition materials, and, on the other hand, is also oriented on the color developer and addition materials, thus the ununiformity of the surface condition is eliminated. Based on such a process, it is supposed that the surface tension gradually decreases after passing over the curvature turning point.

Through the discussion above, it has been concluded, with a surfactant, which is added in the ink, of a sufficient amount for increasing osmotic ability, a satisfactory osmotic ability can be achieved.

Figure 39:
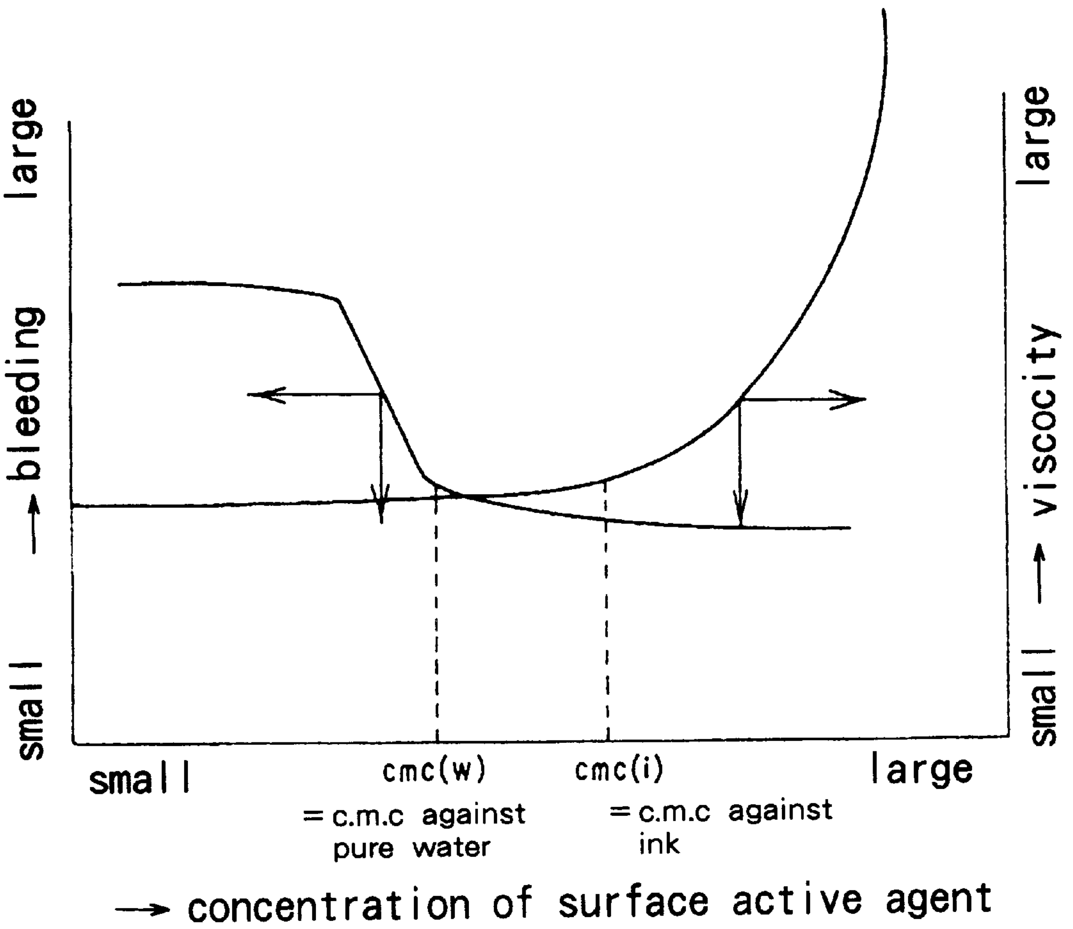
FIG. 39 is diagramatically illustrating defects versus surfactant concentration.

Next, how the concentration of the surfactant will affect the printing quality is briefly shown in FIG. 39. Therein, the "interface bleeding" is especially shown, which can provide the utmost effects on the printing quality. As discussed above, when the surfactant of a concentration higher than the c.m.c. in water is present on the surface of the ink, the surfactant existing on the interface is assumed to be oriented. Therefore, as to preventing the bleeding defect, when the concentration of the surfactant is greater than the c.m.c.(w) in FIG. 39, a sufficient effect is obtained.

As the concentration, accordingly the weight % of the surfactant relative to ink is increased, as can be seen, the viscosity of the ink is gradually increasing. This is especially remarkable when exceeding the c.m.c.(i) of the ink. This also proves the phenomenon which is discussed hereinbefore in the BACKGROUND as observed over the c.m.c.(i) of the ink. As has been discussed, the viscosity of ink which is increased by the concentration exceeding the c.m.c.(i) would cause degradation of the condition of the injected ink, and greatly affect the quality of the recorded images and on recovery of the ink jet cartridge.

On the curve of concentration versus surface tension shown in FIG. 38, it is found: the point, on which the concentration of the surfactant reaches the value of c.m.c. of ink, is the point at 3.2 wt % and 28 dyn/cm and another point, on which the concentration reaches the c.m.c.(w) of the water with the same surfactant which is added to the water, is the point at 0.7 wt % and 15 dyn/cm. Then, the point E, at which the concentration of the surfactant is 1 wt %, is selected, where the points C1 and C2, which correspond to the ink A and B respectively, both exhibit the surface tension of greater than 30 dyn/cm and of the same concentration. As may be understood by the FIG. 38, the overall concentration is in the range less than the c.m.c. for ink plus c.m.c. for water. Accordingly, a color recorded image using only the ink A and B with the concentration corresponding respectively to C1 and C2 should be a preferred embodiment of the invention.

Since the point D by the ink A at concentration F is adjacent the c.m.c.(i) of the ink, the property after ink injection can be changed in the recording environment formed by controlled heating means at 200° C., and recording ability on the recording medium can be attained to that of over the c.m.c.(i) of the ink.

Embodiments of the ink in use for ink jet recording are described hereinafter.

Embodiment 1

The measuring unit is weight percent unless otherwise specified.

| | Embodiment | Comparison | |
|---|---|---|---|
| | 1 | 2 | 3 |
| Solvent: | | | |
| glycerin | 5.0 | 5.0 | 5.0 |
| thiodiglycol | 5.0 | 5.0 | 5.0 |
| Surfactants: | | | |
| acetylene glycol ethylene oxide addition product (Trade name: Acetynol EH) | 1.0 | 0.5 | 5.0 |
| Stabilizer: urea | 5.0 | 5.0 | 5.0 |
| Dyes: black/ C.I. Feed black 2 | 4.0 | 4.0 | 4.0 |
| Yellow/ C.I. Direct yellow 86 | 2.5 | 2.5 | 2.5 |
| Cyane/ C.I. Direct blue 199 | 3.5 | 3.5 | 3.5 |
| Magenta/ C.I. Direct red 227 | 3.0 | 3.0 | 3.0 |
| Balance: water | | | |

Four inks mixed by above dosage, each agitated for 2 hours at room temperature, filtered using 0.22 micron holed filter, made by Sumitomo Denki Kogyo, Trade name: Fluoro Pore Filter, and were tested. bleeding produced after printed with the above ink, and allowance against the time of kept unused were evaluated.

The ink used in Embodiment 1 has the composition featured by the invention: the concentration of the surfactant is not less than the c.m.c. in purified water, and not exceed the c.m.c. in the ink. Each Comparison ink was used as an object for showing the effect of the invention, wherein the concentration of the surfactant is less than the c.m.c. in purified water for Comparison 1, and less than the c.m.c. in the above ink composition for Comparison 2.

The ink was evaluated for interface bleeding, the possible time to be kept unused and so on. For the printing quality, the copying paper, Canon NP dry paper was used. As a printer, a color ink jet printer, trade name: Canon BJC-820J, in which the ink is injected by way of thermal bubbling, was used.

1) Dot Shape

Using the above ink, printed 300 dots so as not to be contacted to each other, after dried for 24 hours at room temperature, examined by a microscope for the number of dots of incorrect form, and irregular whose percentage was counted according to the following standard:

Circular symbol: less than 10%

Triangular symbol: 11 to 50%

Cross symbol: 51% or more.

2) Ability of Recovery Evaluated by the Time of Being Kept Unused

In practical printing, not always all the nozzles are used, sometimes several of them being kept unused for a long time during printing. From the tips of such unused nozzles, evaporation of the ink solvent or increase of viscosity tends to cause the tip to be clogged with the ink having its solvent lost due to evaporation, which can cause erroneous printing. Although with how long time of being kept such defective printing would be produced is difficult to generally determine, it is often largely dependent on the environment and the ink used in the case of the same head. Hence, the ink containing a highly viscous unvolatile components would be rapidly high viscous, and be caused to be difficult to eject. Therefore, the high viscous ingredients therein should be as few as possible.

Generally, for preventing the above defective printing, for all nozzles or ununsed nozzles, injection operation is let performed with a constant timing for their recovery. A frequent repetition of such a recovery action will cause the delay of printing, increase of ink consumption, and should be discarded. Therefore, it is necessary to determine with how long time interval such an action should be taken, with taking into account of the combination of the ink with the head practically used.

For the purpose above, the cartridge is filled with each ink. The first printing is performed with all nozzles, then the printing is interuppted for a predermined time interval, keeping nozzles waiting uncapped, and thereafter restarting printing. The maximum period of time, during which no visible defective print occurs, was used as the time for evaluating the time duration after which a recovery action becomes necessary. The evaluation was made in accordance with the following standard, and the result was shown in TABLE-1:

Circular symbol: exceeding 60 seconds,

Triangular symbol: between 30 and 60 sec. and

Cross symbol: less than 30 sec.

3) Blot Between Different Colors

Figure 40:
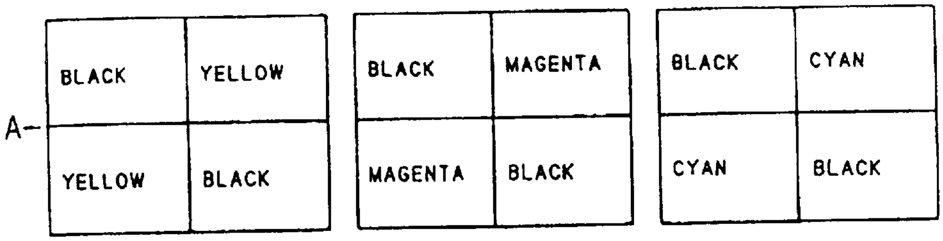
FIGS. 40(A), 40(B), 40(C) and 40(D) schematically illustrate the experiment of defects between different colors.
Figure 40:
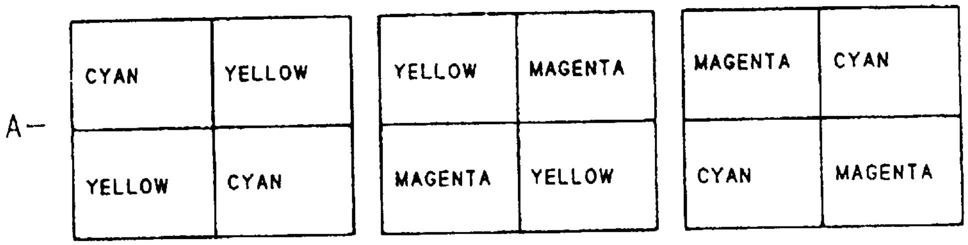
Figure 40:
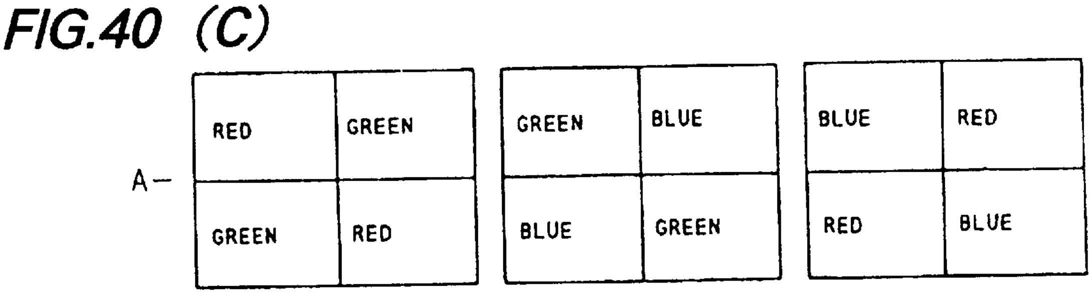
Figure 40:
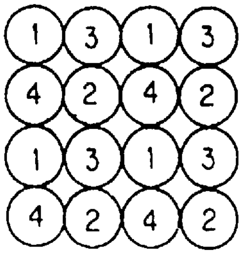

A color sample, in which the adjacent different colors were present as shown in FIGS. 40(A) to 40(C), was printed through a single scanning to print the area A, and blot was observed between two colors each selected from the following groups, which were printed one upon another, and resulting colors were red, blue and green. The colors were selected such that: one from the group of black, cyan, magenta and yellow; and the other from that including cyan, magenta and yellow.

Evaluation therefor was:

Circular symbol: no bleeding observed between all the colors,

Triangular symbol: bleeding observed on the boundary between any of red, green and blue, when ink was of enough quantity, and Cross symbol: bleeding was observed on almost all the boundaries.

d) Uniformity of Over Surface Printing

With concentration of 100% of ink strike quantity, over surface printed portion was inspected for color uniformity;

Circular symbol: uniform and even,

Triangular symbol: color unevenness remarkable at fiber densed area of paper, and Cross symbol: color unevenness over entire surface.

The result is Shown in TABLE-1.

TABLE 1

| ITEMS OF EVALUATION | Embodiment-1 | Comparison-1 | Comparison-2 |
|---|---|---|---|
| (1) DOT SHAPE | ○ | X | Δ |
| (2) TIME CAPABLE OF KEPT UNUSED | ○ | ○ | X |
| (3) BLEEDING | ○ | X | ○ |
| (4) COLOR UNIFORMITY | ○ | X | ○ |

TABLE-1 shows: Remarkable effect of bleeding prevention owing to the increased osmosity is found in the Embodiment 1 and Comparison 2, each of which contains a surfactant in the amount of exceeding c.m.c. in purified water. But, somewhat fewer bleeding phenomenon and somewhat improved uniformity are found in the resulting printed matter using the ink of Comparison 2 than that of Embodiment 1. However, overall evaluation has been determined the same to each other, because: as to the stepped bleeding and uniformity, the Embodiment 1 and Comparison 2is improved than Comparison 2; there is only a slight difference between Embodiment 1 and Comparison; and the level of Embodiment 1 is the level of no problem in practical use.

As to the single dot shape in the case of Comparison 2, in which there are sub drops (satellite) produced on injection of the main drops, the number of defects increases in comparison with Embodiment 1.

Embodiment 2

The ink in this Embodiment 2 and thereafter are those which contain a surface active agent in the following manner: that, using a surface active agent, whose content is extremely near the c.m.c. of the ink, the ink is condensed by evaporation of the solvent or water during the ink flying or process of fixing, accordingly, the concentration of the surface active agent in the ink turns to exceed the c.m.c. in the ink. Thereby, it is advantageous that the ink still maintained in the head may be treated as containing the surface active agent in the amount of not exceeding the c.m.c. in the ink. Further, in the osmotic step of ink, the concentration has already become to exceed the c.m.c. in the ink the defect of bleeding or the like is prevented to improve the dot quality.

Hereinafter, the embodiment is described with reference to FIG. 44, which diagramatically illustrates how the concentration of the surface active agent changes.

At first, by evaporation of water, temperature is conditioned and raised in the head to a predetermined temperature. The ink is injected with the concentration of Ci, as shown if in FIG. 44, and is condensed to Ck until the ink is reached on the surface of recording medium, then further is condensed on the medium due to evaporation of water to finally reache the critical micelle concentration Cc.m.c. At this moment, the surface tension of the ink reaches its minimum value, and the adsorption speed reaches the maximum value. When the final concentration Ce is reached, adsorption of ink drops into the medium is finished.

Figure 46:
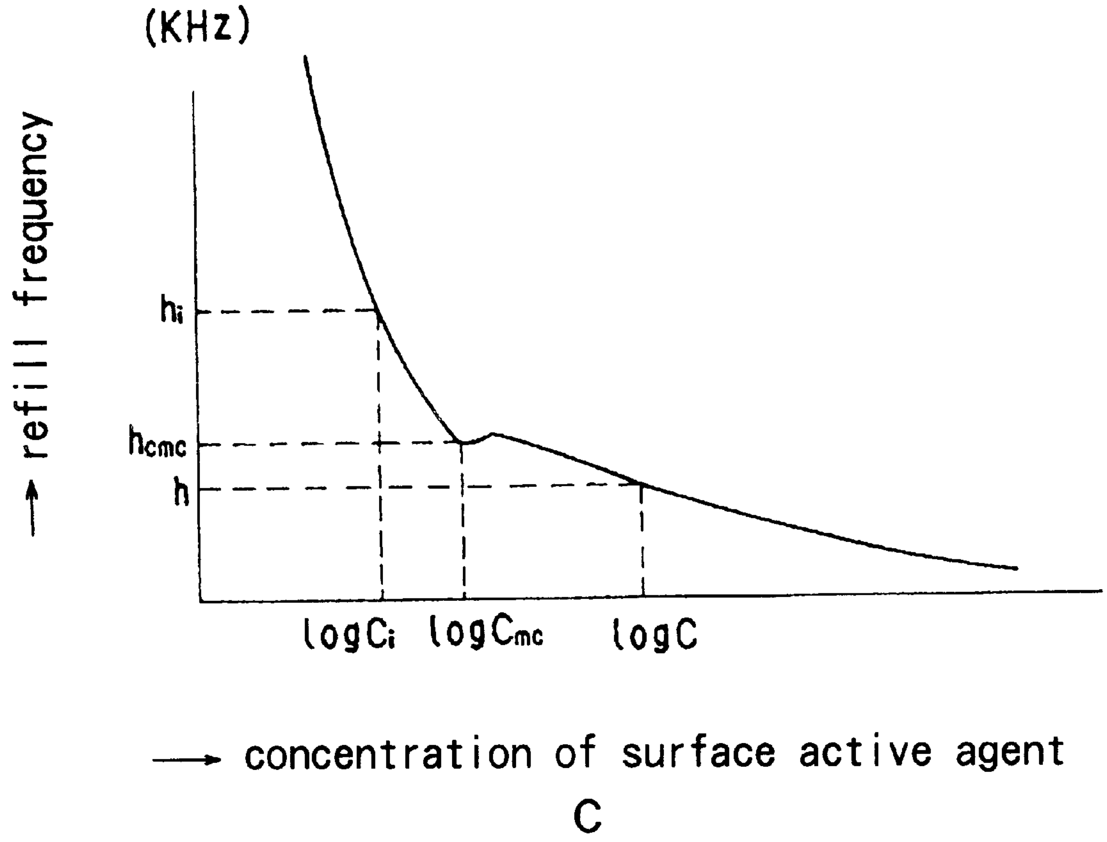
FIG. 46 is illustrating the surfactant concentration versus refill frequency.

FIG. 46 shows the injection property of the head. As found by FIG. 46, as the concentration of surfactant increases, the decrease of surface tension and increase of viscosity cause the refill frequency to be rapidly lowered. Under the concentration Cc.m.c. also, the decrease of refill frequency is observed due to the increased viscosity, when the concentration of surfactant is increased.

Four color inks mixed by the dosage above were each agitated for 2 hours at R.T., filtered using the filter, Sumitomo Denki Kogyo K. K., Trade name: Fluoro Pore Filter, and tested. Blot and printing quality were evaluated on the printed product, using the above ink, by changing the driving frequency for the head. Other than refill test, with the above mentioned standard, the product was evaluated.

Refill Property

Refill of ink for the nozzle under printing was determined based on printing condition.

Circular symbol: 100% broader area printing is possible without trouble,

Triangular symbol: between 30 and 60 sec. and

Cross symbol: less than 30 sec.

To further another Comparison 3 was added, in which the concentration of surface active agent exceeds the c.m.c. in the ink. TABLE-2 shows the result.

As it has been found from TABLE-2, refill was not in time above 5.5 kHz in Comparison 3. In contrast, the refill was possible even at 6.0 kHz in the case of Embodiment 2. As to blot, not so remarkable difference was found as both Comparison 2 and Embodiment 3 have sufficient osmotic speed.

In the case of the composition of Embodiment 2, the c.m.c. in ink of the surface active agent employed is low, and the change in the course from below to above the c.m.c. in the ink is extremely remarkably found. Therefore, it is possible that the conversion from below to above the c.m.c. in the ink can be within the time until reaching the medium surface and only by evaporation of water content from the surface, and therefore, advantageously, not any supplemental sovlent is necessary.

Also in the case of Embodiment 3, for increasing evaporation of water content and low boiling point solvent, the temperature is conditioned and raised in the head. Evaporation of water content advances in the same manner as Embodiment 2, but the c.m.c. of the surface active agent employed here is higher. In this case, it is no longer possible to completely achieve the conversion from below to above the c.m.c. in the ink within the time until reaching the medium surface and by evaporation of water content from the surface. For this reason, isopropyl alcohol which is of low boiling point is added to accelerate condensation.

In other words, at the time of reaching the medium surface, owing to evaporation of water and low temperature solvent by heating as well as the rapid change of surface condition due to injection and arrival of drops, ink drops, at the time of their arrival at the surface, are in the unstable condition of a solution, such that the surface active agent-water system which exists in the interior and on the boundary surface has not yet reached the equiliblium condition. Therefore, such an ink is supposed to have no osmotic ability which an ink should originally have. Starting from such a transient state, the solvent having low boiling point is continued to evaporate from the ink, and concentration of the surface active agent increases. After arriving at the medium, the ink reaches over c.m.c., and its osmotic ability is increased.

Also, in parallel with the above, another phenomenon is supposed to be produced that a solvent having a low surface tension and low viscosity is absorbed by the printing medium, and concentration of surface active agent on the medium rises. By utilizing such property, a greater concentration change can be obtained. Comparison 5 is the case the low boiling pt. solvent is not added.

As described, by adding a solvent having low boiling point, low viscosity and good affinity to the paper, and by allowing a part of solvent to evaporate and to be absorbed by the paper, accordingly by increasing the concentration of ink on the paper, it is possible to provide the same effect as Embodiment 2.

Also, there are some of the solvents, which may behave as surface active agents, increase viscosity, and lower the surface tension. These solvents are not preferable, as these will affect the behavior of ink in the head. The most preferable solvents are those which would raise the viscosity but in only a few extent, and lower the surface tension but at only a few extent.

| | Embodiment | Comparison | |
|---|---|---|---|
| | 3 | 4 | 5 |
| Solvent: | | | |
| glycerin | 5.0 | 5.0 | 5.0 |
| thiodiglycol | 7.5 | 7.5 | 7.5 |
| Low boiling point solvent: | | | |
| isopropyl alcohol | 5.0 | 5.0 | 0.0 |
| Stabilizer: urea | 7.5 | 7.5 | 7.5 |
| surfactants: | | | |
| acetylene glycol ethylene oxide addition compound (Trade name: Acetynol EH) | 1.9 | 4.0 | 1.9 |
| Dyes: black/ C.I. Feed black 2 | 3.8 | 3.8 | 3.8 |
| Yellow/ C.I. Direct yellow 86 | 2.5 | 2.5 | 2.5 |
| Cyane/ C.I. Direct blue 199 | 3.5 | 3.5 | 3.5 |
| Magenta/ C.I. Direct red 227 | 3.5 | 3.5 | 3.5 |
| Balance: water | | | |

Result shown in TABLE-2 below.

TABLE 2

| Drive frequency | Evalu. Items | Embodiment -2 | Comparison -3 | Embodiment -3 | Comparison -4 | Comparison -5 |
|---|---|---|---|---|---|---|
| 3.0 kHz | Refill | ○ | ○ | ○ | ○ | ○ |
| | Bleed. | ○ | ○ | ○ | ○ | ○ |
| 5.5 kHz | Refill | ○ | ○ | ○ | Δ | ○ |
| | Bleed. | ○ | ○ | ○ | ○ | ○ |
| 6.0 kHz | Refill | ○ | Δ | ○ | Δ | ○ |
| | Bleed. | ○ | ○ | ○ | ○ | ○ |
| 6.5 kHz | Refill | Δ | X | Δ | X | Δ |
| | Bleed. | ○ | ○ | ○ | ○ | Δ |

TABLE-2 shows the results of bleeding and refill frequency tests simmilarly with Embodiment 2. To accentuate the effect of Embodiments, Comparison 4 is listed, added with over the c.m.c. of surface active agent. As shown, in Comparison 4, refill is not in time at 5 kHz, while refill property is good even at 6.0 kHz in Embodiment 3.

Further, preferable embodiments of ink cartridges are described filled with ink of the invention in FIGS. 11 to 37.

FIG. 11(A) is a sectional view of an ink tank, comprising a body enclosing a minor partition 61 and a partition 5. An absorbing member 3 as a reduced pressure creating member is filled in a section having a opening 2, and a bottom plate or closure 11 is attached. FIG. 11(A) further shows a recording head HD connected to the ink cartridge. The ink cartridge 1 is enclosed by attaching a bottom plate 11, at the same time, a narrow passage 8 is formed between the edge of partition 8 and bottom plate 11, and an air communication outlet 10 is formed on the same wall where the opening 2 is formed.

Recording head HD is connected through a joint member 7 to the ink cartridge. Joint member 7 has its inner end inclined so that the upper side thereof extends ahead. The ink passage within the joint member is shaped as a horn opened upwardly, which enables to adequately introduce the ink from the absorber to the head.

The ink jet recorder is constructed in the form, in which is provided with a heating element 72 for generating thermal energy utilized to inject the ink from the injecting hole 71 of nozzle 73, as shown in FIG. 11(B), and a recording head HD is of the form to cause a phase transition of the ink by thermal energy. Further, by the stabilized performance of ink supplement, recording with high density and high precision is achieved especially in color recording.

The invention provides a replaceable ink cartridge with high reliability at its single conveyance, a simple construction, and also with ability of detecting the remaining ink in the ink cartridge.

A suitable reduced pressure, that is, the lowered pressure is maintained in the ink cartridge, which contributes to perform the high speed recording, especially preventing ink leakage.

The ink cartridge is also provided with handling facility, and would not incorporate ink leakage also at replacement of the ink cartridge.

As to manufacture of the ink cartridge, the reduced pressure creating reservoir 4 and ink reservoir 6, in communication with each other through a narrow passage 8, are integrally formed. Ink is fed from an opening 13 of bottom plate 11. After being filled in reservoir 6, the ink is fed to the relatively a greater part of the reduced pressure creating member 4. The reduced pressure creating member 4 has the area adjacent the air outlet 10, which is kept without being fed with ink. Thereafter, the opening 13 is sealed by a ball 14, and opening 2 and air outlet 10 are also sealed with the same or different seal member.

Figure 12:
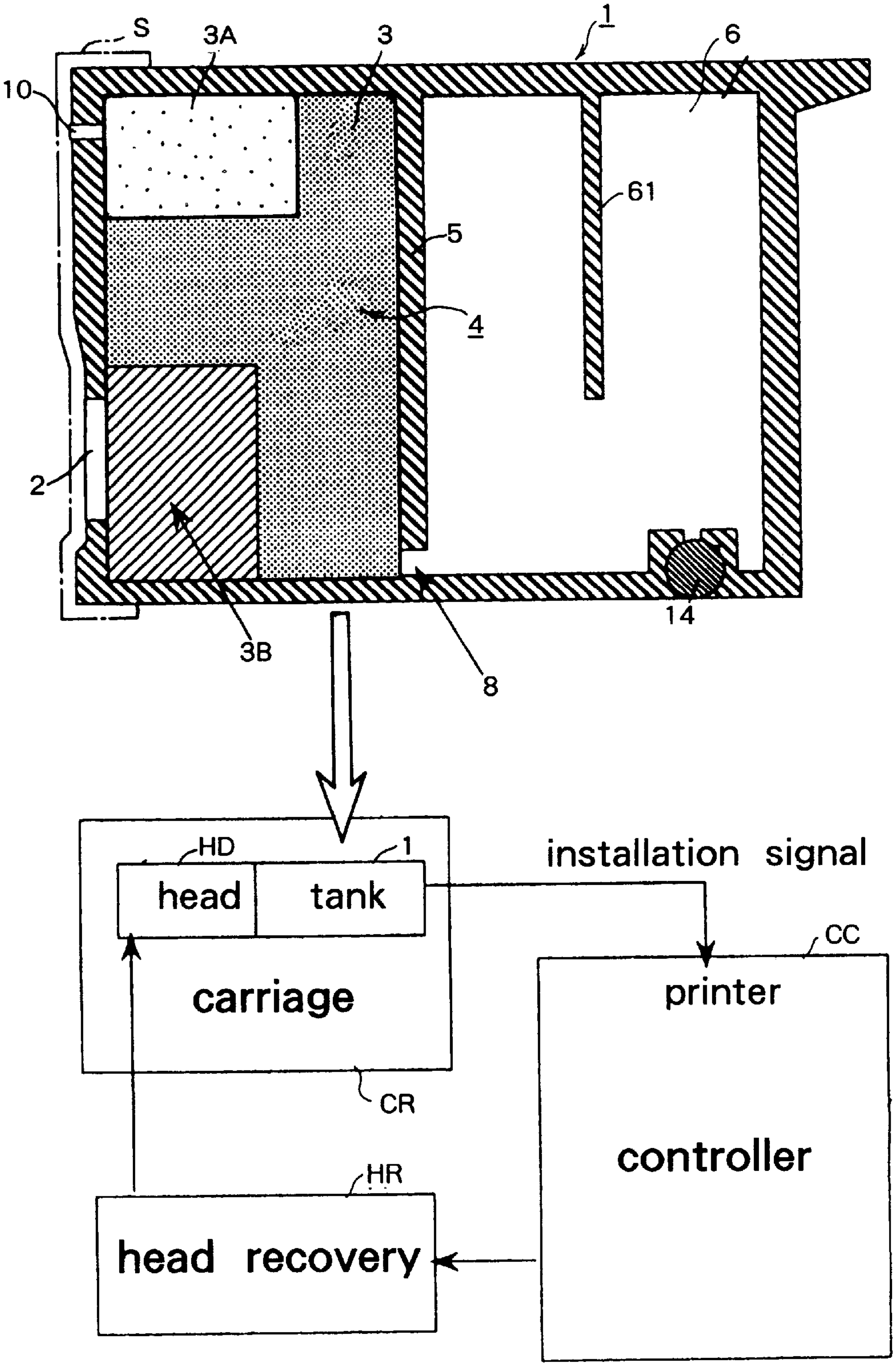
FIG. 12 is a schematic illustration of an ink jet cartridge of the invention and an ink jet printer using thereof.
Figure 13:
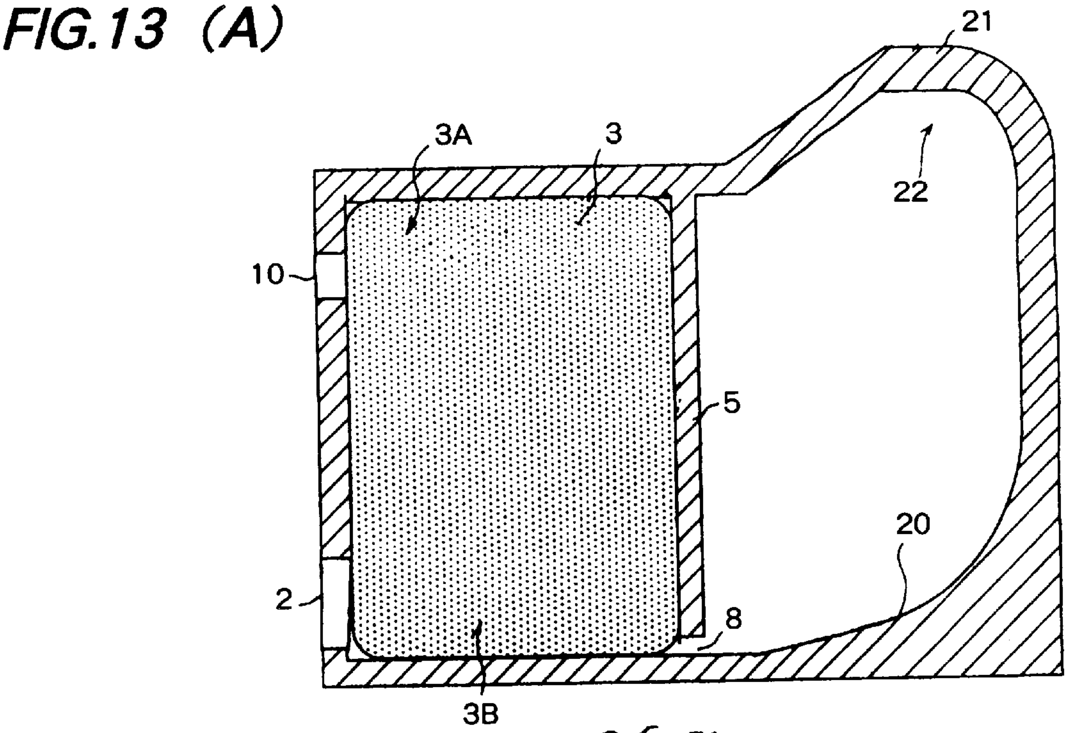
FIGS. 13(A), 13(B), 13(C) and 13(D) are views of a modified embodiment.
Figure 13:
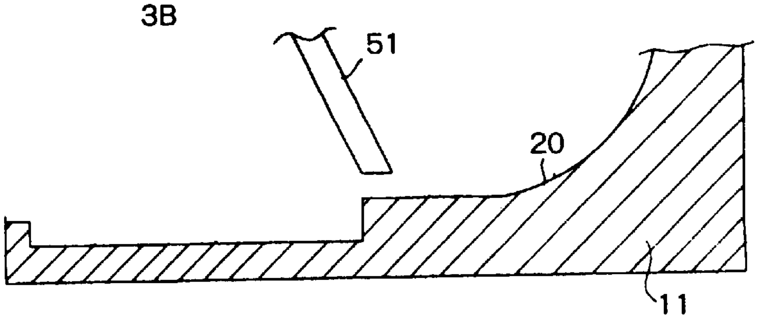
Figure 13:
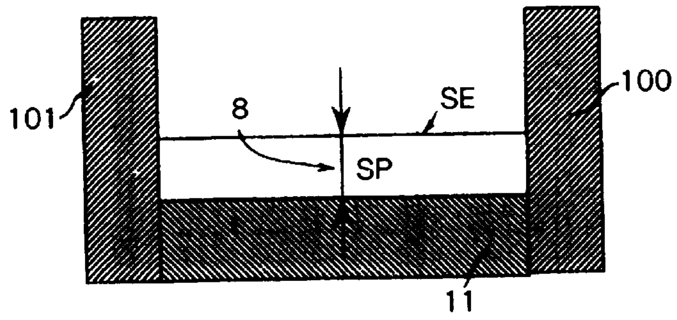
Figure 13:
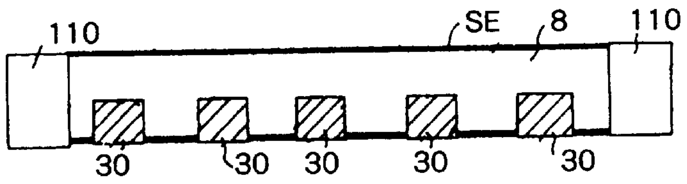
Figure 14:
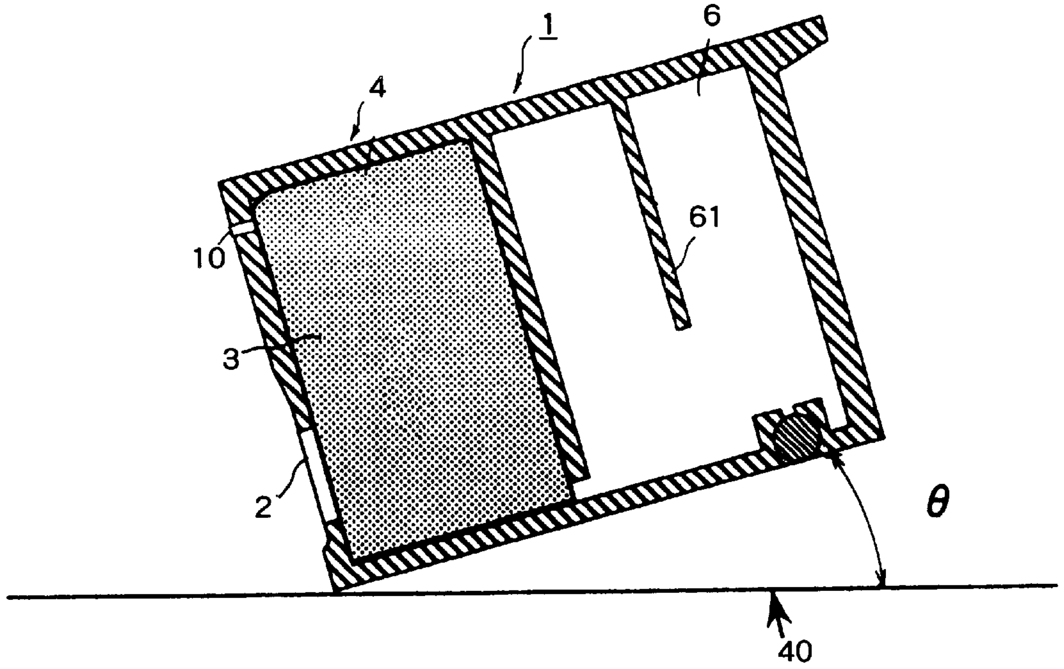
FIGS. 14(A) and 14(B) are sectional views illustrating the range of inclination of the ink jet cartridge in use.
Figure 14:
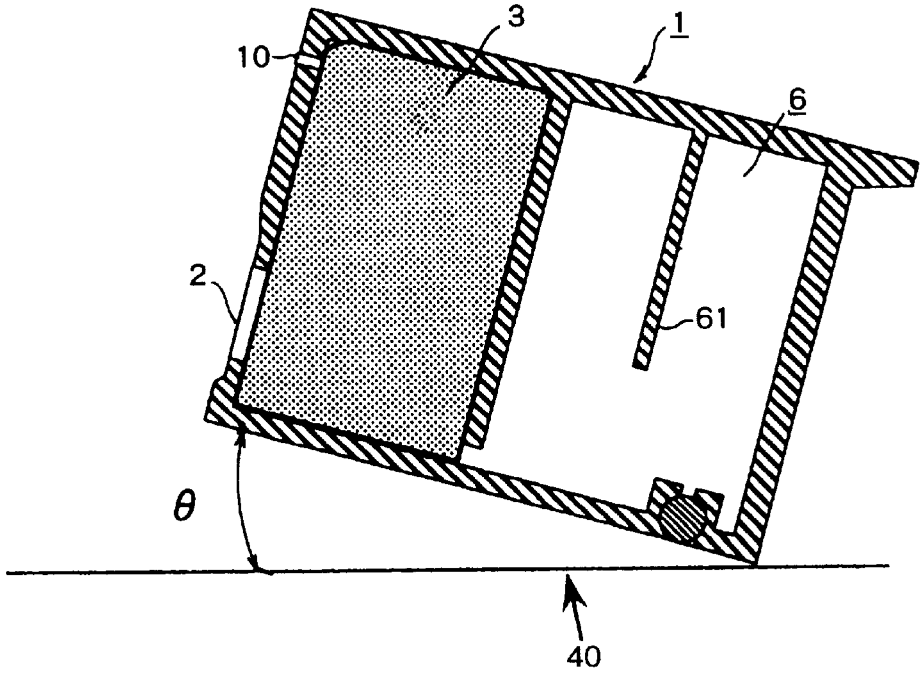
Figure 15:
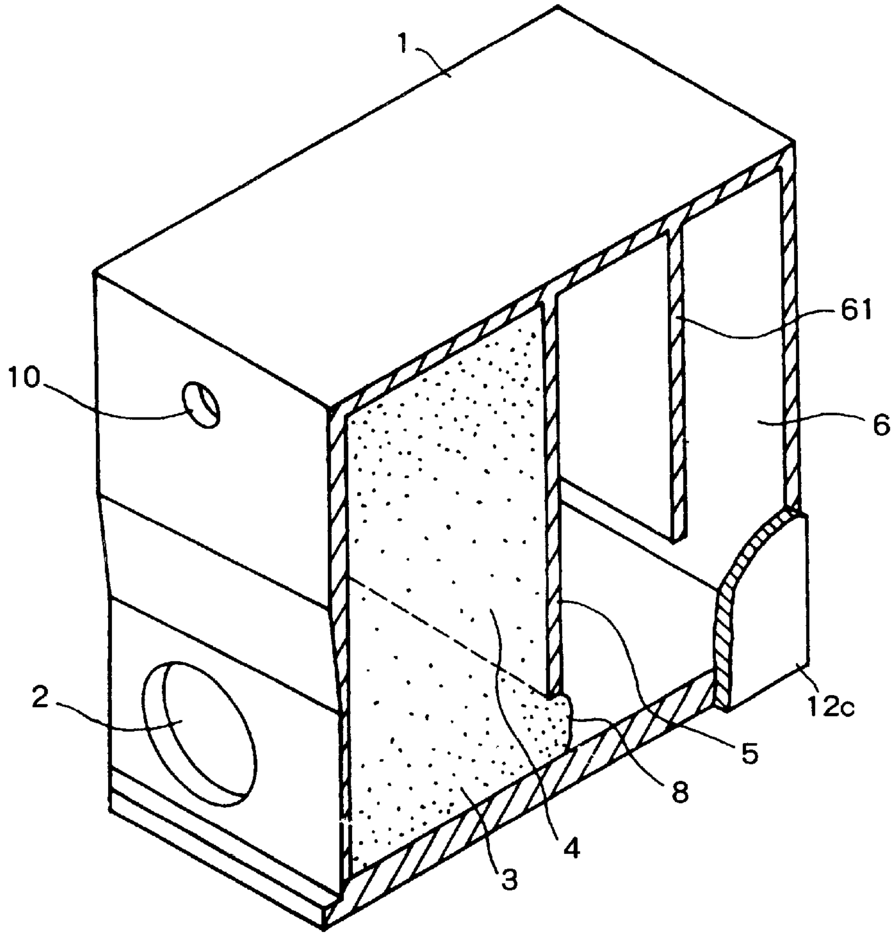
FIG. 15(A) is a perspective sectional view and FIG. 15(B) is a side sectional view of an ink jet cartridge.
Figure 15:
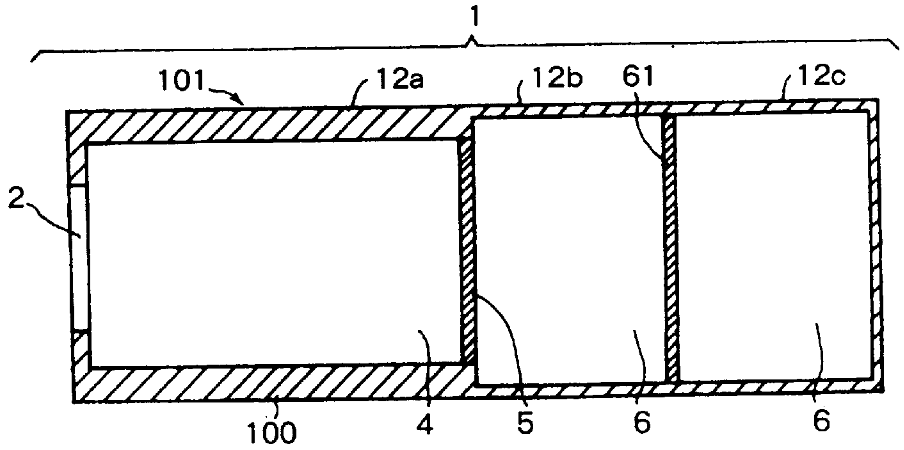
Figure 16:
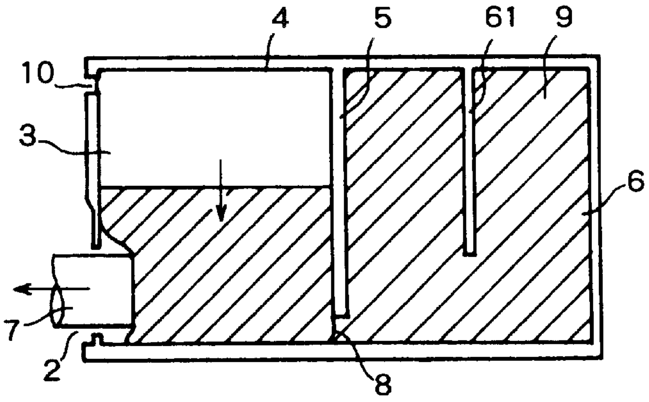
FIGS. 16(A), 16(B) and 16(C) are views schematically illustrating the course of printing.
Figure 16:
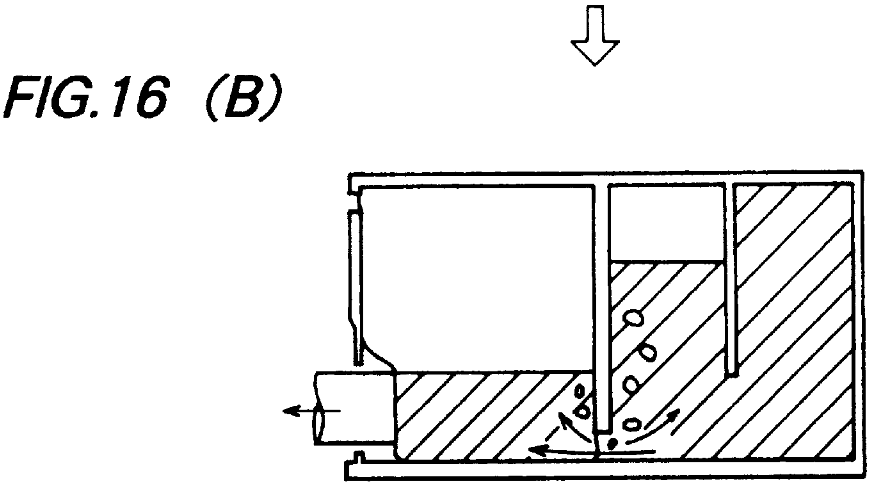
Figure 16:
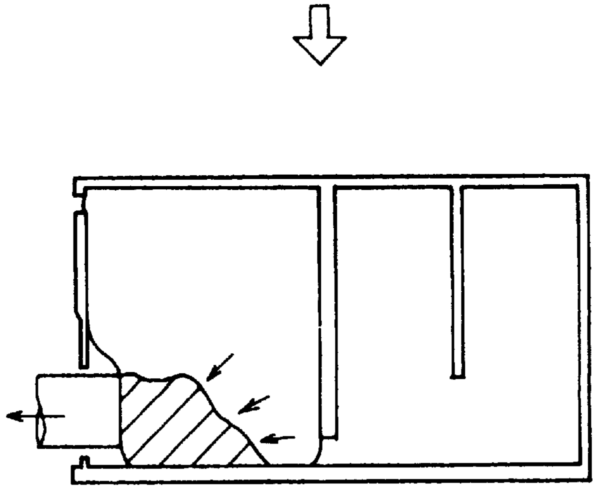
Figure 17:
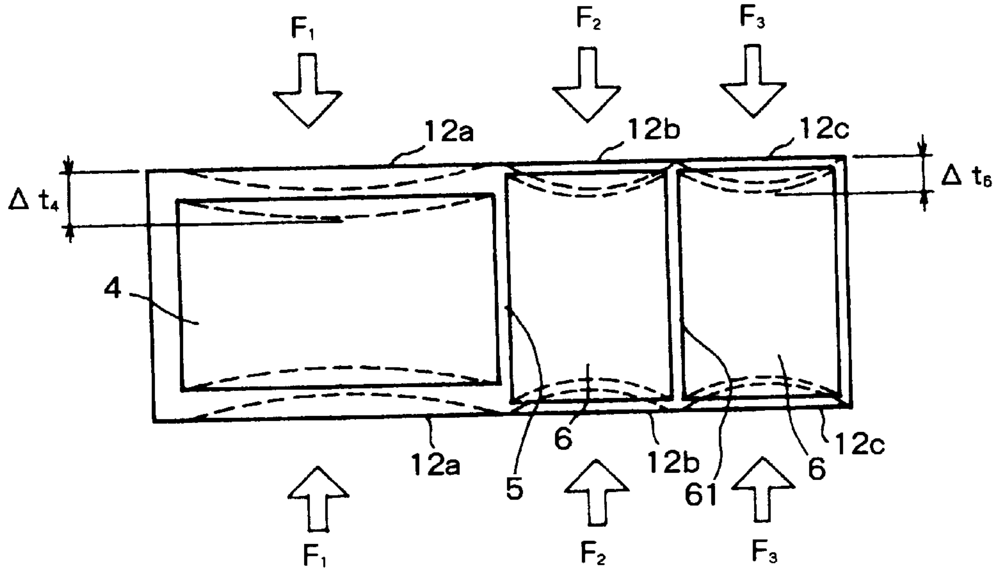
FIG. 17 is a view schematically illustrating the pressure condition.

FIG. 12 shows the ink cartridge ready for operation, where the ink reservoir 6 is filled with ink, and schematically shows the printer for use. The area 3A adjacent the outlet 10 is formed as the area maintaining no ink, and area 3B for creating a reduced pressure is compressible and deformable by insertion of a ink supply tube, not shown. The rest area is left as that maintains the ink which is fed. The area 3B faces the opening 2 formed below the outlet 10, and opening 2 is positioned higher than the narrow passage 8 to fulfill the feature described above.

When the ink cartridge turns ready to operate by removal of seal member S, the area 3A still maintains no ink thereby causing no leakage of ink regardless of vibration or change of pressure.

In spite of storage or operating conditions, by providing the area adjacent the air outlet 10 having no ink, ink leakage from the air outlet is prevented in any change of ambient conditions. Especially, when the outlet 10 is sealed with a seal member, there is further effect to prevent peeling off of such seal member. In operation, this area produces another effect to feed air as necessary to prevent the change of the reduced pressure in the ink cartridge. The area adjacent the outlet 10 may be out of wet with ink, which contributes to further decrease the osmotic speed of the ink. Alternatively, it may be also formed as the area which is wet with ink in advance, which ink is afterwardly removed.

Another structure is that, opposite to the side of the partition, the ink supply opening 2 or the compressible are positioned, thereby the ink in the second reservoir 6 being provided with a stable passage in the reduced pressure creating member. For further stabilizing thereto, the ink supply opening 2 may be placed higher than narrow passage 8, the effect of which is to fix the ink feed direction, and to completely utilize the ink in second reservoir 6. Thereafter, the air in the second reservoir 6 can be in the state as retained but may be moved toward the opening 2. As a result, ink in the reduced pressure creating member 3 can be utilized to minimize the rest ink that is left unused. As described, it is formed the compressible area 3A and uncompressible area 3B in this sequence in the member 4. The one direction ink passage mentioned above is formed in the area 3B, and by the ability of ink maintaining of the area 3A, the quantity of unused ink is further minimized.

The printer of the invention is equipped with a head recovery device HR, which automatically or manually performs feeding out of the ink from the cartridge through the head by means of aspiration or injection. Through the device, the ink condition in the member 3 can be corrected prior to printing, and essential function of the ink cartridge is utilized, without being affected by the condition of kept unused of the cartridge.

FIG. 12 shows the tank 1 in which the seal tape is removed from the cartridge 1 in FIG. 1. The tank is mounted on the carriage, wherein the supply tube of the head passes through the opening 2, and the reduced pressure creating member 3 is compressed and deformed at its compressible area 3B. In the Embodiment herein, the member 3 is deformed toward the narrow passage 8. From a detection device (not shown, as known device mechanically or electrically detecting the status of being connected or separated), an informing signal informing that the ink cartridge has been just equipped is produced and applied to the control unit CC. According the signal, before starting printing operation, the head recovery device HR is operated to remove the ink out of the tank to improve the condition of ink in the tank.

FIG. 13(A) shows another embodiment of the ink cartridge with a modified internal structure of ink reservoir, in which an upwardly enlarged area 22 is supplemented. The inner surface 20 is formed to be as gradually raised as it is remote from the passage 8, and is formed so that even minute ink drops produced due to the surface tension of ink are fed toward the reduced pressure creating member 3, upwardly extending area 21 serves as the finger holder for the operater to prevent deformation of the tank caused at its handling. FIG. 13(B) shows the similar tank and the end of partition 51 which inclines and allows the volume of the ink reservoir 6 to enlarge, but allows that of the reservoir 4 to reduce.

FIG. 13(C) shows the bottom plate 11, which forms a narrow passage 8 between the partition 5, and which is interposed between the side walls 101 and 100 and secured. The symbol SE represents the edge of partition 5. If there is any dipersion in the status of adhesion fixing, the space SP is of indefinite width. Shown in FIG. 13(D), the spacers 110 may be placed on both ends, respectively, and be on the surface of bottom plate 11. Further, recesses 30 positioned within the space SP may be formed on the bottom plate 11, thereby increasing recovering ability of air introduced into reservoir 6.

FIGS. 14(A) and 14(B) show the inclinable range of the ink cartridge, the numeral 40 being the horizontal surface. The narrow passage 8 is preferably in a lowered position, and most preferably be in parallel with the surface 40 under the ink cartridge. In practice, the angle θ may be within $$0 \leqq \theta \leqq 15$$

When conveyed on a scanning type carriage, it may be within $$0 \leqq \theta \leqq 5.$$

The reduced pressure creating member 3 may be of a plurality of members, where the boundaries therebetween can cause the movement of air there to produce a trouble. There fore, it is more preferably of single porous material.

Also, as ink reservoir 6, any which maintains relatively more ink than reservoir 4 may be included as an ink reservoir.

Hereinafter, it is described as to the partition 61 disposed in the ink reservoir 6. Further, it is described an embodiment, in which the problem of ink leakage is solved. Sometimes, the weight produced when the user grips the cartridge, or the deformed external surface due to environmental change during conveyance, will cause leakage of ink either from the orifice of the head, or form the air outlet 10 formed for correcting the pressure in the cartridge as the atmosphere.

The Embodiment described below is an ink cartridge for use in the ink jet recording, improved for preventing ink leakage due to the external force during handling or conveyance, and due to the environmental change such as of temperature or atmospheric pressure, and further improved in higher efficiency of ink using.

As shown in FIGS. 15(A) and 15(B), the ink cartridge body comprises an opening 2 to be connected to the recording ahead, an air outlet 10 provided higher than opening 2 for introducing the air, a first reservoir 4 for enclosing a reduced pressure creating member, and an ink reservoir 6 adjacent the reservoir 4. The reservoirs 4 and 6 are in communication with each other via a narrow passage 8, and a partition 61 leaves a space therebelow wider than the partition 8.

FIG. 16(A) especially shows a joint member 7, inserted into the opening 2 to pressurize the reduced pressure creating member 3, and the ink jet recorder is now ready to operate. On the end of joint member 7, a filter for screening dusts in the ink cartridge.

When start operation, ink comes out of the orifice of the recording head, and an aspiration force is produced in the ink tank. By the aspiration force, ink 9 from reservoir 6 is, through narrow passage 8, to reservoir 4, through reduced pressure creating member 3, aspirated into joint member 7, and fed to the head. As a result, internal pressure of the ink reservoir 6 is decreased, and a pressure difference is produced between the reservoirs 6 and 4.

As recording continues, the pressure difference increases. As the reservoir 4 is open to the air, the air passes through the member 3 and the passage 8 between partition 5 and bottom 11, and enter the ink reservoir 6.

Figure 18:
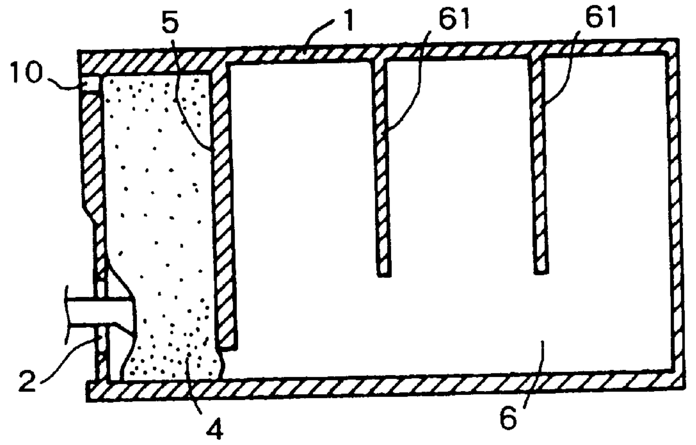
FIG. 18 is a sectional view of a modified embodiment.

According to selection of the member 3, and volume ratio between reservoirs 4 and 6, a plurality of partitions 61 may be formed in the reservoir 6 as shown in FIG. 18.

Next, it is described an embodiment effective in reinforce the side surface, and to form the structure rigid against the external force and ambient changes, and with improved effective use of ink is important.

In the Embodiment, it is constructed so that the displacement of each side walls 12*a*, 12*b* and 12*c* of reservoirs 4 and 6 against the foreign force is in the same order.

The side wall 12*a* is formed thicker than that of side walls 12*b* and 12*c,* and ribs 61 are formed in the positions so as to divide in same volume of sections. The cartridge is formed so that the amount Δ t6 of deformation per unit area is minimum, and further the change of side walls are of the same order. Also, the change of the reservoir 4 is designed to be in the same order, to prevent leakage of ink.

The ink cartridge shown in FIG. 15(B), formed of poly propylene, has the external dimension of 48 mm in length, 35 mm in height, and 11 mm in thickness. In the middle of the entire span of 48 mm, each thickness is: that of side 12*a* is 1.5 mm, that of 12*b* and 12*c* is 1 mm each, and the rib 61 is positioned from approximately 10 mm from each wall. By this structure, against the handling weight of approx. 2 kg, the structure of having a margin of more than two times greater was obtained. At the same time, the sufficent strength was obtained even against the atmospheric change during conveyance, and temperature change.

In the Embodiment, the numbmer or dimension of the partitions 61 may be otherwise selected in accordance with the number or dimension of the ribs.

Figure 20:
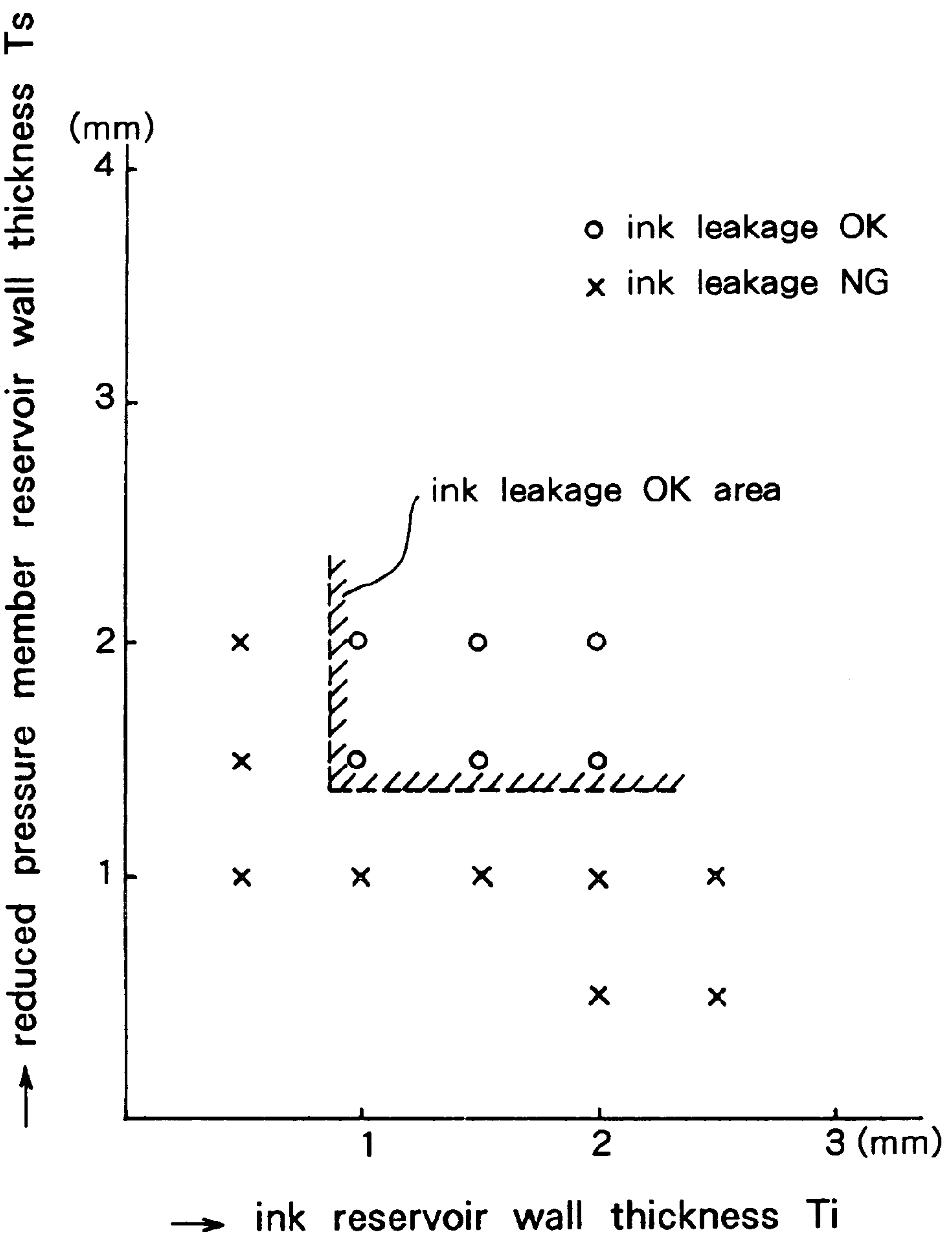
FIG. 20 is a diagramatic illustration relation of wall thickness and ink leakage.

FIG. 20 shows the relationship between the thickness of each wall and ink leakage at handling and conveyance, which is examined in order to determine the wall thickness of reservoirs 4 and 6.

As shown above: the inceased thickness contributes the increase of strength. In order to satisfy the small-sized and higher utility of ink, less thickness to increase the internal volume is necessary. From the data in FIG. 20, it has been selected, 1.5 mm wall thickness for reservoir 4, and 1.0 mm for reservoir 6.

Also, the thickness ratio is that: the wall thickness of reservoir 4 relative to that of reservoir 6 may be 1.2 to 3.

The invention is applied for color recording of single color, and also excellent for minimize tha printer using a plurality of color inks, and also provides a long period of replacement cycle.

Figure 33:
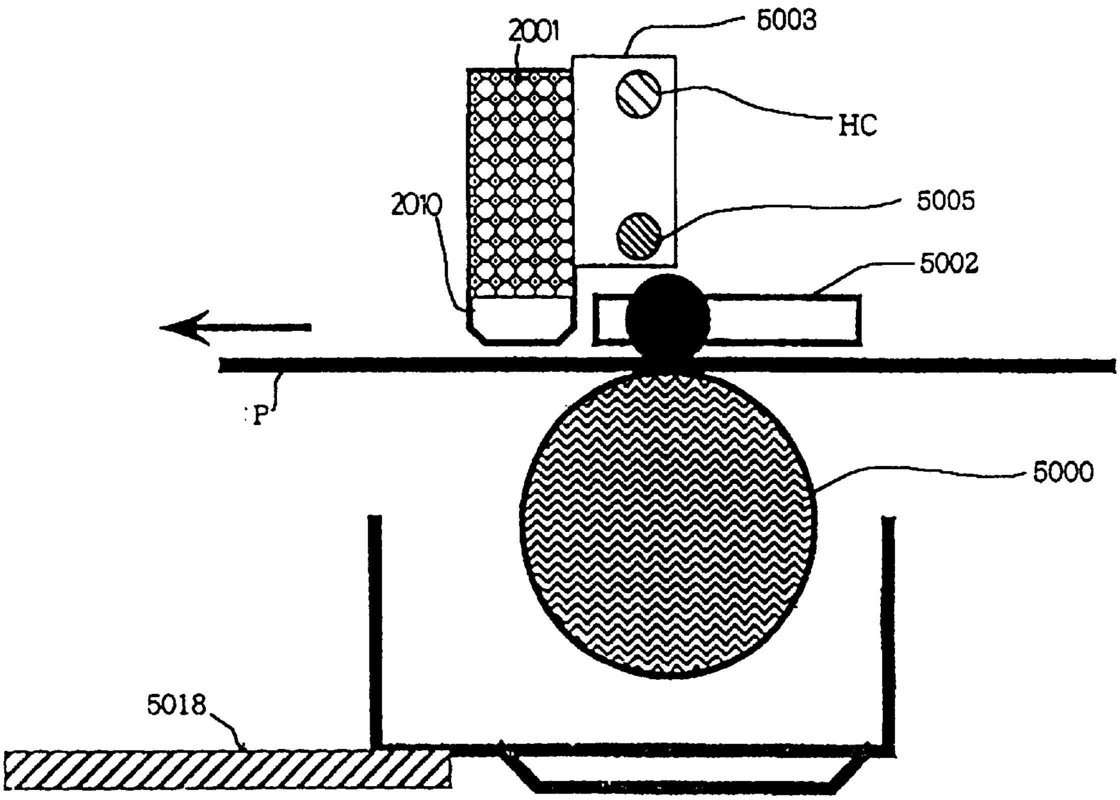
FIG. 33 is a view illustrating a vertically positioned printing.

FIG. 33 shows the ease of replacement procedure. In the Embodiment: After sufficiently connecting the replaceable tank with recording head and urging the replaceable ink tank, therefore, positioning between the carriage and the head is simply performed. In addition, after connecting the recording head with replaceable ink tank at the outside of the body to fit the carriage, therefore, the replacement procedure can be facilitated. Also, at the same time, the electric connection between the carriage (recorder body itself) and the head is completed, and operation ability is also excellent. Also, the electric connection may be of a separate connection form to ensure the head positioning and connection with the replaceable ink tank.

Referring again to FIG. 33, as to the arrangement and operation of the recording head, the recording medium P is horizontally transported by the Platen Roller 5000, and pressed onto the Platen Roller 5000 by Paper Retainer 5000 over the carriage moving direction. To carriage HC, a carriage movement pin is fitted with the spiral groove, is supported and engaged with the lead screw 5000 and slider 5003, and is moved front and back along the recording surface of the medium guided on the Platen Roller 5000. Lead Screw 500 5 is driven to rotate with the alternating rotation of drive motor via drive transmission gear means.

An image recording signal is fed to recording head 2010 in timing with the movement of carriage HS on which the head is mounted and let the ink drop inject at the specified position.

As shown in FIG. 33, the ink tank and ink is especially suitable for longitudinal printing attitude, in which recording medium P is faced on the lower surface of the recording head 2010 and perform the recording scanning, and the medium P, without being rolled on the platen roller, can be supplied, printed and discharged almost on the same surface, to be suitable for printing on thick paper such as OHP paper. Herein, the ink tank 2001 is higher than the injecting area of the head 2010, therefore, it is necessary to support the water head corresponding to the above quantity, and to maintain the inner pressure of ink at slightly increased pressure, preferably slightly reduced pressure to stabilize the meniscus of the ink at the injecting area.

The recorder in FIG. 33 is also referred in the Embodiments described below.

Figure 21:
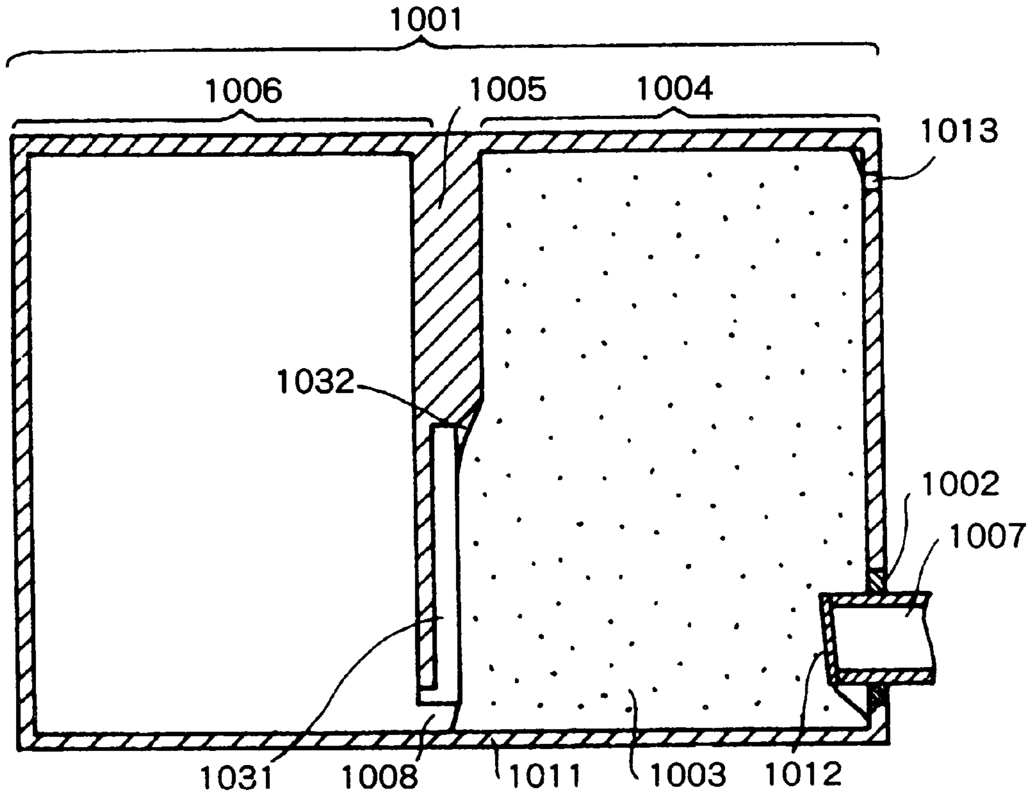
FIG. 21 is a sectional view schematically illustrating a modified embodiment.
Figure 22:
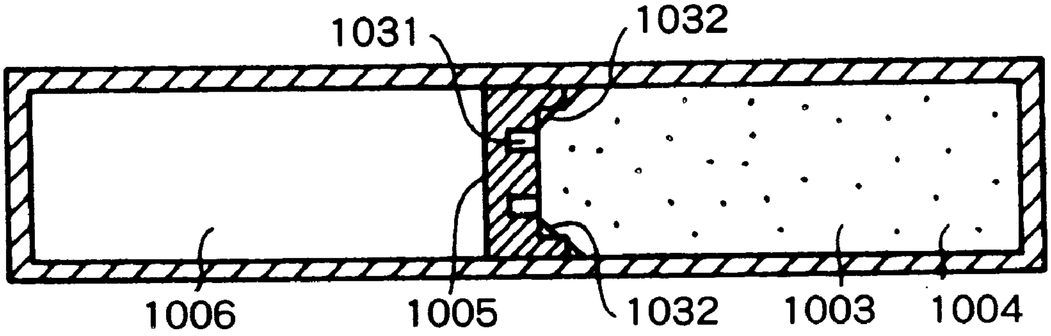
FIG. 22 is a sectional end view of FIG. 21.
Figure 23:
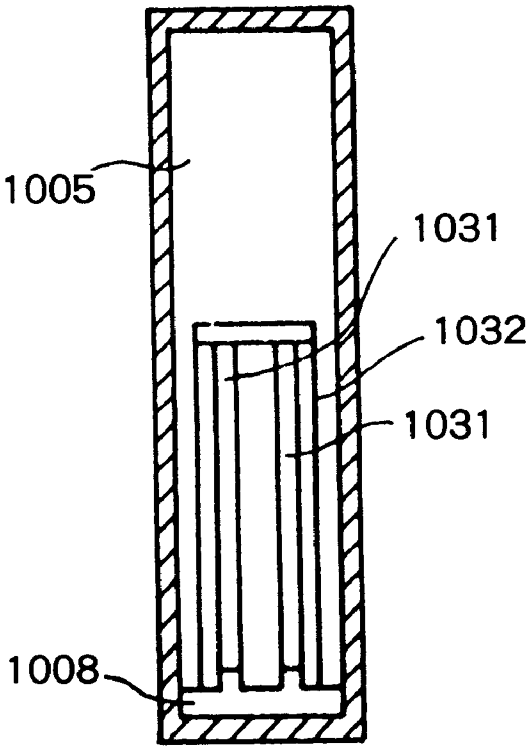
FIG. 23 is a sectional side view of FIG. 21.

FIG. 21 and FIG. 22 show sectional views of an ink cartridge body, and FIG. 23 shows the upper surface of the partition.

In the ink cartridge body 1001, in the part of partition 1003 which is the partition between ink reservoir 1006 and pressed member reservoir 1004, an air inlet groove 1031 and reduced pressure creating member adjusting section 1032 are formed.

The air inlet groove 1031 is, ranging from the middle area of partition 1005 to the edge of parition 1005, namely to narrow passage 1008 with the cartridge bottom 1011, formed on the side of reduced pressure creating member reservoir 1004. And, between the area of the member 1003 which engages the area of air inlet 1031 of partition 1005, a recessed area of adjusting section 1032 for reduced pressure creating member is formed.

Since the reduced pressure creating member 1003 is engaged with the inner surface of the of its reservoir 1004, even if the reduced pressure creating member 1003 is ununiformly filled, the engaging force of the member 1003 is partially relaxed, as shown in FIG. 21 and FIG. 22. Namely, as the ink begins to be consumed from the head, the ink soaked in the member 1003 is consumed, and reaches the adjusting section 1032. As the ink further continues to be consumed, from the area where the engaging force of the member 1003 is relaxed by the adjusting section 1032, the air tends to break the meniscus, so the air is rapidly introduced into the groove 1031 and the reduced pressure control is facilitated.

As the reduced pressure creating member, a elastic porous material may be used.

In the non-recording period, capillary force of the member 1003 itself is developed, ink leakage is prevented.

Figure 29:
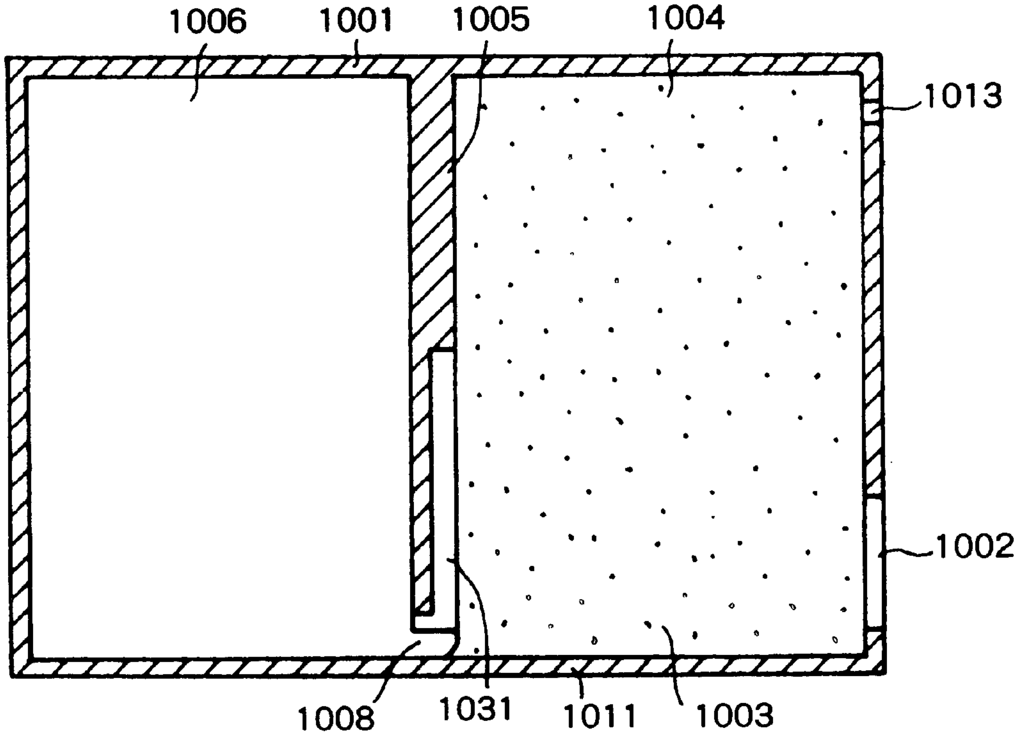
FIG. 29 is a sectional view of a comparison embodiment of a cartridge.
Figure 30:
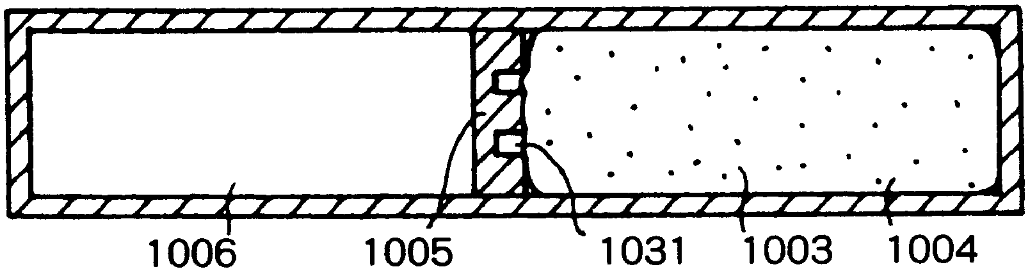
FIG. 30 is a sectional view of another comparison embodiment of a cartridge.
Figure 31:
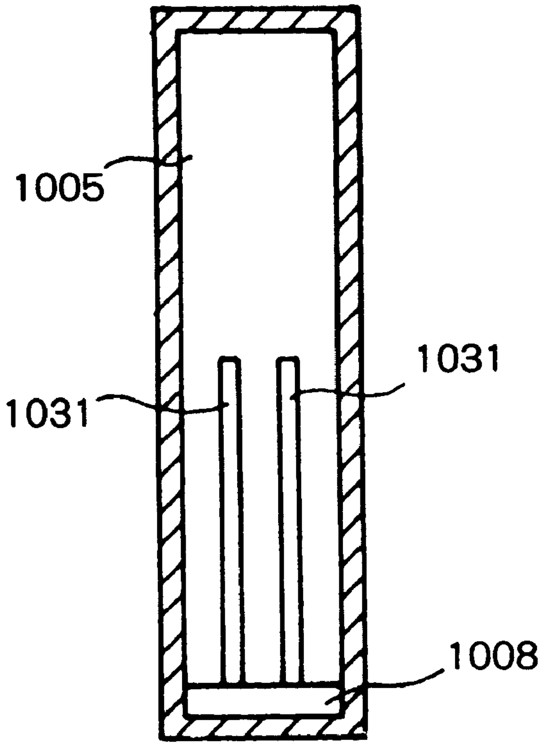
FIG. 31 is a sectional view of a cartridge showing the surface of the partition.

FIG. 29 to FIG. 31 show a Comparison provided without reduced pressure creating member adjusting section.

Even the construction of the Comparison, when in ideal condition based on the operation principle, will properly operate. Of course, a stabilized operation is performed than that having no air inlet.

If the more stable operation is desired in industrial purpose or porous material is used as pressue member, more stabilized control is requied.

Figure 32:
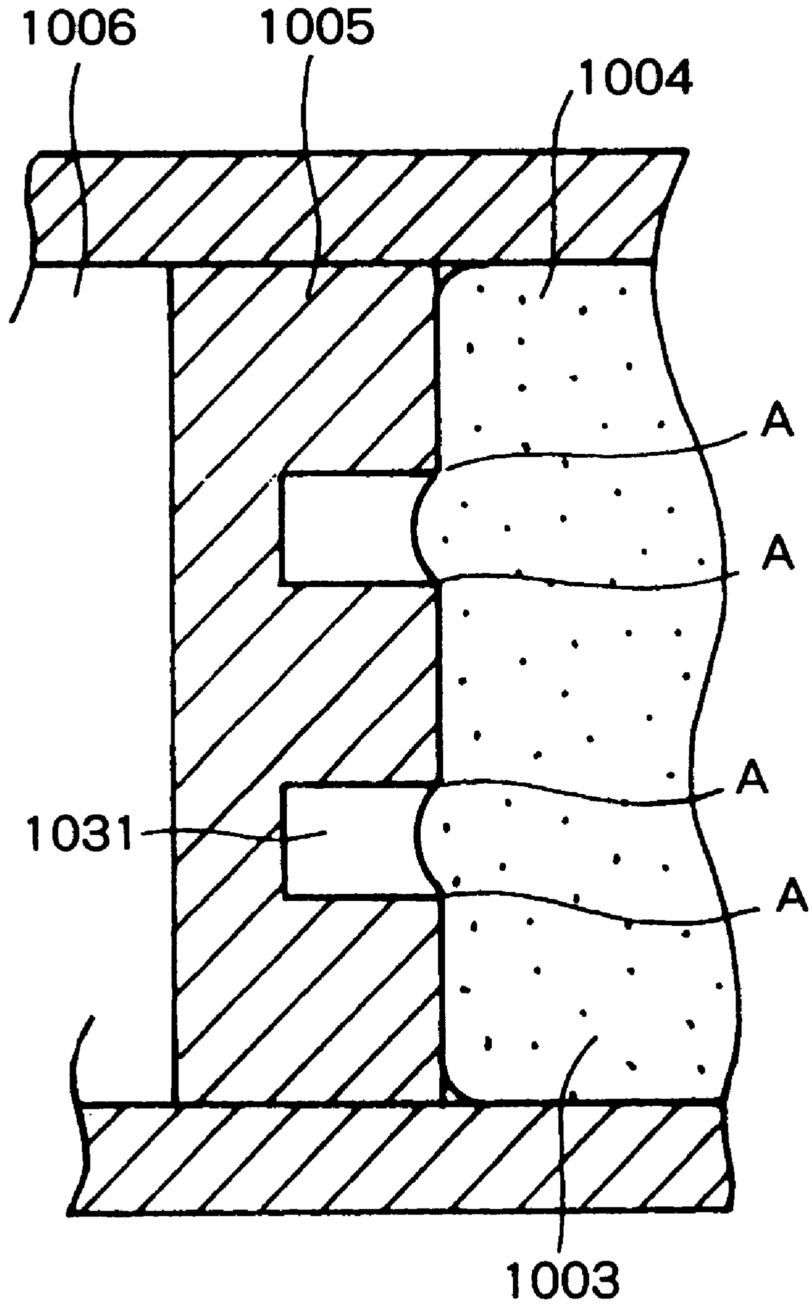
FIG. 32 is a sectional view of a comparison embodiment of a partition.

As shown in an enlarged view in section of FIG. 32, the condition is reached, wherein the member 1003 penetrates in the air inlet groove 1031. Accordingly, at engaging area A, compressive force of the member 1003 is not relaxed, air will hardly break the meniscus there, and is difficult to enter the groove 1031. Thus, even the ink continues to be consumed, air-liquid exchange is not performed, the merit of air inlet is not developed, ink of ink absorbing area 1006 is not used, and turns to be non-operable.

The Embodiment is provided with the excellent effect than the Comparison.

Figure 24:
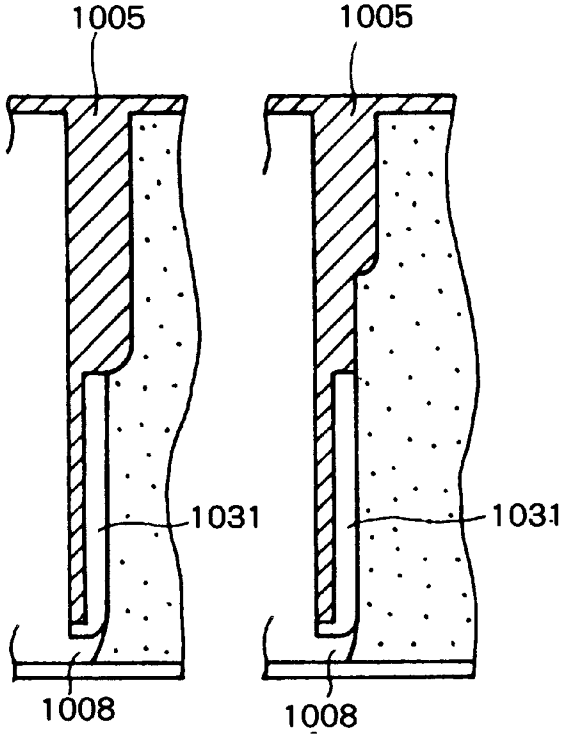
FIG. 24 is a sectional view of the surface of a rib.
Figure 25:
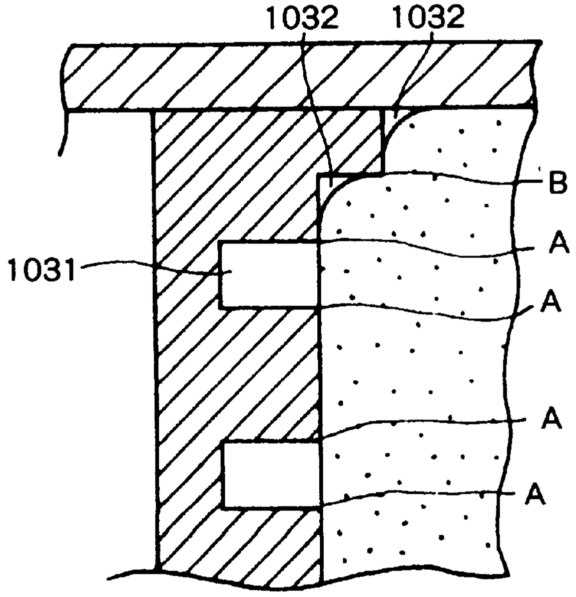
FIG. 25 is a sectional view of a partition.

FIG. 24 shows a partition in another Embodiment having two different sectional shape. FIG. 25 shows an enlarged section of the partition.

As shown, the shape of air inlet 1031 and adjusting section 1032 is different from the ink cartridge shown before.

The stepped portion of partition 1005 engaging the member 1003 is chamfered R for increasing relaxation of pressure and compression.

In the vicinity of the chamfered area R, air is enclosed into ink soaked in the reservoir 1004. Such enclosed air moves to ink reservoir 1006, and accordingly, ink in ink reservoir is fed to the reservoir 1004, and the area where air is enclosed in the member 1003 is to serve as the air-liquid exchange area.

To further facilitate the above exchange, it is preferable to relax the engaging force of member 1003 against reservoir 1004 at lower area of air-liquid exchange area than the upper area thereof. The reason therefor is: air can smoothly move from the gas phase to liquid phase in capillaries of the member 1003 in which the engaging force is relaxed.

Figure 26:
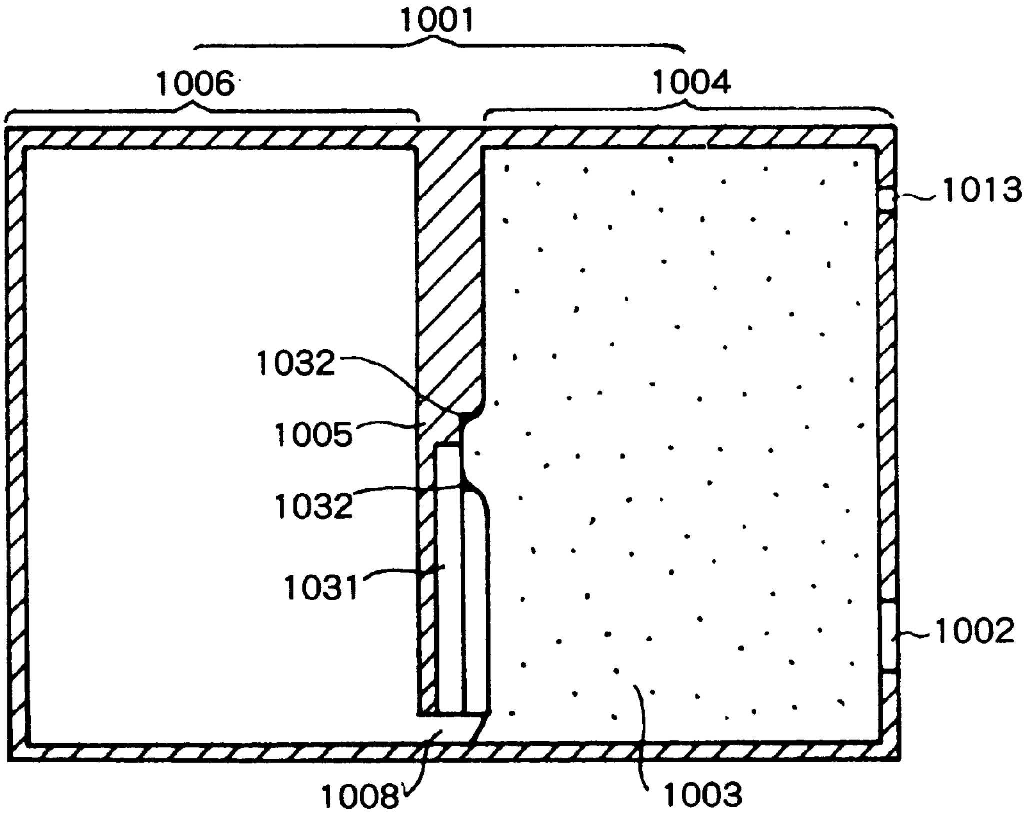
FIG. 26 is an elevational sectional view of another embodiment of a cartridge.
Figure 27:
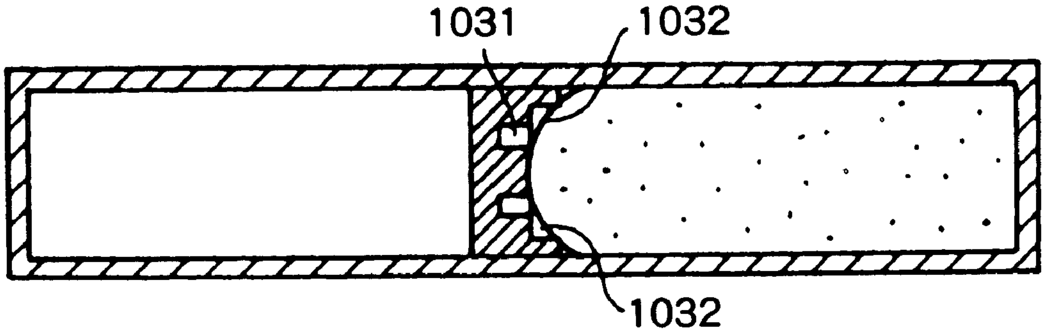
FIG. 27 is a sectional end view of another embodiment of a cartridge.
Figure 28:
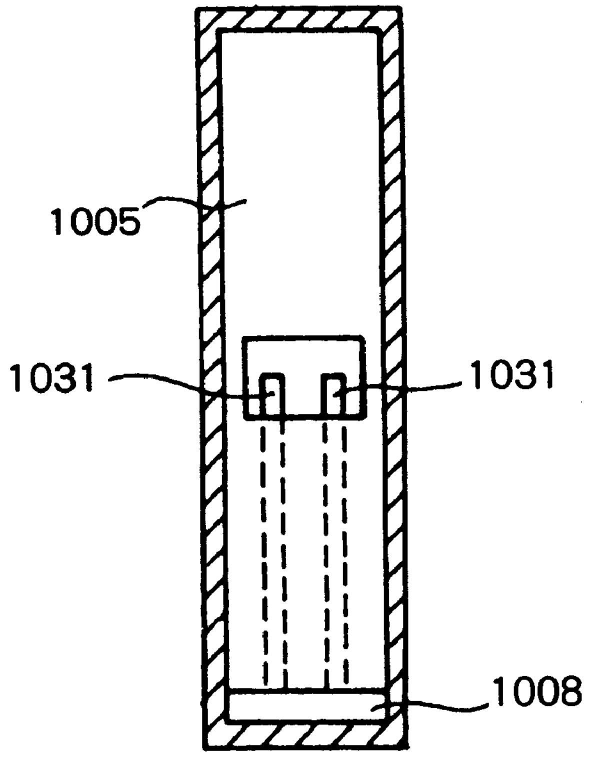
FIG. 28 is a sectional side view of a partition.

As shown in FIGS. 26 to 28, it is possible to effect by forming partially the reduced pressure creating member's adjusting section 1032.

The shape of section 1032 may be freely selected.

According to the invention, it is provided a rapid air-liquid exchange of air and ink in the ink reservoir to stablize the internal pressure, and develop the stabilized printing.

In spite of pressure change due to the environmental change, the ink cartridge without incorporating ink leakage is provided.

In the ink tank of another Embodiment, the inner surface is divided in two ink reservoirs (a, b) which is communicated along the bottom, the ink controlled as to capillary force is filled, and air passage 2013 is provided.

Figure 34:
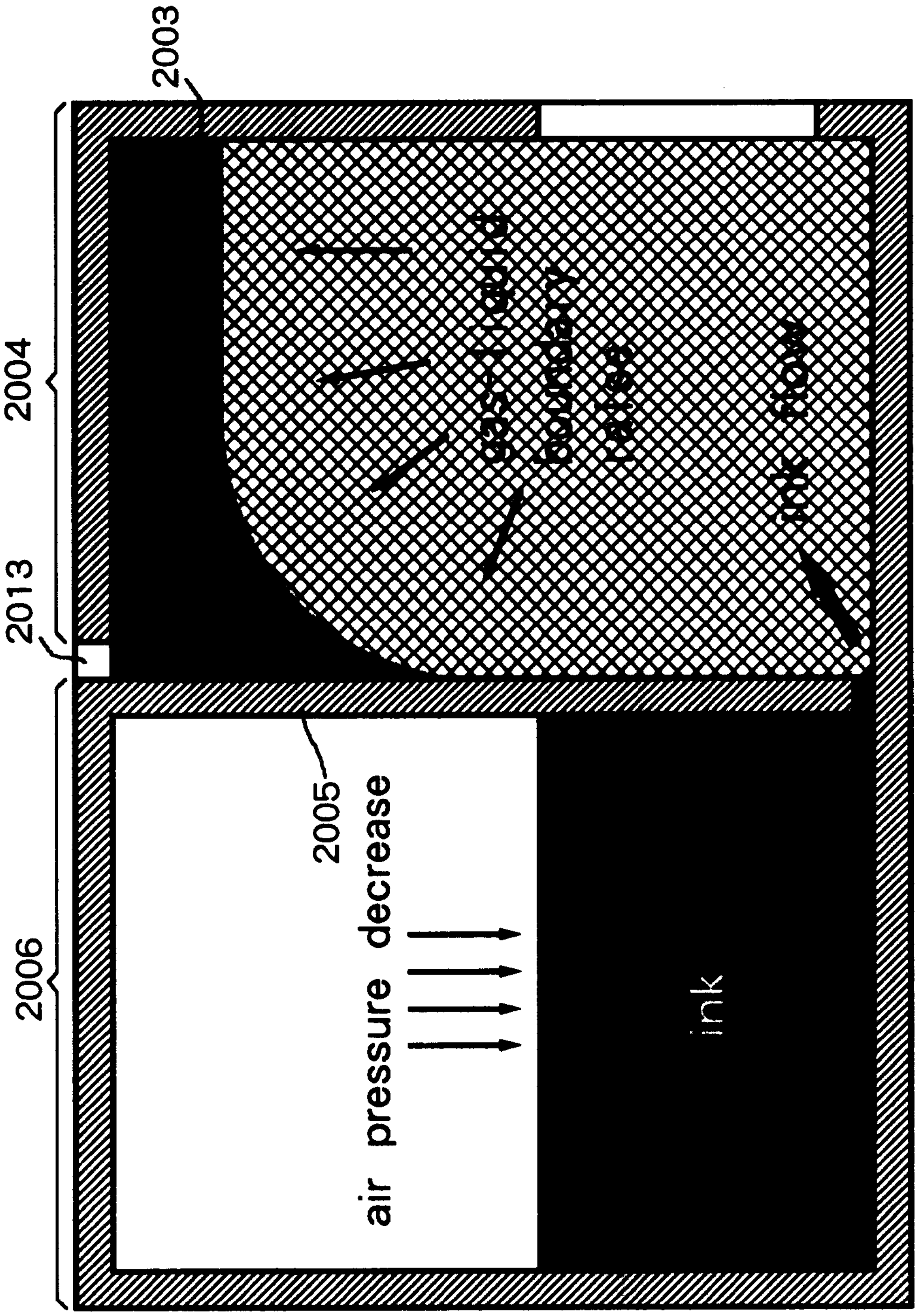
FIG. 34 is a sectional view illustrating the leakage ink buffer function of compressible ink absorber.
Figure 35:
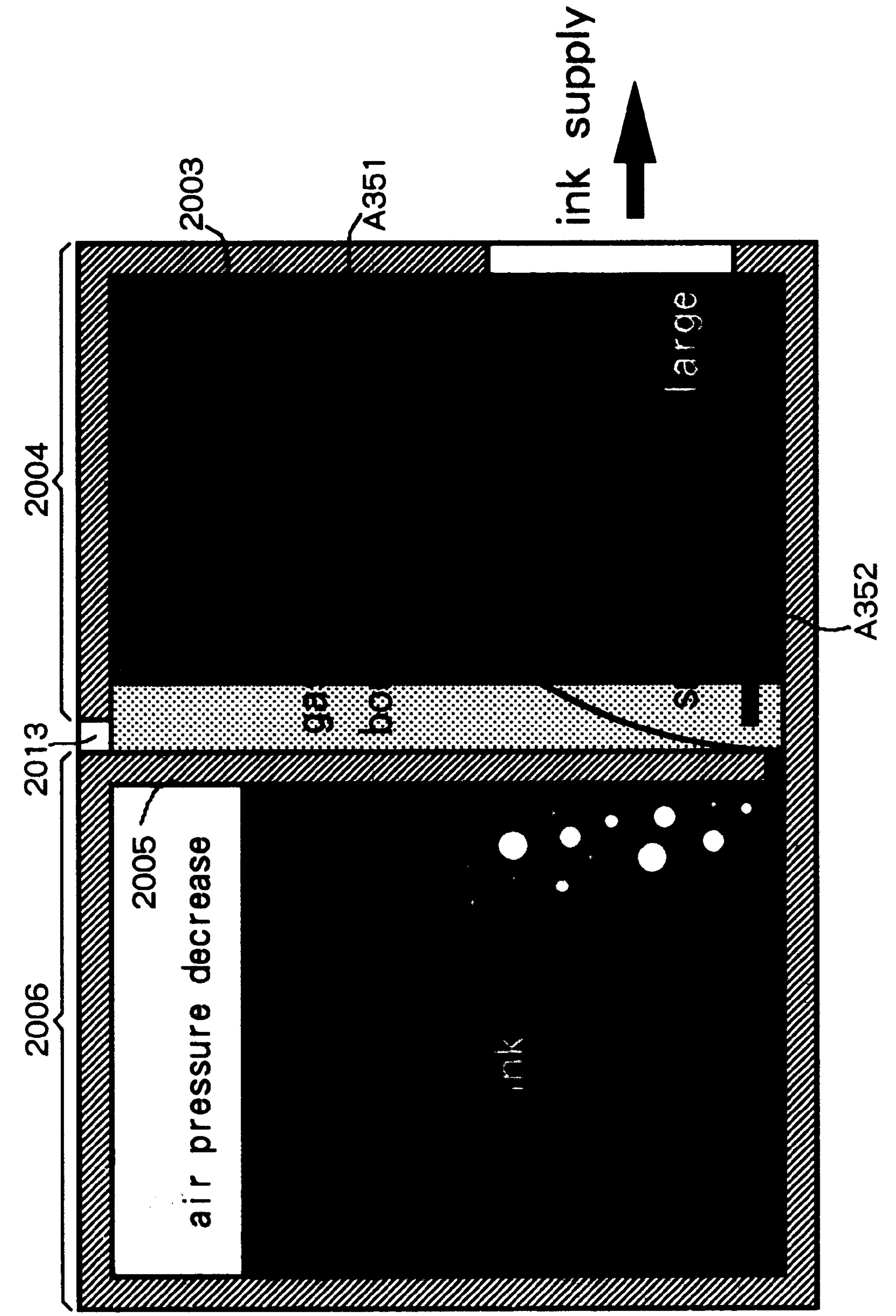
FIG. 35 is a sectional view illustrating compressibility distribution of ink absorber.

The condition of ink in FIG. 34 is a half consumed state converted from the initial filled state. In FIG. 35, ink in the compressed ink absorber is maintained in the level in which the water head from the inject opening, the reduced pressure in the ink chamber 2006 and the capillary in the ink absorber are balanced to each other. When the ink is fed from ink supply tube, quantity in ink chamber 2004 does not reduce and ink in the chamber 2006 is consumed Namely, the ink distribution in chamber 2004 is as maintained in equilibrium, ink which meet with the ink supply is consumed, and air is introduced as the amount corresponding to the consumed quantity of ink.

Figure 36:
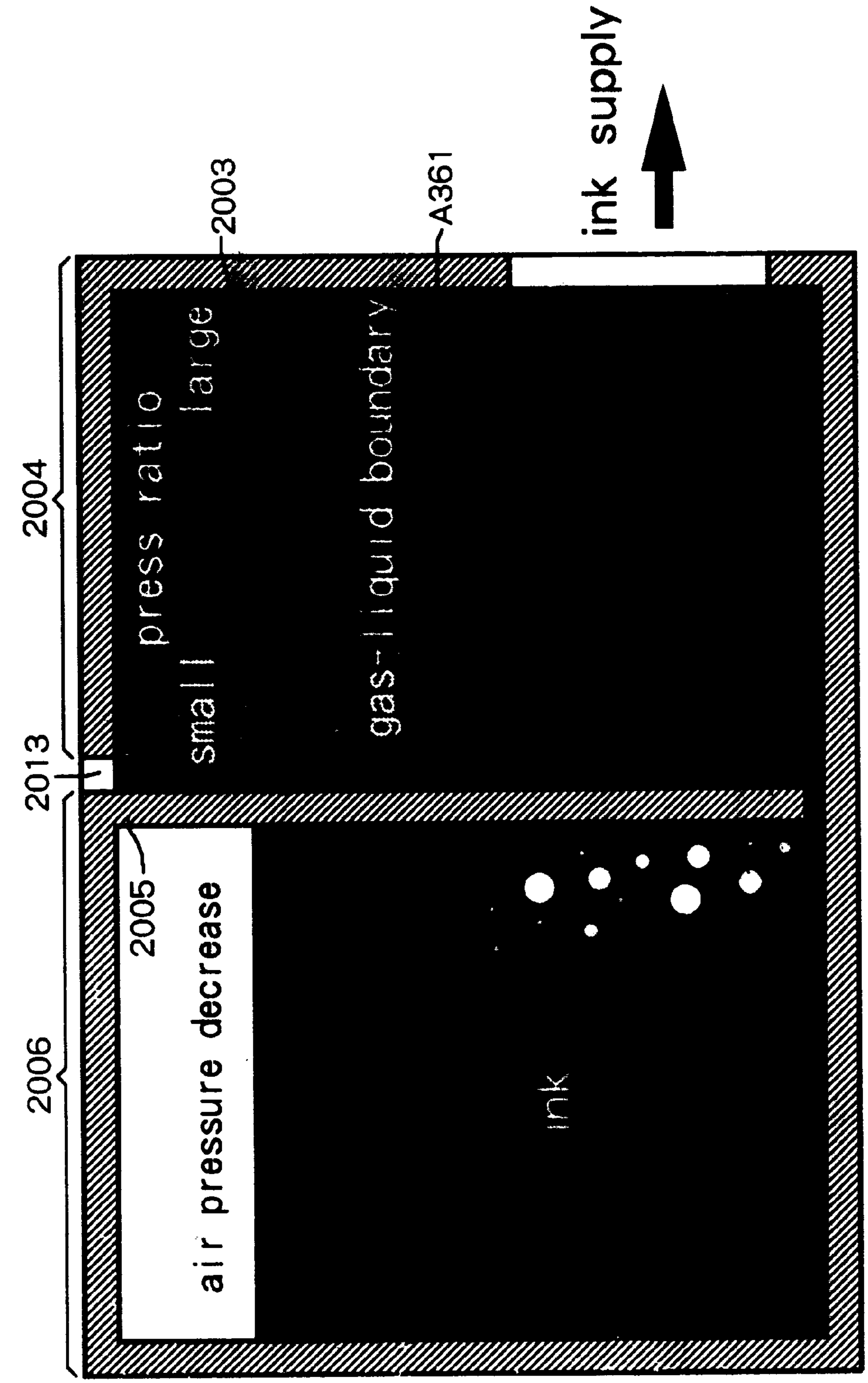
FIG. 36 is a sectional view illustrating compressibility distribution of another ink absorber.

As shown in FIG. 35, the exchange is performed between air and ink at the lower end of the ink chamber 2005, The meniscus formed in the comressible ink absorber of ink chamber a 2004 is partially broken, and air is introduced so that pressure in the ink chamber b 2006 is balanced with the meniscus preserving ability of the compressed ink absorber. Referring to FIG. 36, the principle of ink supply and production of internal ink pressue is further discussed. The ink absorber 2003 adjacent the ink chamber is, as communicated with air passage 2013 in the status the ink is consumed for a predetermined amount, to form a meniscus against the atmospheric pressure.

The air space has its inner pressure reduced such that it is balanced with capillary force of the compressible ink absorber 2003 and the water head of ink remaining in ink chamber 2006, and it maintains the meniscus formed by compressible ink absorber 2003. From such a condition, when ink is supplied in the recording head via ink supply area, ink flows out of ink chamber b and accordingly the pressure in ink chamber b further reduces. In parallel thereto, the meniscus formed in the compressed ink absorber below the wall of ink chamber 2005 is partially broken, and air is introduced such that the excessively reduced pressure of ink chamber b 2006 is balanced with the meniscus maintaining force and the water head of ink itself in the ink chamber b 2006. Namely, the internal pressure of the ink supply area is maintained for a predetermined pressure by way of the capillary force of the compressed ink absorber adjacent the lower end of the wall of the ink chamber.

FIG. 34 is to explain the function of the compressible absorber as a buffer absorber, and shows the condition of ink, which has just flown out of chamber b 2006 toward the chamber a 2004, due to descent of the atmospheric pressure or air expansion in the chamber b 2006 owing to temperature rise. The ink flowing into ink chamber a 2004 is adapted to be maintained by means of compressible absorber 2003. As to the relationship between the absorbed quantity by absorber 2003 and the ink chamber, the maximum absorbing quantity of ink chamber a 2004 may be determined in view of preventing ink leakage as mentioned above, and it is preferable to provide the ink chamber a with at least a volume sufficient for enclosing the absorber.

On the other hand, when the atmospheric pressure further increases, the pressure difference between the air, the pressure of which has originally reduced for the amount of the ink water head, and the atmospheric pressure becomes large in excess, thereby the air tends to be drawn in the ink chamber b 2006 to return to the predetermined pressure difference. In this case, similar to the case of ink feeding, the meniscus of the absorber 2003 adjacent the lower wall end of ink chamber 2005 is broken out, and air is introduced and pressure equilibrium is completed, thereby the internal pressure not generally changes and no effect on the recording property. When the atmospheric pressure returns normal, ink is flown out at the amount corresponding to the air introduced from chamber b 2006 to chamber a 2004, and ink quantity in chamber a 2004, tentatively increases to raise the air-liquid interface. Similar to the beginning of operation, the interval pressure becomes slightly positive, but less affects on the injection property. The problem above occurs, for example, when the recorder employed under lowered atmosphere is turned to use under normal atmospheric pressure. Even in such a case, only introduction of air into ink chamber b 2006 occurs. Also, being turned to the use at higher altitude again, the internal ink pressure is only slightly raised. The use under the pressure extremely higher than the standard atmosphere is much less be expected. Therefore, there are no serious problems in practical use. From the initial use to just before replacement of the ink tank, the ink in the chamber a 2004 is steadily retained by means of the ink absorber 2003 in the ink chamber a 2004. Also, the chamber b 2006 is closed, and there is caused no leakage of ink out of air in let and ink supply area, thereby handling being improved.

The requirements for the compressible ink absorber and ink chamber in the type of separate chamber utilizing absorbing material is described below.

The maximum ink absorption capacity of ink chamber a 2004 is determined in taking account of ink leakage from the ink chamber b 2006 under worst condition, as well as the ink quantity to be maintained in the ink chamber a 2004. In addition, the ink chamber a 2004 may be provided with a capacity which is necessary for accommodate the ink absorber 2003 in taking account of ink absorption rate of the material of ink absorber 2003.

As to the small passage formed below the partition 2005, the first requirement is that the dimension thereof is in the extent not to allow the meniscus to be formed in the passage.

Further, in view of maximum ink supply speed and viscosity of ink, the opening may be provided with a dimension capable of performing smooth gas-liquid exchange.

However in case that the upper surface of the ink remaining in the ink chamber b 2006, is lowered than the edge of the wall 2005, and therefore the internal pressure of the ink supply area tentatively tends to increase, the internal pressure may be set so as not to affect the ink injection property of the recording head.

As described before, in the ink tank of the invention, the internal ink pressure of the ink supply area is maintained by the ink absorber 2003 adjacent the wall of ink chamber. Therefore, in order to maintain the desired pressure at the time to supply ink from the ink chamber b 2006, the adjustment of capillary force of the absorber 2003 adjacent the lower end of the wall 2005. Namely, the compressibility and initial pore size of the absorber 2003.

For example, when the reduced ink pressure necessary for the ink supply area is minus h (mm aq.), the portion of the ink absorber 2003 positioned near the lower end of wall 2005 may exhibit a capillary force capable of raising the level the ink for h mm.

Briefly, with density of ink: $\rho$ surface tension of the ink: $\gamma$ contact angle between ink absorber and ink $\theta$ acceleration of gravity: g, then the pore radius P1 of absorber 2003 is represented, $$P1=2\rho\cos\theta/\rho gh$$

During supplying ink for the chamber b 2006, gas-liquid boundary is lowered below the upper end of ink supply area, the air is fed to the recording head side. So the gas-liquid boundary must be maintained higher than the supply area. Namely, the absorber 2003 is necessary to have a capillary force to raise up the ink to the height of (h+i) mm.

Therefore, the radius of pore size is represented:

$$P2=2\rho\cos\theta/\rho g(h+1)$$

As shown by the formula, the height of gas-liquid boundary (i mm) may be higher than that of the air supply area. The boundary is gradually lowered in the direction toward inside. In other words, ink lifting force gradually reduces.

In the case of FIG. 36, capillary force may be let small only adjacent the wall 2005.

To achieve a stable feed of ink, capillary force provided by the absorber 2003 is set as gradually increases as the ink supply area is approached, accordingly reaches maximum at the supply area (pore radius: P5).

As a result, adjustment of capillary force is given: (Pore radius: P1)

Briefly, $$P1>P2$$

is preferable. More preferably, $$P1>(P3, P4)>(P2, P5)$$

As to the relation of P3 versus P4, and P2 versus P5 respectively, in view of distribution of compressiblity, either P2>P5, or P3>P4, P2=P5 may be selected.

Figure 37:
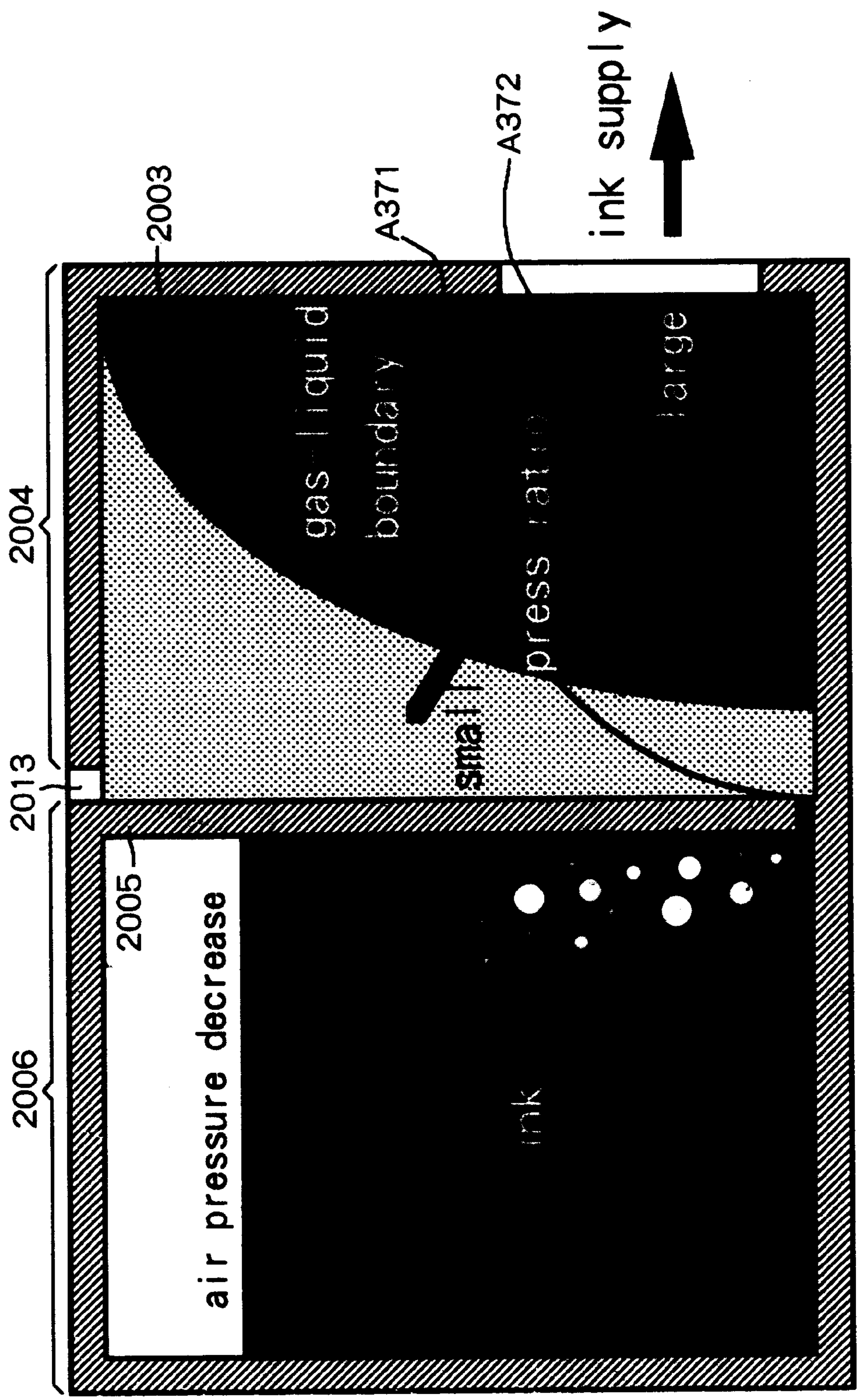
FIG. 37 is a sectional view illustrating pressure distribution of another ink absorber.

In FIGS. 35 to 37, symbols A351, A361 and A371 represent gas-liquid interfaces, and arrows A352 and A372 indicate that the compressibility changes from small to large.

Before investigation of property of ink for the ink tank, preferably, ink is to be stable against vibration and the interface would be stable against environmental changes.

The preferred components of the ink are listed below.

As water soluble organic solvents those with low volatility, low viscosity and not adeterious to humans are listed below:

Amides such as: dimethyl formamide, or dimethyl acetoamide ketones such as: acetone;

ethers such as: tetrahydrofurane, or dioxane;

polyalkylene glycols such as: polyethylene glycol, or polypropyrene glycol;

alkylene glycols such as: ethylene glycol, propylene, butylene, or triethylene;

alkylene glycols such as: hexane triol, thiodiglycol, hexylene diglycol, or diethylene diglycol;

lower alkyl ethers of polyvalent alcohols such as: ethyleneglycol methyl ether, diethyleneglycol monomethyl ether, or triethyleneglycol monomethyl ether;

monovalent alcohols such as: ethanol, isopropyl alcohol; also, including glycerin, N-methyl-2-pyrrolidone, 1,3-dimethyl-2-imidazolydinone, triethanol amine, sulfolane, dimethyl sulfoxide, or cyclohexanol.

Further, as surface tension adjusters, surfactants are useful in the present invention.

Examples of surfactants include: salts of fatty acids, sulfuric ester salts of higher alcohols, alkylbenzene sulfonic salts, anion surfactants such as higher alcoholic phosphoric esters, fatty amine salts, cation surfactants such as quarternary ammonium salts, higher alcohol ethylene oxide addition products, alkyl phenol ethylene oxide addition products, fatty acid ethylene oxide addition products, poly alcoholic fatty acid ester ethylene oxide addition products, higher alkyl amine ethylene oxide addition products, fatty acid amide ethylene oxide addition products, polypropylene glycol ethylene oxide addition products, fatty acid esters of higher alcohols, non-ionic surfactants such as fatty acid amides of alkanol amines, and surfactants such as of amino acid type or betaine type.

Embodiment 4

Figure 47:
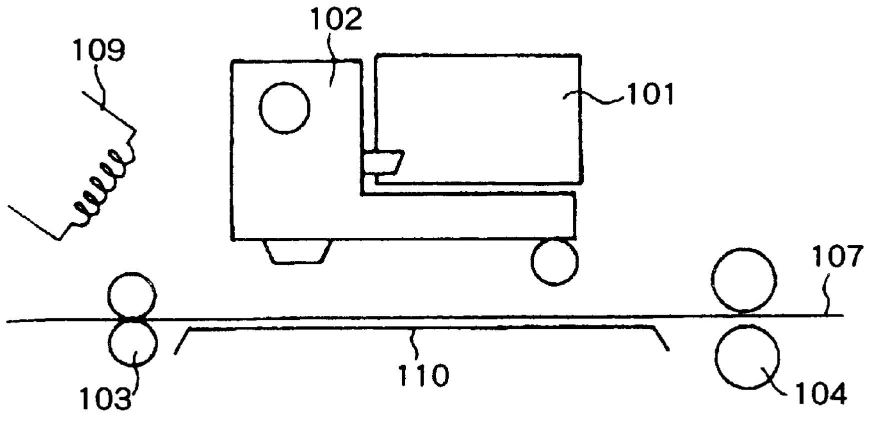
FIG. 47 is a recording apparatus.
Figure 48:
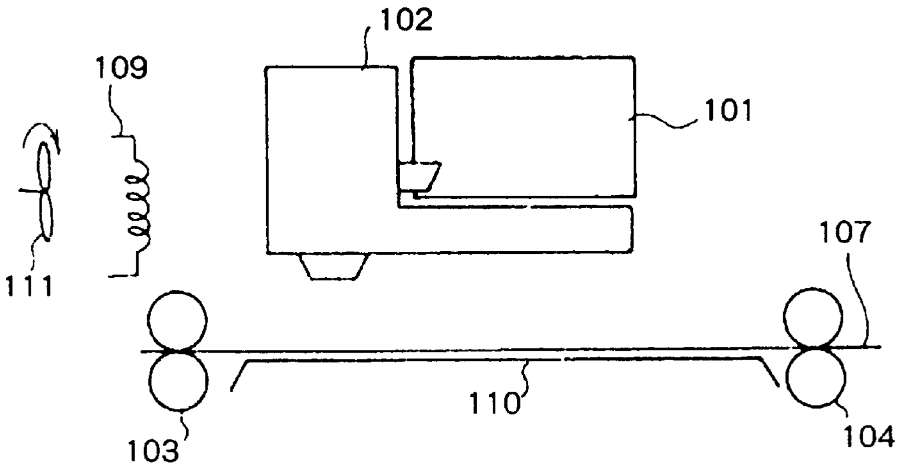
FIG. 48 is another recording apparatus.

A general construction in the embodiment 4 in which the similar ink is used as in the form in embodiment 2, is shown in FIGS. 47 and 48.

The heater 109 or the fan 111 for the heater 109 equipped in the printed area make the atmosphere about the printed & settled area dry, and assist the evaporation the solvent and water etc.

Figure 44:
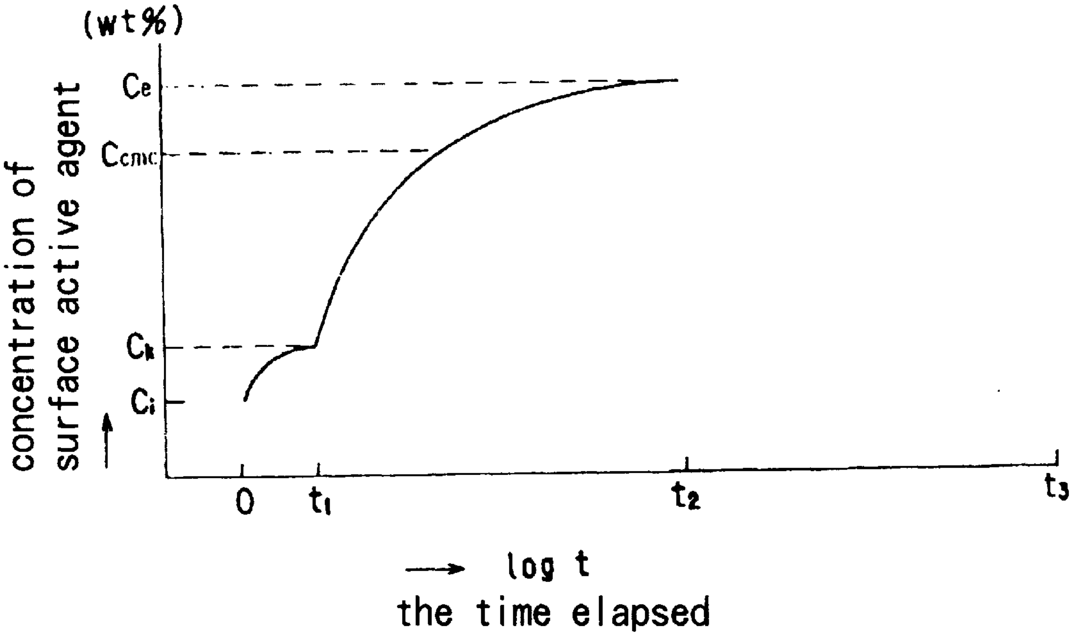
FIG. 44 is illustrating the concentration change of surfactant.

By this construction, the slope of the curve in FIG. 44 is getting sharp and the concentration is accelerated so that the time of absorption period t2 shown in FIG. 44 is shortened. And in the case that the solvent with a low boiling point is added as in the case of the embodiment 3, the printed paper is also kept in dried condition, absorption of the solvent in the paper is accelerated and the speed of evaporation and settlement are accelerated.

Embodiment 5

In such an ink jet printing machine, multi-scan printing technique, which print one print unit by using different nozzles, in order to prevent the variation of ink jet volume and direction, is used in general.

In case of such printing method, one jet volume per unit area is fewer than usual. This is very advantageous for evaporation of the solvent and water, when the similar ink is used as in the embodiment 2 or 3.

By this constitution, the slope of the curve in FIG. 44 is getting sharp and the concentration is accelerated, and the time t2 is shortened. And the settlement is accelerated, so the bleeding is prevented.

Embodiment 6

In case of the construction as of the embodiment 1, the rate of bleeding is rather larger by its good permeability, and the ink quantity to cover the predetermined area is lesser than the ordinary ink.

On the contrary when the jet volume is the same as the ordinary ink, strip of junction is highlighted, and the print quality and graduation are lowered. But in a small jet volume, the concentration of the dyes per unit area decreased, so that, in the case of the embodiment 1, the concentration of the dyes is relatively higher than the ordinary ink with small bleeding rate, to compensate the lowering of the concentration of the dyes.

In the case of the embodiment 1 which uses the above mentioned ink with high concentration, when the environmental atmosphere temperature is relatively low, bad jet injections are often generated by increasing the viscosity of ink.

In such cases, it is generally effective to equip with a heater out side of the injection area, or a heater within the injection head, in order to temperature modulation. But in such case, if the setting of the modulation temperature is excessively high, an educe of the dyes and solidification and increasing of viscosity are often generated, so that the time allowed to be non-using period is extremely shortened as explained in the embodiment 1.

An experience showed that in case of using the machine at a low temperature environment as 10° C., the injection area is to be held in the temperature range between 15° C. and 40° C., in order to prevent the above mentioned disadvantage.

And in general, so called preliminary injection is often applied to recover the happening of the non-injected jet. By controlling the temperature of the injection area in the range of 20° C.~30° C., therefore mentioned recovery in a low temperature environment was possible at the same interval of preliminary injections as that in the ordinary temperature environment.

Embodiment 8

Figure 41:
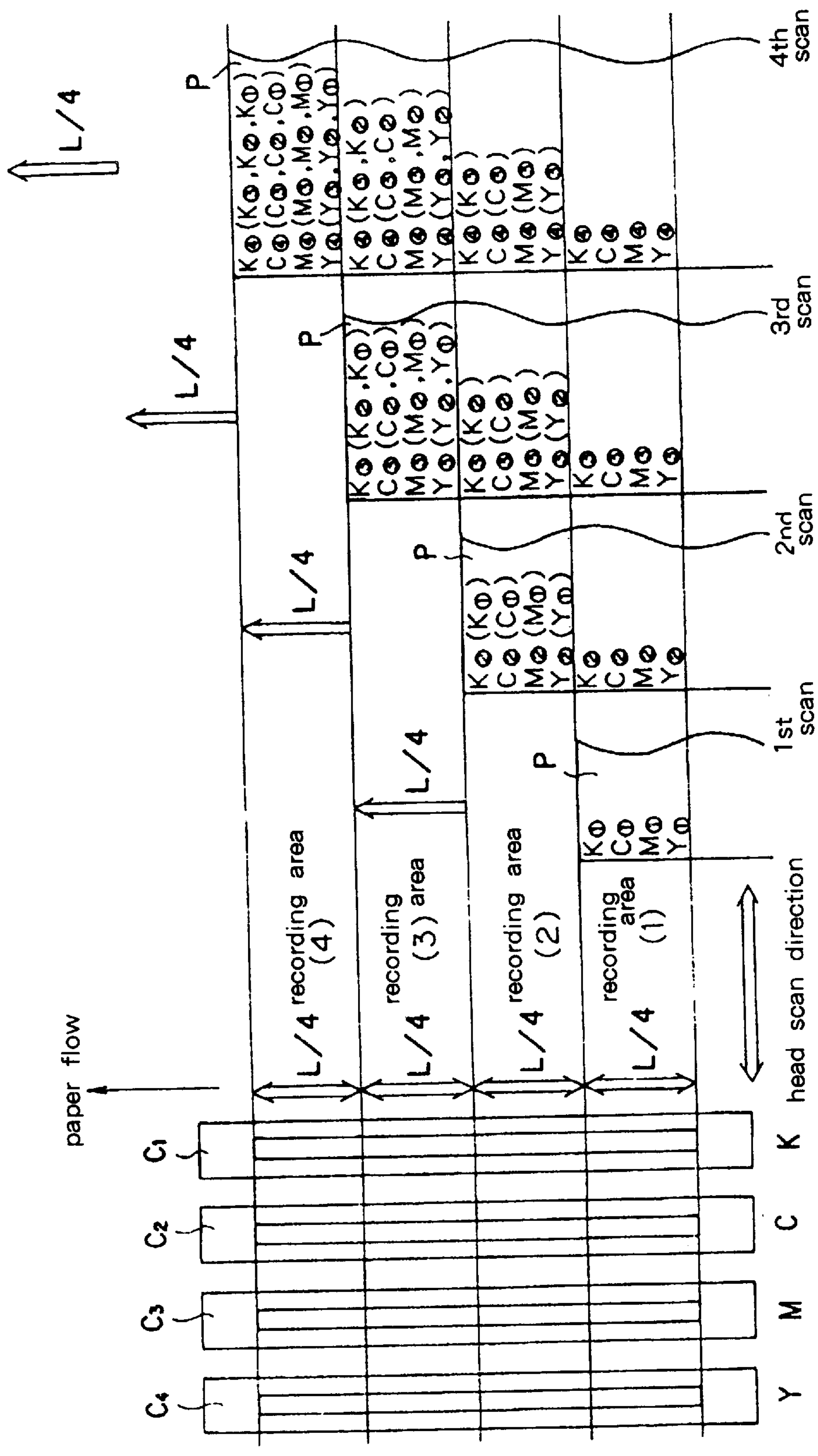
FIG. 41 is schematically illustrating the separate printing process.

FIG. 41 shows the printing method of the embodiment 8.

In the embodiment, the same ink jet printing apparatus and the same ink jet head are as those used in embodiment 1.

In the method, recording area (L) of the ink jet head is divided into four parts. In the first scan, 25% part then the paper is fed by the width of L/4. In the second scan, another 25% part is printed by using other nozzles as those used in the first scan, then the paper is fed by the width of L/4. In the third scan, another 25% part area is printed, then the paper is fed by the width of L/4. In the forth scan, another 25% part is printed, then the printing is finished.

In the figure, the nozzles cannot be seen, but they are showed in order to explain clearly.

FIG. 40(D) shows an example of the method of 25% thinning, the positions and the order of the ink spotting are showed in number. In the figure, the printing at 1 is operated in the first scan, the printing at 2 in the second scan, the printing at 3 in the third scan, the printing at 4 in the forth scan, through these process the printing in an area is finished.

Referring more particularly to FIG. 41, the printing on the recording area (1) is operated by using nozzles in the first scan. The printing is operated in the condition of 25% thinning by using K(black), C(cyan), M(magenta), Y(yellow), head. At this time, the positions 1 in FIG. 40(D) is printed, they are described as K1, C1, M1, Y1, in FIG. 41. Then the paper is fed by the width of L/4.

The printing on the recording area (1), (2) is operated in the second scan. The printing is operated in the condition of 25% thinning. At this time, the positions 2 in FIG. 40(D) is printed; they are described as K2, C2, M2, Y2, in FIG. 41. Then the paper is fed by the width of L/4. The printing on the recording area (1), (2), (3) is operated in the third scan. The printing is operated in the condition of 25% thinning. At this time, the positions 3 is printed, they are described as K3, C3, M3, Y3 in FIG. 41. Then the paper is fed by the width of L/4. The printing is operated in the condition of 25% thinning. At this time, the positions 4 is printed; they are described as K4, C4, M4, Y4, in FIG. 41. Through these process, the printing on the printing area (4) is finished. Then the paper is fed by the width of L/4, the same process as that mentioned above will be repeated.

In the embodiment, ink bleeding may not be happened, because the amount of ink spotting is restrained compared with that of embodiment 1 and 2. In addition, the color of black can be deeper, because the amount of black ink spotted is twice as much as that in usual. The printing can be operated without ink bleeding, because the amount of ink spotted from the nozzles in one scan is less than that causing overflowing ink.

In the embodiment, the irregularity of ink thickness may decrease, because each nozzles used in the first, second, third, and forth scan is different.

The recording by the K(black) head same as that by other heads in the condition of 25% thinning requires twice as much recording time as that by other heads, because the times of scanning need to be twice as many as that in usual in order to spot the ink twice as much as that in usual.

Under the humid condition, the interval of scanning from the end of the first scan to the beginning of the second scan must be longer than usual. In this case, the more times the scan is carried out, the longer the recording time requires in order to wait longer in each scan because of the waiting time. Therefore, it is effective that the thinning rate is changed and the times of scanning decrease half when the amount of black ink is to be spotted twice as much as that in usual.

An example of ink jet head and ink jet recording method which is especially effective in the present invention.

Figure 42:
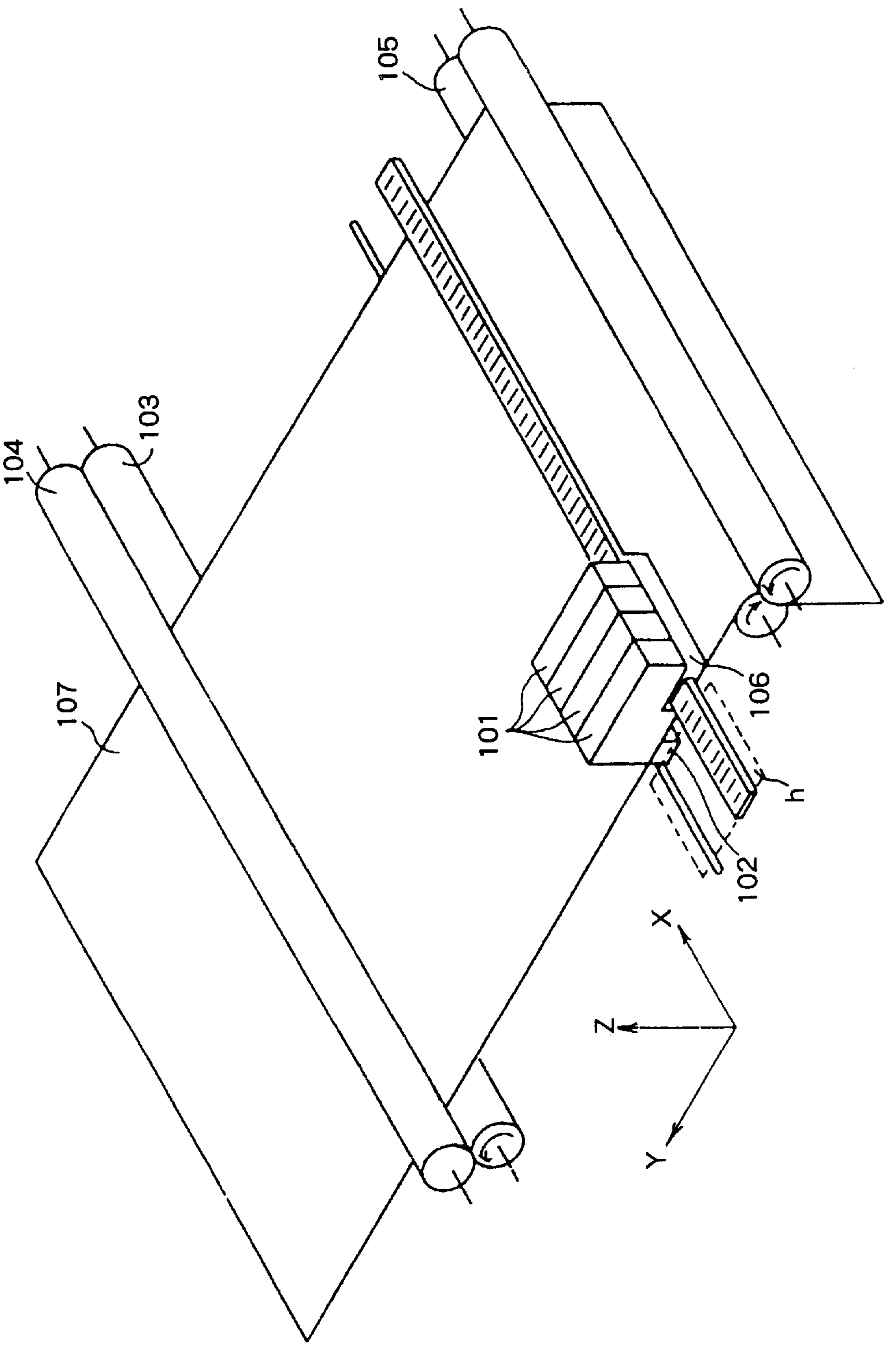
FIG. 42 is a perspective view illustrating a printer construction.
Figure 43:
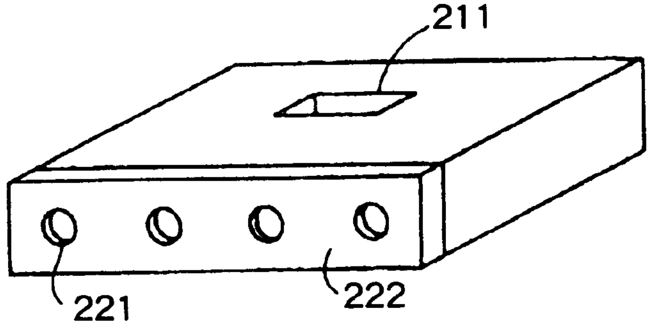
FIGS. 43(A) and 43(B) are perspective views of a multi-head.
Figure 43:
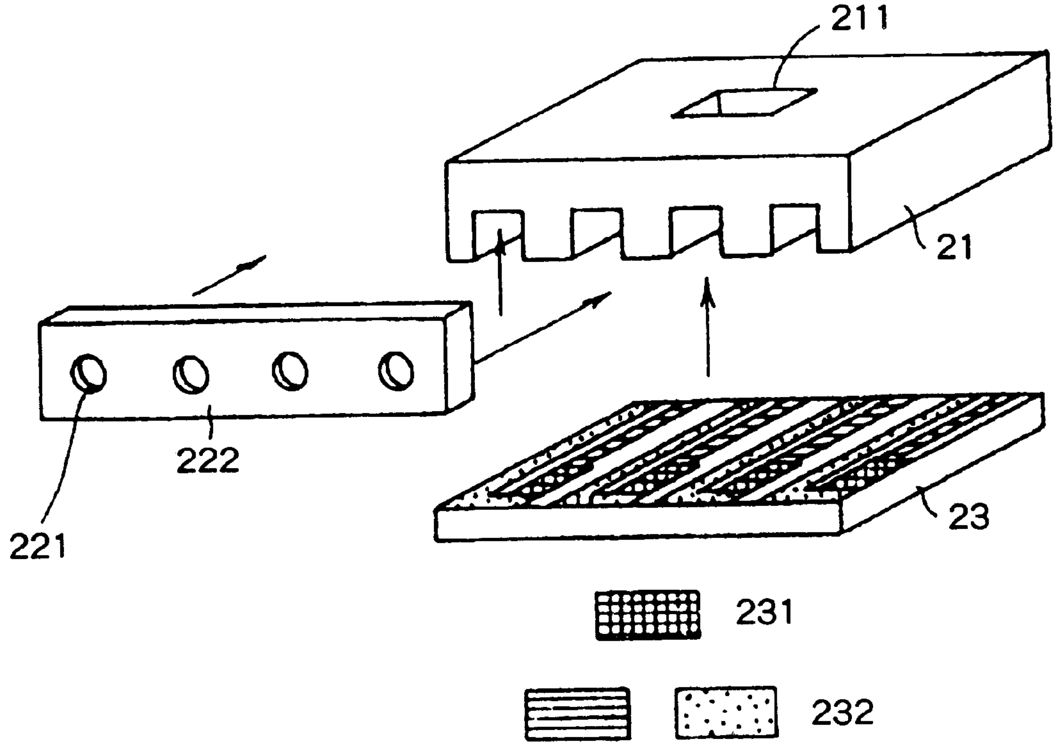

FIG. 42 shows the construction of a printer when the printing on paper by using above mentioned multi-head. In the figure, 101 is an ink jet cartridge. This cartridge has four color tanks and multi-head 102. Each tank is filled with black, cyan, magenta, yellow ink respectively. FIG. 43(A) shows an exploded view of the multi-head and a view of the nozzles arranged on the multi-head, 211 are nozzles arranged on multi-head 102. In the figure, nozzles 211 are arranged parallel with Y axis, they may have slope. In this case, the printing is operated with the time lag, while the head moves in the direction X. In FIG. 42, 103 is a paper feeding roller, which feeds the paper 107 in the direction Y by rolling while press the paper 107 with supplement roller 104. 105 is a paper feeding roller, which feeds the paper 107 and press the paper 107 like rollers 103 and 104. 106 is a carriage, which holds the four ink jet cartridge and moves them with printing.

Figure 45:
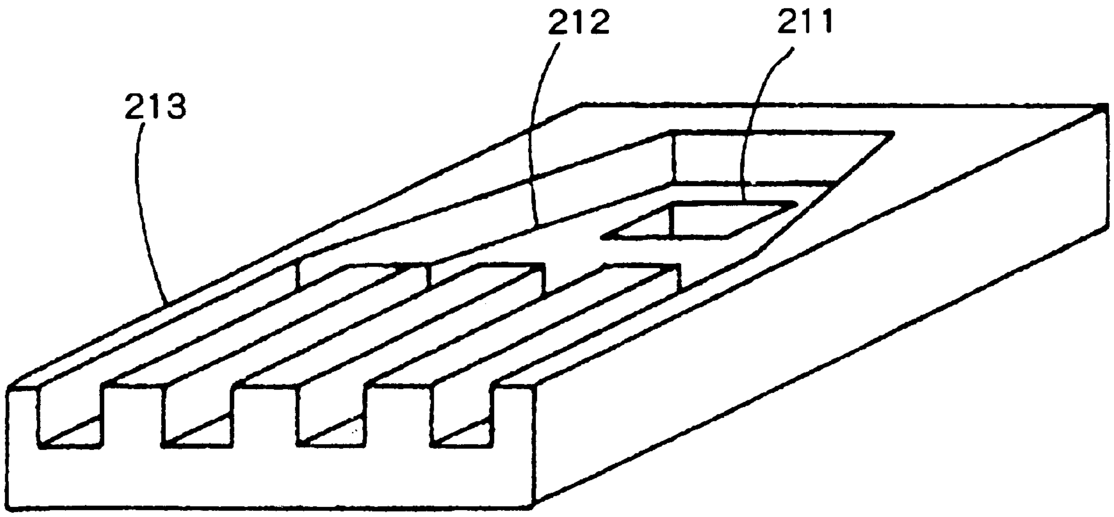
FIG. 45 is a perspective view of an upper plate of a multi-head.

The cartridge is to be at home position, when printing is not operated or recovery process of multi-head is operated. FIG. 45 shows the shape of the reverse side of the top board.

The carriage which is at home position before printing moves in the direction X when a printing operation occurs, then the printing is operated by the width of D on the paper by spotting ink from the nozzles 211 on the multi-head 102. The carriage moves back to home position after the printing to the end of the paper, then the printing in the direction X will be operated again. In case of shuttle printing, the printing is operated in the direction −X. In the time between the first and the second printing operation, the paper feeding roller 103 feed the paper in the direction Y by the width of K. The repeat of the printing and the feeding paper by the width of K in each scan makes the printing on a sheet of paper complete.

In the case that the color printing is operated by using two or more heads like FIG. 42 different colors are printed to the adjacent pixel in the same or close scanning. The time between the arrival of an ink drop and the arrival of another ink drop is especially short, in the case that different colors are printed to the adjacent pixel in the same scanning. If the time the ink fix to the paper is longer than the time between the arrival of an ink drop and the arrival of another ink drop, the quality of picture will decline. If the time the ink fix to the paper is late in case of the close scanning, the quality of picture will decline because of ink bleeding. Therefore, it is understood that the fundamental construction of the present invention is effective.

In addition, the concentration of surfactant in the ink is not exceeding critical micelle concentration in the ink, but become exceeding it, because the water and the solvent in the ink vapors, and the paper absorbs the solvent, in the time between the arrival of an ink drop and the arrival of another ink drop. Thus, the permeability of the ink raises and ink bleeding may be prevented. In this case, it is preferable that, the concentration of surfactant in the ink is less than critical micelle concentration in the ink but more than 80% of that, more preferable 90 to 99%.

What is claimed is:

1. An ink jet cartridge as a mechanism containing an ink for ejection from an ink jet head comprising:

a negative pressure producing material;

a first chamber for accommodating said negative pressure producing material;

a second chamber in communication with said first chamber through a communication part, which is formed between a partition wall for defining said first and second chambers and along the bottom surface of said first chamber;

said first chamber being formed with an opening for receiving an ink supply pipe for supplying ink into an ink jet head; and having an air communication outlet formed in a position higher than that of said opening for making communication with ambient air;

said first and second chambers enclosing ink therein;

wherein said ink contains a surfactant in an amount not exceeding a critical micelle concentration in the ink, but exceeding a critical micelle concentration in purified water, and wherein a gas-liquid interface in said negative pressure producing material within said first chamber of said ink jet cartridge is stabilized against environmental changes including changes in atmospheric pressure and temperature.

2. An ink jet cartridge according to claim 1, wherein said opening is formed through a wall of said first chamber opposed to said partition wall.

3. An ink jet cartridge according to claim 1, wherein said negative pressure producing material is compressed by insertion of said ink supply pipe such that the portion adjacent said opening is compressed in an amount more than the portion adjacent said communication part.

4. An ink jet cartridge according to claim 1, wherein said opening is formed in a position higher than the upper end of said communication part.

5. An ink jet cartridge according to claim 1, wherein said second chamber is provided with another partition wall which provides a clearance with the inside surface of said ink jet cartridge, which is larger than a clearance of said communication part.

6. An ink jet cartridge according to claim 1, wherein the capacity of said second chamber is one to three times larger that of said first chamber.

7. An ink jet cartridge according to claim 1, wherein a height of said communication part is greater than the average pore size of said negative pressure producing material and is less than or equal to 5 mm in height.

8. An ink jet cartridge according to claim 1, wherein said ink filled within said first chamber and said second Ago chamber forms a gas-liquid interface within said negative pressure producing material, and the surface tension of said ink is from 30 dyn/cm to 55 dyn/cm.

9. An ink jet recording apparatus including an ink jet cartridge, said ink jet cartridge comprising:

a negative pressure producing material;

a first chamber for accommodating said negative pressure producing material wherein a gas-liquid interface in said negative pressure producing material within said first chamber of said ink jet cartridge is stabilized against environmental changes including changes in atmospheric pressure and temperature;

a second chamber in communication with said first chamber through a communication part, which is formed between a partition wall for defining said first and second chambers and along the bottom surface of said first chamber;

said first chamber being formed with an opening for receiving an ink supply pipe for supplying ink into an ink jet head; and having an air communication outlet formed in a position higher than that of said opening for making communication with ambient air;

said first and second chambers enclosing ink therein;

wherein said ink contains a surfactant in an amount not exceeding a critical micelle concentration in the ink, but exceeding a critical micelle concentration in purified water, so that said negative pressure producing material would not contain the ink adjacent said air communication outlet; and an ink jet head adapted to be supplied with said ink from said ink jet cartridge and to eject said ink for printing onto a recording medium.

10. An ink jet recording apparatus according to claim 9, further comprising:

a carriage enabled to carry both said ink jet cartridge and said ink jet head; and a conveyer for conveying the recording medium.

11. An ink jet recording apparatus according to claim 9, wherein said opening is formed through a wall of said first chamber opposed to said partition wall.

12. An ink jet recording apparatus according to claim 9, wherein said negative pressure producing material is compressed by insertion of said ink supply pipe such that the portion adjacent said opening is compressed in an amount more than the portion adjacent said communication part.

13. An ink jet recording apparatus according to claim 9, wherein said opening is formed in a position higher than the upper end of said communication part.

14. An ink jet recording apparatus according to claim 9, wherein said second chamber is provided with another partition plate which provides a clearance with the inside surface of said ink jet recording apparatus, which is larger than a clearance of said communication part.

15. An ink jet recording apparatus according to claim 9, wherein the capacity of said second chamber is one to three times larger that of said first chamber.

16. An ink jet recording apparatus according to claim 9, wherein a height of said communication part is greater than the average pore size of said negative pressure producing material and is less than or equal to 5 mm in height.

17. An ink jet recording apparatus according to claim 9, wherein said ink filled within said first chamber and said second chamber forms a gas-liquid interface within said negative pressure producing material, and the surface tension.

18. Ink for use in initially filling or refilling an ink jet cartridge having a first chamber for accommodating a negative pressure producing material and provided with an air communication outlet for communication with the ambient air, wherein a gas-liquid interface in said negative pressure producing material within said first chamber of said ink jet cartridge is stabilized against environmental changes including changes in atmospheric pressure and temperature; and a second chamber which is substantially closed except for a communication part for communication with said first chamber at a position away from the air communication outlet, wherein said second chamber directly accommodates the ink to be supplied into said first chamber and is connected with an ink jet head;

said ink being a water-based ink and said ink containing a surfactant in a predetermined amount not exceeding a critical micelle concentration of the surfactant in the water-based ink (c.m.c. in ink), but exceeding a critical micelle concentration of the surfactant in purified water (c.m.c. in purified water).

19. Ink for use in filling an ink jet cartridge according to claim 18, wherein in said ink jet cartridge:

said communication part is formed between a partition wall for defining said first and second chambers from each other, and an inside surface of said ink jet cartridge;

a wall of said first chamber is opposed to said partition wall and is provided with an opening for supply of the ink;

said ink supply opening permits insertion therein of an ink supply pipe for supplying the ink to an ink jet head, and wherein said negative pressure producing material is compressed toward the communication part adjacent the ink supply opening by insertion of the supply pipe; and said ink is filled in said negative pressure producing material in said first chamber as well as in said second chamber.

20. Ink for use in filing an ink jet cartridge according to claim 18, wherein in said ink jet cartridge:

said communication part is formed between a partition wall for defining said first and second chambers and an inside surface of said ink jet cartridge, an ink supply opening is formed on a wall different from the partition wall, wherein said negative pressure producing material is capable of being compressed toward the communication part by insertion of an ink supply pipe to an ink jet head adjacent the ink supply opening, and wherein said negative pressure producing material is not compressed by insertion of an ink supply pipe adjacent the communication part; and said ink is filled in said compressed area and uncompressed area within said first chamber as well as in said second chamber.

21. Ink for use in filling an ink jet cartridge according to claim 20, wherein said different wall has a surface opposed to said partition wall, and the ink supply opening is located at a position disposed toward the communication part, and is disposed above the communication part; and said ink is filled in said ink jet cartridge.

22. Ink for use in filling an ink jet cartridge according to claim 18, wherein said second chamber comprises a partition plate which provides a clearance with the inside surface of said ink jet cartridge, which is larger than a clearance of said communication part, and said ink is filled in both sides of said partition wall.

23. Ink for use in filling an ink jet cartridge according to claim 18, wherein the volume ratio between said first chamber and second chamber of said ink jet cartridge is in the range of 1:3 to 1:1.

24. Ink for use in filling an ink jet cartridge according to claim 18, wherein a height of said communication part is larger than an average pore size of said negative pressure producing material in said first chamber and less than 5 mm.

25. Ink for use in filling an ink jet cartridge according to one of claims 1 to 7, wherein the ink jet cartridge has a construction promoting gas-liquid replacement ranging from said communication part to the opposed position of said negative pressure producing material in said first chamber;

said ink for use in filling is an ink forming a gas-liquid interface within said negative pressure producing material by said construction promoting gas-liquid replacement and said ink is filled in said first and second chambers; and said ink is an ink having a surface tension from 30 dyn/cm to 55 dyn/cm.

26. A method of ink jet recording comprising the steps of:

providing an ink jet recording apparatus comprising an ink jet cartridge and ink jet head for ejecting ink to print on a recording medium, said ink jet cartridge including:

a negative pressure producing material;

a first chamber for accommodating said negative pressure producing material wherein a gas-liquid interface in said negative pressure producing material within said first chamber of said ink jet cartridge is stabilized against environmental changes including changes in atmospheric pressure and temperature;

a second chamber in communication with said first chamber through a communication part, which is formed between a partition wall for defining said first and second chambers and along the bottom surface of said first chamber;

said first chamber being formed with an opening for receiving an ink supply pipe for supplying ink into an ink jet head; and having an air communication outlet formed in a position higher than that of said opening for making communication with ambient air; wherein a gas-liquid interface in said negative pressure producing material within said first chamber of said ink jet cartridge is stabilized against environmental changes including chances in atmospheric pressure and temperature; and a second chamber which is substantially closed except for a communication part for communication with said first chamber at a position away from the air communication outlet, wherein said second chamber directly accommodates the ink to be supplied into said first chamber and is connected with said ink jet head;

wherein said ink jet cartridge has a construction promoting gas-liquid replacement in the range from said communication part to the opposed position of said negative pressure producing material in said first chamber;

filling said first and second chambers with said water-based ink having a surface tension from 30 dyn/cm to 55 dyn/cm, but leaving a region adjacent said air communication outlet as a region where no ink is maintained;

wherein said water-based ink contains a surfactant in a predetermined amount of providing a concentration of said surfactant not exceeding a critical micelle preparing an ink containing a surfactant in an amount not exceeding a critical micelle concentration relative to the ink, but exceeding a critical micelle concentration relative to purified water, so that said negative pressure producing material would not contain the ink adjacent said air communication outlet;

filling said first and second chambers with said ink;

supplying said ink from said ink jet cartridge to said ink jet head; and ejecting said ink from a nozzle tip of said ink jet head for printing onto a recording medium.

27. A method of ink jet recording performed by utilizing an ink jet cartridge connected to an ink jet head, and a water-based ink initially filled or refilled in said ink jet cartridge, said method comprising the steps of:

providing said ink jet cartridge comprising:

a first chamber for accommodating a negative pressure producing material and provided with an air communication outlet for communication with the ambient air, concentration relative to said water-based ink (c.m.c. relative to ink) when said ink contains said surfactant, but exceeding a critical micelle concentration relative to purified water (c.m.c. relative to purified water), which is exhibited when such surfactant is added to purified water.

28. A method of ink jet recording according to claim 27, wherein the volume ratio between said first chamber and second chamber of said ink jet cartridge is in the range of 1:3 to 1:1; and a height of said communication part is larger than an average pore size of said negative pressure producing material in said first chamber and less than or equal to 5 mm.

29. A method of ink jet recording according to claim 27, which is a method of color recording capable of recording multicolor inks onto a recording medium successively, wherein lack if said multicolor inks contains said surfactant in an amount of said predetermined content.

30. A method of ink jet recording according to claim 27, which employs an ink jet head to be controlled at a predetermined temperature condition of T C, wherein said water-based ink contains a surfactant in an amount of not exceeding the critical micelle concentration in said ink in relation to the illustrated relationship between the surface tension and the concentration of surfactant at said predetermined temperature condition of T C, and said water-based ink contains said surfactant in an amount exceeding the critical micelle concentration in purified water in relation to the illustrated relationship between the surface tension and the concentration of said surfactant.

31. A method of ink jet recording according to claim 30 wherein said given temperature of T C is within the range of exceeding 15° C. and not exceeding 40° C.

32. A method of ink jet recording according to claim 27, wherein said predetermined content in said water-based ink is within the range of not exceeding the half value of the sum of said critical micelle concentration in ink and said critical micelle concentration in purified water.

* * * * *

UNITED STATES PATENT AND TRADEMARK OFFICE
CERTIFICATE OF CORRECTION

PATENT NO. : 6,164,772 
DATED : December 26, 2000
INVENTOR(S) : Koitabashi et al.

It is certified that error appears in the above-identified patent and that said Letters Patent is hereby corrected as shown below:

Title page,
Item [57], ABSTRACT,
Line 1, “Ink” should read -- Inks, --.
Line 7, “passage” should read -- passage. --.

Drawings,
Sheet 7, Figure 10A, “decreese” should read -- decrease --.
Sheet 7, Figure 10C, “decreese” should read -- decrease --.
Sheet 30, Figure 38, “tention” (both occurrences) should read -- tension --.

Column 7,
Line 25, “an” should be deleted.

Column 11,
Line 36, “describe” should read -- described --.
Line 45, “(F)” should read -- 7(F) --.

Column 12,
Line 49, “the” (first occurrences) should read -- that the --.

Column 13,
Line 16, “sea l” should read -- seal --.
Line 61, “in” should read -- in, and --.

Column 14,
Line 16, “kaimen” should read -- Kaimen --.
Lines 25 and 28, “a” should read -- to --.

Column 16,
Line 18, “Acetynol” should read -- Acetylenol --.
Line 22, “Cyane” should read -- Cyan --.
Line 28, “bleeding” should read -- Bleeding --.

Column 18,
Line 9, “Comparison;” should read -- Comparison 2; --.
Line 35, “if” should be deleted.
Line 38, “reache” should read -- reach --.

CERTIFICATE OF CORRECTION

PATENT NO. : 6,164,772
DATED : December 26, 2000
INVENTOR(S) : Koitabashi et al.

It is certified that error appears in the above-identified patent and that said Letters Patent is hereby corrected as shown below:

Column 20,
Line 16, "Acetynol" should read -- Acetylenol --.
Line 18, "Cyane" should read -- Cyan --.

Column 22,
Line 62, "There fore" should read -- Therefore --.

Column 23,
Line 14, "ahead," should read -- head, --.
Line 65, "numbmer" should read -- number --.

Column 24,
Line 14, "tha" should read -- the --.

Column 25,
Line 9, "of the" should be deleted.
Line 32, "requied" should read -- required --.

Column 26,
Line 19, "consumed" should read -- consumed. --.

Column 27,
Line 29, "in let" should read -- inlet --.

Column 28,
Line 49, "adeterious" should read -- deleterious --.

Column 29,
Line 23, "evaporation" should read -- evaporation of --.

Column 30,
Line 35, "forth" should read -- fourth --.

Column 31,
Line 58, "Ago" should be deleted.

Column 33,
Line 59, "sion." should read -- sion of said ink is from 30 dyn/cm to 55 dyn/cm. --.

UNITED STATES PATENT AND TRADEMARK OFFICE

CERTIFICATE OF CORRECTION

PATENT NO. : 6,164,772
DATED : December 26, 2000
INVENTOR(S) : Koitabashi et al.

It is certified that error appears in the above-identified patent and that said Letters Patent is hereby corrected as shown below:

Column 35,
Line 34, "wherein a gas-liquid interface in said negative" should be deleted.
Lines 35-58, should be deleted.

Column 36,
Line 17, after "air," the following should be inserted:

--wherein a gas-liquid interface in said negative pressure producing material within said first chamber of said ink jet cartridge is stabilized against environmental changes including changes in atmospheric pressure and temperature; and a second chamber which is substantially closed except for a communication part for communication with said first chamber at a position away from the air communication outlet, wherein said second chamber directly accommodates the ink to be supplied into said first chamber and is connected with said ink jet head;

wherein said ink jet cartridge has a construction promoting gas-liquid replacement in the range from said communication part to the opposed position of said negative pressure producing material in said first chamber;

filling said first and second chambers with said water-based ink having a surface tension from 30 dyn/cm to 55 dyn/cm, but leaving a region adjacent said air communication outlet as a region where no ink is maintained;

wherein said water-based ink contains a surfactant in a predetermined amount of providing a concentration of said surfactant not exceeding a critical micelle--.

Line 36, "lack if" should read -- each of --.

Signed and Sealed this

Thirtieth Day of September, 2003

JAMES E. ROGAN
*Director of the United States Patent and Trademark Office*